(12) United States Patent
Shinjo et al.

(10) Patent No.: US 8,332,410 B2
(45) Date of Patent: Dec. 11, 2012

(54) BIT STRING MERGE SORT DEVICE, METHOD, AND PROGRAM

(75) Inventors: Toshio Shinjo, Chiba (JP); Mitsuhiro Kokubun, Chiba (JP)

(73) Assignee: Kousokuya, Inc., Kanagawa (JP)

( * ) Notice: Subject to any disclaimer, the term of this patent is extended or adjusted under 35 U.S.C. 154(b) by 61 days.

(21) Appl. No.: 12/801,319

(22) Filed: Jun. 3, 2010

(65) Prior Publication Data
US 2010/0250560 A1 Sep. 30, 2010

Related U.S. Application Data

(63) Continuation of application No. PCT/JP2008/003116, filed on Oct. 30, 2008.

(30) Foreign Application Priority Data

Dec. 5, 2007 (JP) .................. 2007-314782

(51) Int. Cl.
*G06F 17/30* (2006.01)
(52) U.S. Cl. .............. 707/745; 707/758; 707/753
(58) Field of Classification Search .......... 707/752, 707/753, 999.007, 999.107, 745, 758
See application file for complete search history.

(56) References Cited

U.S. PATENT DOCUMENTS

| | | | |
|---|---|---|---|
| 5,287,494 A | 2/1994 | Garcia et al. | |
| 5,852,826 A | 12/1998 | Graunke et al. | |
| 6,571,244 B1 | 5/2003 | Larson | |
| 6,675,163 B1 | 1/2004 | Bass et al. | |
| 6,931,424 B1 | 8/2005 | Joseph | |

FOREIGN PATENT DOCUMENTS

| | | |
|---|---|---|
| JP | 2000-010761 A | 1/2000 |
| JP | 2001-357070 A | 12/2001 |
| JP | 2006-163565 A | 6/2006 |
| JP | 2008-015872 A | 1/2008 |
| JP | 2008-112240 A | 5/2008 |
| JP | 2008-159025 A | 7/2008 |
| JP | 2008-181260 A | 8/2008 |
| JP | 2008-269197 A | 11/2008 |
| WO | WO-2008/004335 A1 | 1/2008 |
| WO | WO-2008/053583 A1 | 5/2008 |
| WO | WO-2008/065735 A1 | 6/2008 |
| WO | WO-2008/090588 A1 | 7/2008 |

OTHER PUBLICATIONS

Nilsson et al., "IP-Address Lookup Using LC-Tries", IEEE Journal on Selected Areas in Communications, vol. 17, No. 6, Jun. 1999, pp. 1083-1092.

(Continued)

*Primary Examiner* — Leslie Wong
(74) *Attorney, Agent, or Firm* — Rader, Fishman & Grauer PLLC

(57) ABSTRACT

To realize a high speed merge sort method by applying a coupled node tree, which method extracts a smallest or largest key from a plurality of sorted key storage areas in each of which is stored keys including bit strings that are sorted, and generates a coupled node tree for merge while adding a processing source identifier that identifies the sorted storage area wherefrom the key has been extracted, and repeats the actions of writing out into the merged key storage area a key being obtained by a minimum or maximum value search on the coupled node tree and deleting the key, and inserting into the coupled node tree a key by extracting the key from one of the plurality of sorted key storage areas.

14 Claims, 48 Drawing Sheets

OTHER PUBLICATIONS

Knuth, "The Art of Computer Programming", 1973, sections 5.2.4, 5.4.1, pp. 159-167, 252-263, vol. 3.

Supplemental European Search Report from European Patent Office for application No. 08856620.3, dated Oct. 25, 2011.

Takeda et al., "Database Processor RINDA no Kankei Enzan Hoshiki", Dai 37 Kai (Showa 63 Nen Koki) Zenkoku Taikai Koen Ronbunshu (I), pp. 381-382, Information Processing Society of Japan (Sep. 14, 1988).

Xin Li et al., "Stateful Inspection Firewall Session Table Processing", School of Computer Science and Technology, Harbin Institute of Technology, vol. 11, No. 2, pp. 21-30, International Journal of Information Technology (Nov. 2, 2005).

International Search Report mailed on Dec. 2, 2008.

(1)

(2)

(1)

(2)

(1)

(2)

(3)

(4)

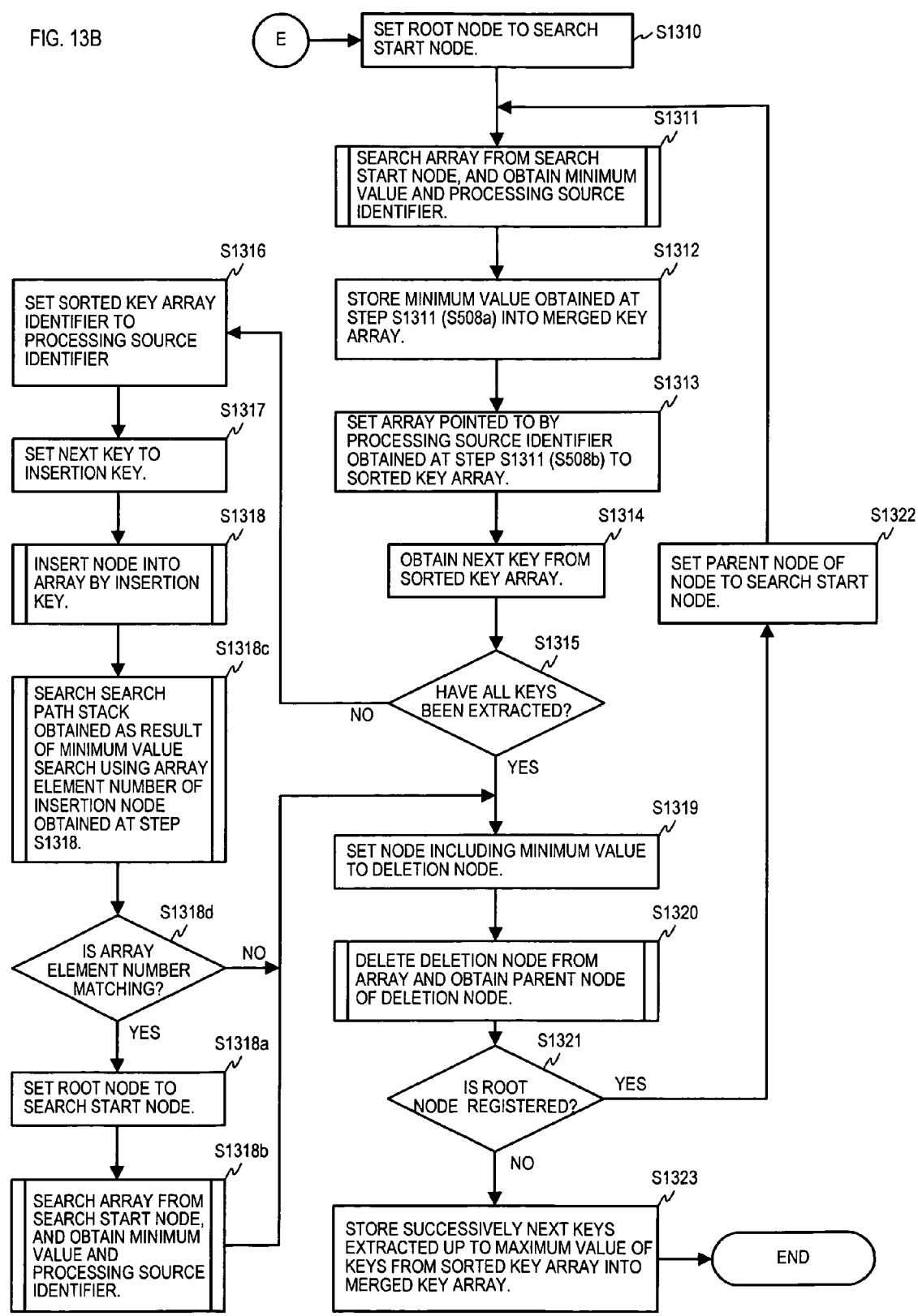

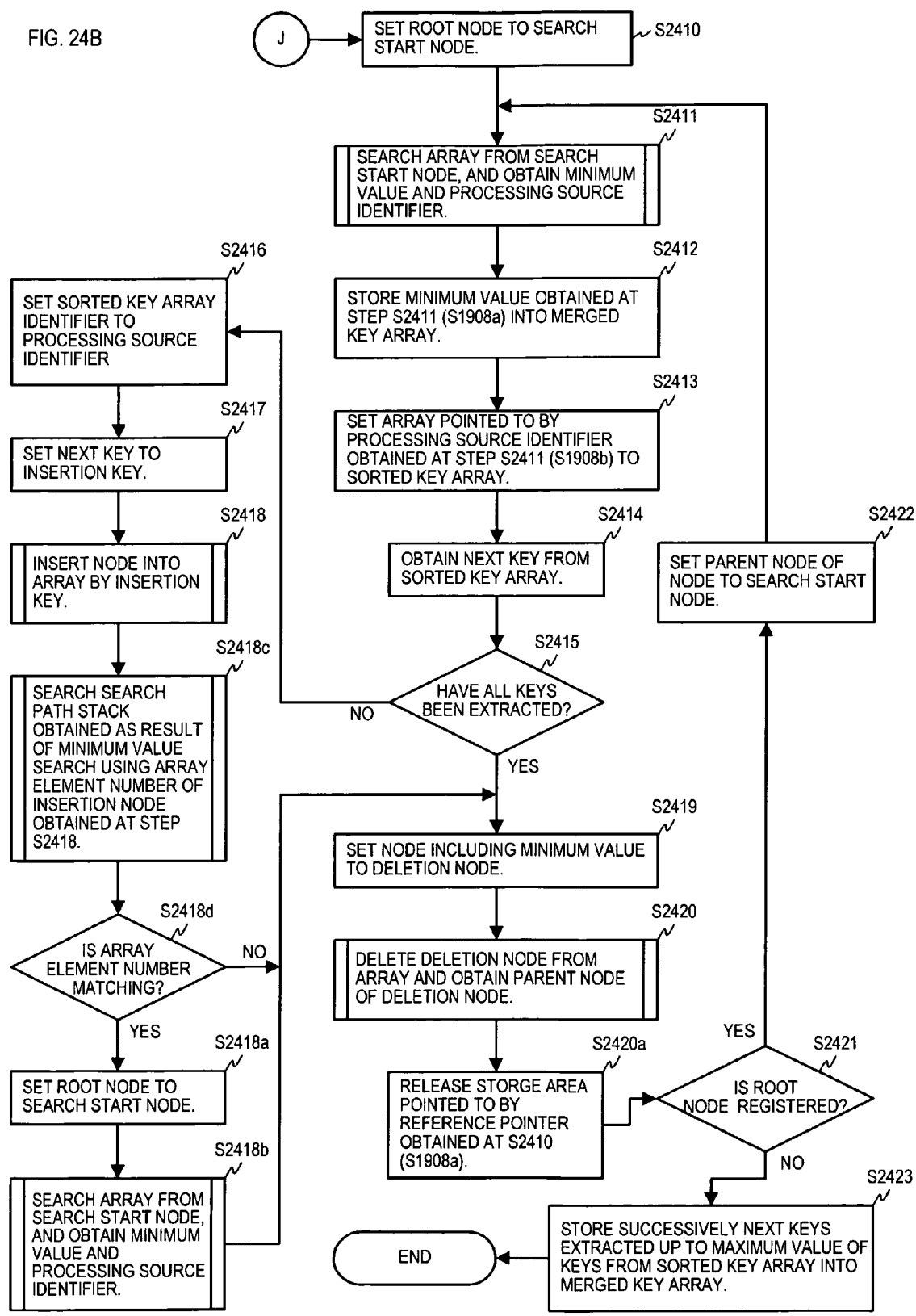

BIT STRING MERGE SORT DEVICE, METHOD, AND PROGRAM

CROSS-REFERENCE TO RELATED APPLICATIONS

This application is a continuation of PCT/JP2008/003116 filed on Oct. 30, 2008, and is based and claims the benefit of priority of the prior Japanese Patent Application No. 2007-314782, filed on Dec. 5, 2007, the entire contents of which are incorporated herein by reference. The contents of PCT/JP2008/003116 are incorporated herein by reference in their entity.

BACKGROUND OF THE INVENTION

1. Field of the Invention

The present invention relates to a merge sort apparatus and method and a program to execute that method on a computer.

2. Description of Related Art

In recent years, with advancements in information-based societies, large-scale databases have come to be used in various places. To search such large-scale databases, it is usual to search for a desired record, retrieving the desired record by using as indexes items within records associated with addresses at which each record is stored. Character strings in full-text searches can also be treated as index keys.

Then, because the index keys can be expressed as bit strings, the searching of a database is reduced to searching for bit strings in the database.

Furthermore, the processing of a database, as recited in the patent document 1 and patent document 2 cited below, includes merge sorting of the records in the database. This merge sort is also reduced to a merge sort of bit strings.

A basic merge sort method consists of dividing the data into pairs of 2, ordering the pair, and then combining the ordered pairs. In other words, the process is divided into an initial stage of repeatedly dividing the data to be sorted and sorting them, thus obtaining several groups of sorted data, and a later stage of repeatedly merging the sorted data, thus sorting completely the data to be sorted.

Patent document 2 discloses the processing shown in FIG. 1A, of the latter stage of the merge sort processing.

As shown in the example in FIG. 1A, sorted data is stored in block 1 to block N, and the minimum value in block 1 is 13, the minimum value in block 2 is 8 and the next largest data value is 22. In the same way, the example shows that the minimum value in block 3 is 53, the minimum value in block 4 is 24, and the minimum value in block N is 9.

In the latter stage processing of a merge sort, assuming the existence of the above described block 1 to block N, first, a minimum value array is generated from the minimum value in each block. In the example shown in FIG. 1A the minimum value array <13, 8, 53, 24, . . . , 9> is generated from the minimum values in block 1, block 2, block 3, block 4, . . . , block N. Next, that minimum value array is sorted, the sorted minimum value array <8, 9, 13, 15, . . . , 100> is generated, and the minimum value in this array "8" is output. Then, by repeating the process wherein the next data item "22" is extracted from block 2 which originally held that minimum value "8", the insertion position of data item 22 in the sorted minimum value array is obtained, the data item 22 is inserted, and the next smallest value is output, the data stored in block 1 to block N will be merged, and the complete sort of the data is finished.

As described above, in the later stage processing of a merge sort, it is necessary to obtain the insertion position in the sorted minimum value array for the next data item. In order to get the insertion position, comparison processing is performed on the data included in the minimum value array with the next data item as the key. The insertion processing that accompanies that comparison processing is search processing of the sorted minimum value array with the next data item as the search key, in other words, the processing is reduced to bit string search processing.

Many different kinds of bit string search processing methods are known. Among those various methods, in order to perform the above-noted searching for bit strings at high speed, conventional art makes various refinements on the data structure in which bit strings are stored. One of these is a tree structure known as a Patricia tree.

FIG. 1B describes an example of a Patricia tree used for search processing in the above-noted conventional art. A node of a Patricia tree is formed to include an index key, a test bit position for a search key, and right and left link pointers. Although it is not explicitly described, a node of course includes information for the purpose of accessing a record corresponding to the index key.

In the example described in FIG. 1B, the node 1750*a* that holds the index key "100010" is a root node, the test bit position of which is 0. The node 1750*b* is connected to the left link 1740*a* of the node 1750*a*, and the node 1750*f* is connected to the right link 1741*a*.

The index key held by the node 1750*b* is "010011", and the test bit position 2030*b* is 1. The node 1750*c* is connected to the left link 1740*b* of the node 1750*b*, and the node 1750*d* is connected to the right link 1741*b* of the node 1750*b*. The index key held by the node 1750*c* is "000111", and the test bit position is 3. The index key held by the node 1750*d* is "011010", and the test bit position is 2.

The parts connected to the node 1750*c* by solid lines show the right and left link pointers of the node 1750*c*, and the left pointer 1740*c* that is not connected by the dotted line indicates that that field is blank. The dotted line connection destination of the right pointer 1741*c* that is connected by a dotted line expresses the address indicated by the pointer, and in this case this indicates that the right pointer points to the node 1750*c*.

The right pointer 1741*d* of the node 1750*d* points to the node 1750*d* itself, and the node 1750*e* is connected to the left link 1740*d*. The index key held by 1750*e* is "010010", and the test bit position is 5. The left pointer 1740*e* of the node 1750*e* points to the node 1750*b*, and the right pointer 1741*e* of the node 1750*e* points to the node 1750*e*.

The index key held by the node 1750*f* is "101011", and the test bit position 1730*f* is 2. The node 1750*g* is connected to the left link 1740*f* of the node 1750*f* and the node 1750*h* is connected to the right link 1741*f* of the node 1750*f*.

The index key held by the node 1750*g* is "100011", and the test bit position 1730*g* is 5. The left pointer 1740*g* of the node 1750*g* points to the node 1750*a*, and the right pointer 1741*g* of the node 1750*g* points to the node 1750*g*.

The index key held by the node 1750*h* is "101100", and the test bit position 1730*h* is 3. The left pointer 1740*h* of the node 1750*h* points to the node 1750*f*, and the right pointer 1741*h* of the node 1750*h* points to the node 1750*h*.

In the example of FIG. 1B, the configuration is such that, as the tree is traversed downward from the root node 1750*a*, the test bit position of successive nodes increases.

When a search is performed with some search key, the search keys' bit values corresponding to test bit positions held in nodes are successively tested from the root node, and a judgment is made as to whether the bit value at a test bit position is 1 or 0, the right link being followed if the bit value is 1, and the left link being followed if the bit value is 0. Unless the test bit position of a link target node is larger than the bit position of the link origin node, that is, if the link target is not below but rather returns upward (the returning links described by the dotted lines in FIG. 1 being called back links), a comparison is performed between the index key of the link target and the search key. It is assured that if the result of the comparison is that the values are equal the search succeeds, but if the result is non-equal, the search fails.

As described above, although search processing using a Patricia tree has the advantages of being able to perform a search by testing only the required bits, and of it only being necessary to perform an overall key comparison one time, there are the disadvantages of an increase in storage capacity caused by the inevitable two links from each node, the added complexity of the decision processing because of the existence of back links, the delay in the search processing by comparison with an index key for the first time by returning by a back link, and the difficulty of data maintenance such as adding and deleting a node.

Art such as disclosed in the patent document 3 below exists as an attempt to solve these problems of the Patricia tree. In the Patricia tree described in the patent document 3 below, in addition to reducing the storage capacity for pointers by storing the lower level left and right nodes in contiguous regions, the back link decision processing is reduced by providing a bit at each node that indicates whether the next link is or is not a back link.

Even in the art disclosed in the patent document 3 below, however, because one node always occupies an index key region and a pointer region, and because there is one pointer by storing the lower level left and right nodes in contiguous regions, there is not that great an effect of reducing the storage capacity, for example, it being necessary to assign the same capacity to the left pointer 1740c and the right pointer 1741h, which are lowermost parts in FIG. 1B. In addition, there is no improvement of the problem of delay in search processing caused by back links, and the difficulty of adding and deleting a node.

Thus, when a merge sort is to be executed on a huge amount of data, vast amounts of computer resources are monopolized for a long time and the cost increases greatly.

Patent document 1: Japanese Published Patent Application 2000-010761
Patent document 2: Japanese Published Patent Application 2006-163565
Patent document 3: Japanese Published Patent Application 2001-357070

SUMMARY OF THE INVENTION

Thus, the problem to be solved by this invention is to provide an efficient merge sort method as an application of a high-speed bit string search method.

In order to solve the above-described problems with conventional search methods of the past, the applicant, in Japanese Patent Application 2006-187827 proposed a coupled node tree that is a tree used for bit string search formed by a root node and a node pair that is a branch node and a leaf node, or branch nodes, or leaf nodes disposed in adjacent memory storage areas, wherein the root node is a node that expresses a starting point of the tree and which is a leaf node when there is one node in the tree and a branch node when there are two or more nodes in the tree, the branch node including a discrimination bit position in a search key for performing bit string search and position information indicating a position of one node of a node pair of a link target, and the leaf node including an index key that is a bit string that is the target of a search.

The above-noted patent application shows, among other things, basic search methods using a coupled node tree, such as a method for generating a coupled node tree from a given set of index keys, and a basic method for searching for a single index key from a coupled node tree.

Searching for a bit string includes various requests, such as the determining of a minimum value or a maximum value, or determining values within a given range. Given this, the applicant, in Japanese Patent Application 2006-293619, proposed, among other things, a method for determining the minimum/maximum value of an index key included in an arbitrary subtree of a coupled node tree.

In addition, the applicant proposed in Japanese Patent Application 2006-114915 various search processing wherein index keys are positioned in an area separate from that of the coupled node tree and the leaf nodes hold pointers to the area wherein the index keys are stored rather than the keys themselves.

The purpose of this invention is to realize a high-speed merge sort method using this coupled node tree.

This invention realizes a merge sort by extracting the smallest or largest key as an index key from each of multiple sorted key storage areas which hold keys composed of a bit string sorted in ascending or descending order, generating a coupled node tree for merging while affixing to the extracted key a processing source identifier to identify the sorted key storage area from which the key was extracted, and repeating the search process for the minimum value or maximum value of the keys in the coupled node tree, writing out the key to the merged key storage area and deleting it from the coupled node tree, and the insertion process of extracting a key from sorted key storage area and inserting it to the coupled node tree.

In accordance with this invention, since the minimum value or maximum value search processing of the merge key array and the key deletion and insertion processing can be made faster by giving the merge key array the structure of a coupled node tree, a high-speed merge sort method can be realized.

BRIEF DESCRIPTION OF THE DRAWINGS

FIG. 13B is a drawing describing the processing to search for a minimum value in a coupled node tree and to execute a merge, in implementation example 2.

FIG. 24B is a drawing describing the processing to search for a minimum value in a coupled node tree and to execute a merge, in implementation example 5.

DESCRIPTION OF THE PREFERRED EMBODIMENTS

Figure 2A:
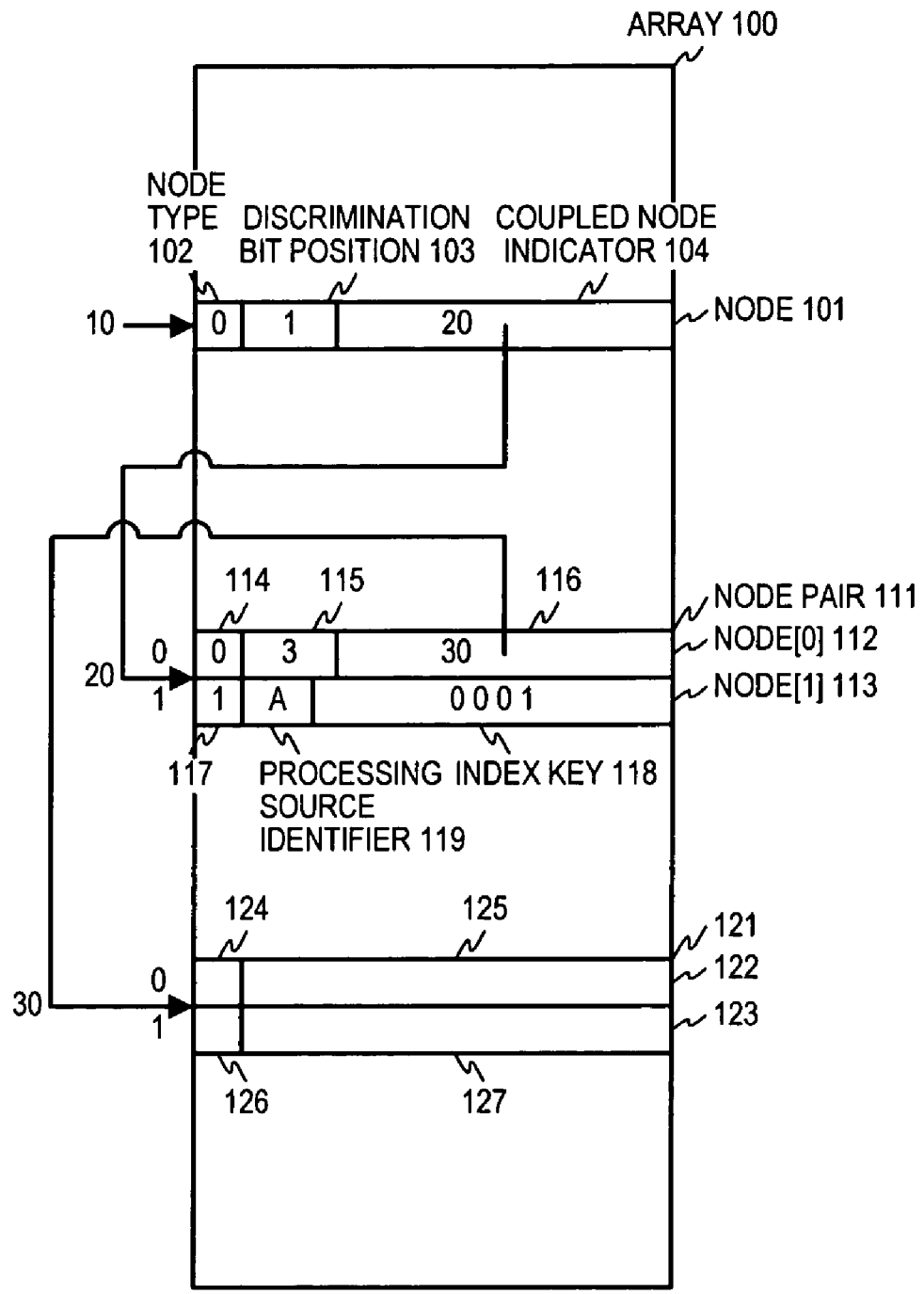
FIG. 2A is a drawing describing an exemplary configuration of a coupled node tree stored in an array in the first preferred embodiment of the present invention.
Figure 2B:
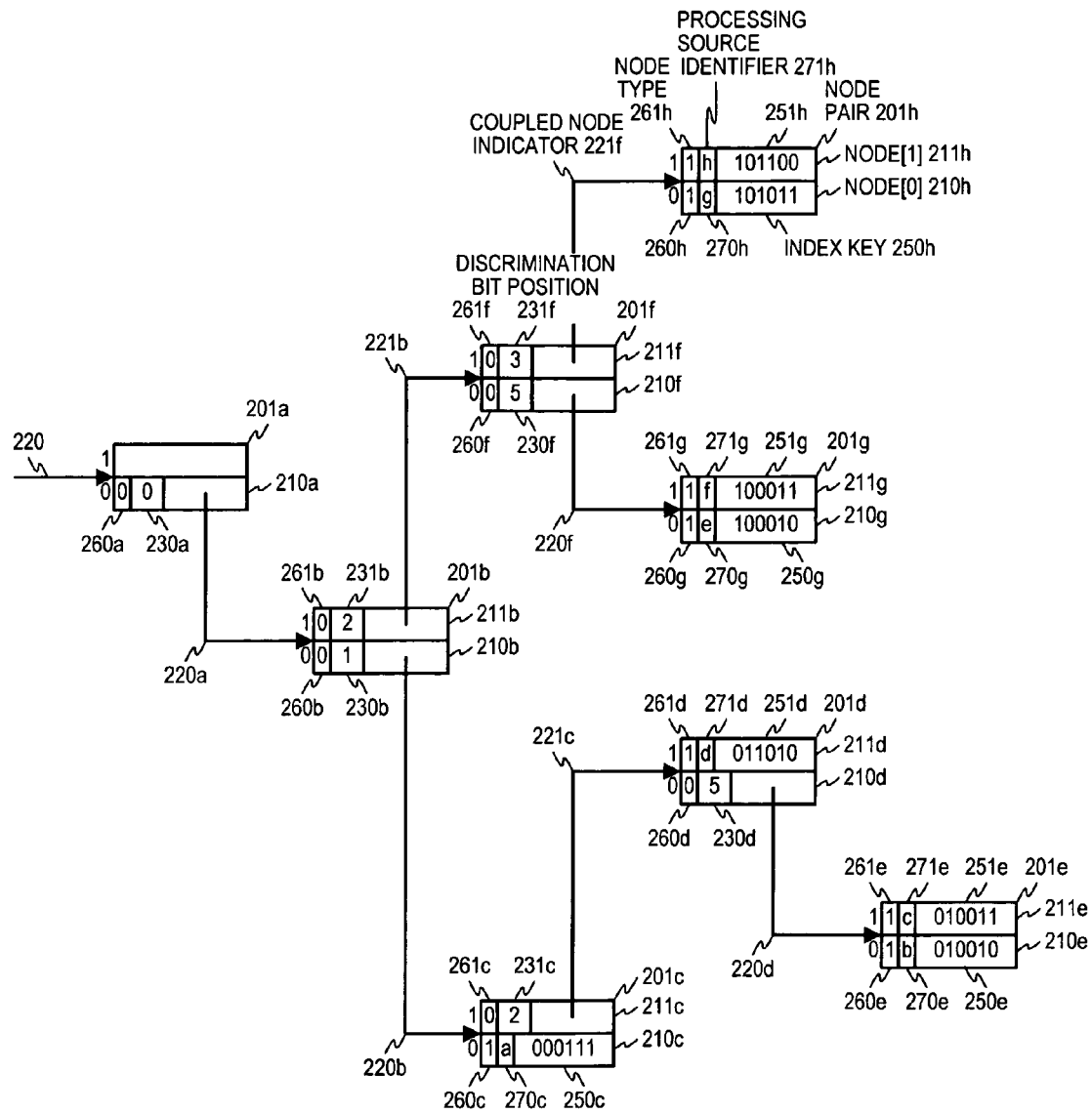
FIG. 2B is a drawing showing conceptually the tree configuration of a coupled node tree related to the first preferred embodiment of the present invention.

First, referencing FIG. 2A and FIG. 2B, an example of a coupled node tree stored in an array related to the first preferred embodiment of the present invention is described. Although it is possible to use address information in a storage device as the data indicating the position of a link target held by a branch node, by using an array formed by array elements that can hold the larger of the occupied storage capacity area between a branch node and a leaf node, it is possible to express the node position as an array element number, enabling a reduction of the amount of position information.

FIG. 2A is a drawing that describes an exemplary configuration of a coupled node tree, related to a preferred embodiment of this invention, that is stored in an array:

Referring to FIG. 2A, a node 101 is located at the array element of the array 100 with the array element number 10. The node 101 is formed by a node type 102, a discrimination bit position 103, and a coupled node indicator 104. The node type 102 is 0, which indicates that the node 101 is a branch node. The value 1 is stored in the discrimination bit position 103. The coupled node indicator 104 has stored in it the array element number 20 of the primary node of the node pair of the link target. To simplify notation hereinafter, the array element number stored in a coupled node indicator is sometimes called the coupled node indicator. Also, the array element number stored in a coupled node indicator is sometimes expressed as the code appended to that node or the code attached to a node pair.

The array element having the array element number 20 has stored therein a node [0] 112, which is the primary node of the node pair 111. The secondary node [1] 113 forming a pair with the primary node is stored into the next, adjacent, array element (array element number 20+1). The value 0 is stored in the node type 114 of the node [0] 112, the value 3 is stored in the discrimination bit position 115, and the value 30 is stored in the coupled node indicator 116. The value 1 is stored in the node type 117 of the node [1] 113, thereby indicating that the node 1[113] is a leaf node. The value "0001" is stored in the index key 118. In the same manner as in a Patricia tree described above, although information for accessing a record corresponding to an index key is of course included in a leaf node, this is omitted from the notation.

Furthermore node [1] 113 has an area for processing source identifier 119 and the example in the drawing shows "A" stored there. The fact that an area is prepared for processing source identifier 119 is a point that differs from the leaf node of a coupled node tree proposed in the earlier patent application, Japanese patent application 2006-187827. In a preferred embodiment of this invention, an area for the processing source identifier 119 is prepared in the leaf node, and is used to identify the sorted key storage area from which the bit string stored in the leaf node as its index key was extracted and inserted in the coupled node tree.

Also primary nodes are indicated as the node [0], and secondary nodes that are paired therewith are indicated as the node [1]. Also the node stored in an array element with some array element number is called the node of that array element number and the array element number stored in the array element of that node is also called the array element number of the node.

The contents of the node pair 121 consisting of nodes 122 and 123 stored in the array elements with the array element number 30 and 31 of array element is omitted.

The 0 or 1 prefixed to the array elements of node [0] 112, node [1] 113, node 122, and node 123, respectively, shows to which node in a node pair a link is to be made if a search is performed with a search key. The bit value, 0 or 1 of the search key at the discrimination bit position of the previous stage branch node is added to the coupled node indicator and linking is done to the node with that array element number.

Thus, by adding the bit value at the discrimination bit position in the search key to the coupled node indicator of the previous stage branch node, the array element number of the array element holding the node that is the link target can be obtained.

Although in the above-noted example the smaller of the array element numbers at which the node pair is located is used as the coupled node indicator, it will be understood that it is also possible to use the larger of the array element numbers in the same manner.

Figure 1A:
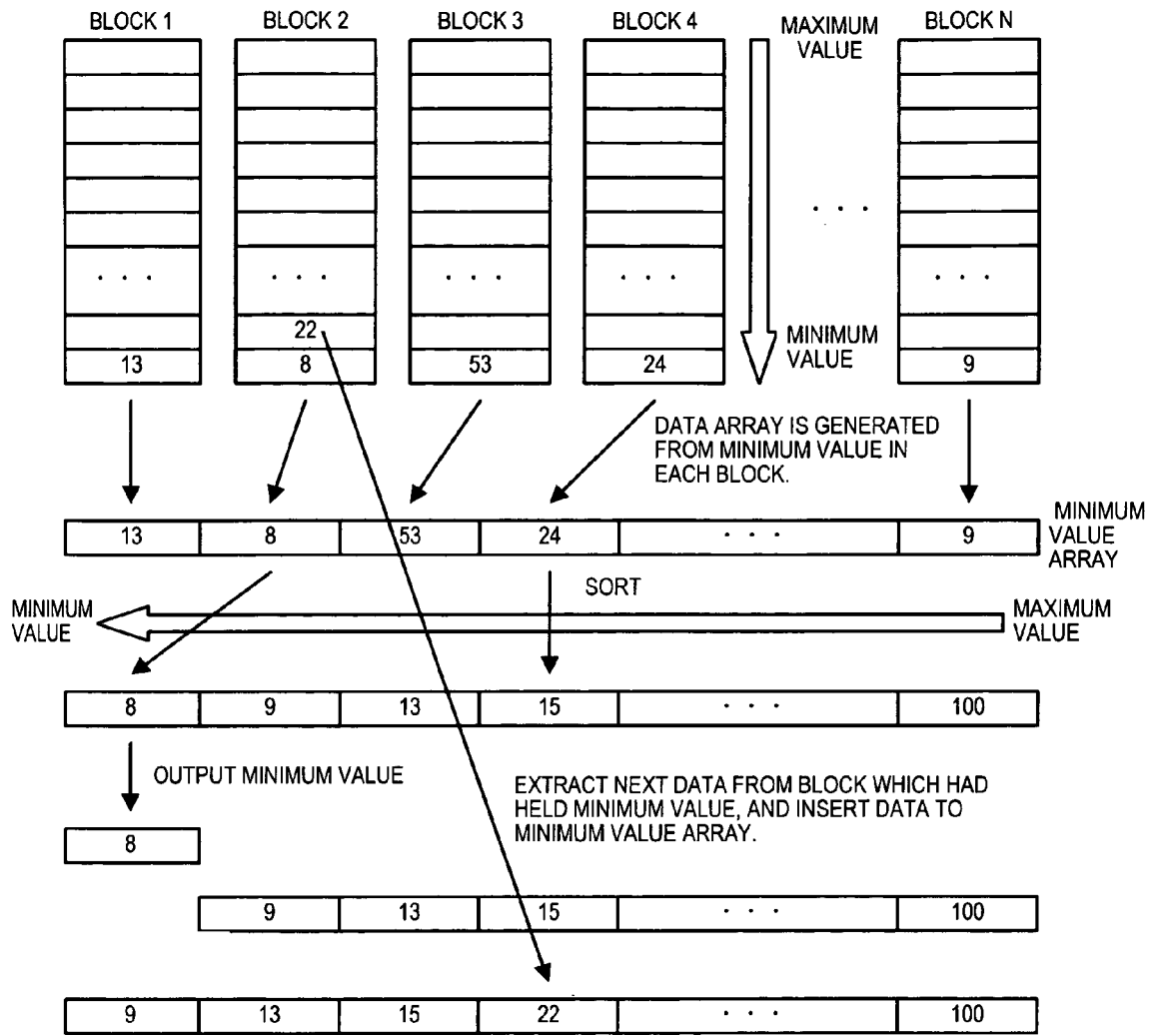
FIG. 1A is a drawing describing a conventional processing of the latter stage of a merge sort that repeatedly merges sorted data and thus completely sorts the data to be sorted.
Figure 1B:
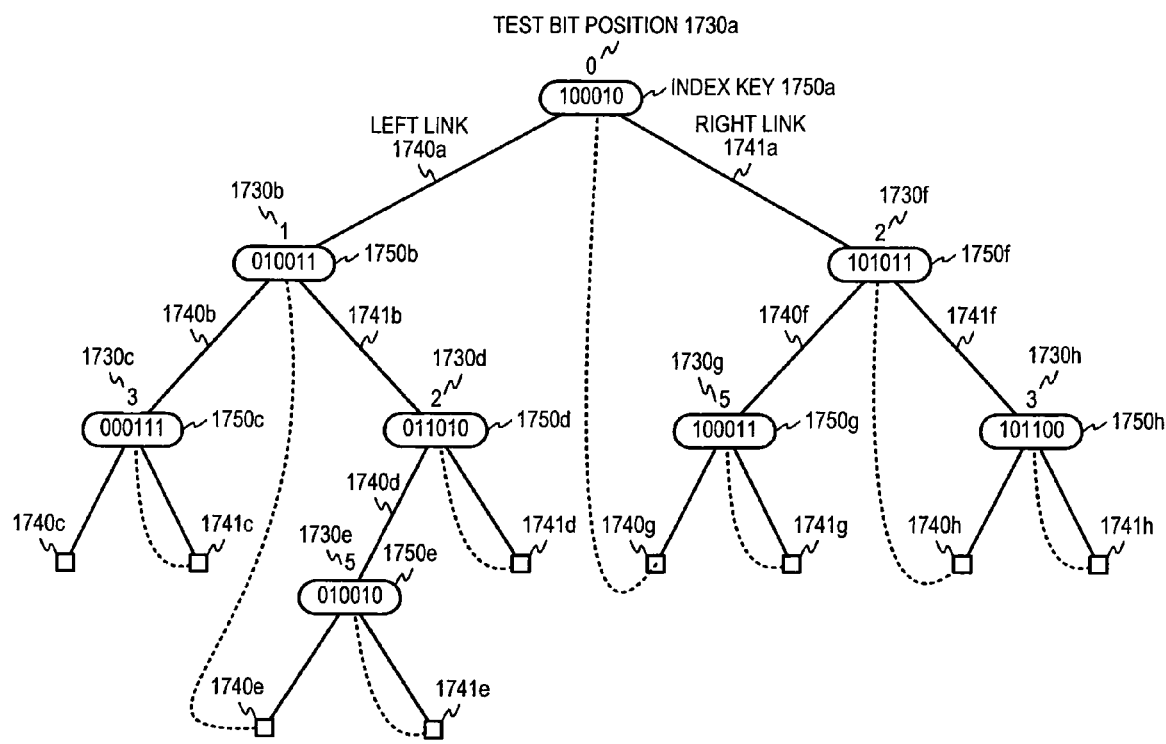
FIG. 1B is a drawing describing an example of a Patricia tree used in searching in the conventional art.

FIG. 2B is a drawing that conceptually describes an embodiment of a tree structure of a coupled node tree related to a preferred embodiment of this invention. The 6-bit index key that is illustrated is the same that of the Patricia tree described as an example in FIG. 1B.

The reference code 210a shows the root node. In the example described, the root node 210a is the primary node of the node pair 201a located at the array element number 220.

In this tree structure, a node pair 201b is located below the root node 210a, and below that are located the node pair 201c and the node pair 201f. Below the node pair 201f are located the node pair 201h and the node pair 201g. Below the node pair 201c is located the node pair 201d, and below the node pair 201d is located the node pair 201e.

The 0 or 1 code that is appended before each node is the same as the codes that are appended before the array element numbers described in FIG. 2A, and indicates the node position. The tree is traversed in accordance with the bit values at discrimination bit positions of the search key, so that the leaf node of the search for item is found.

In the example described, the node type 260a of the root node 210a is 0, thereby indicating that this is a branch node, and the discrimination bit position 230a indicates 0. The coupled node indicator is 220a, which is the array element number of the array element in which the primary node 210b of the node pair 201b is stored.

The node pair 201b is formed by the node 210b and the node 211b, the node types 260b and 261b thereof both being 0, indicating branch nodes. The discrimination bit position 230b of the node 210b has 1 stored therein, and in the coupled node indicator of the link target is stored the array element number 220b of the array element in which is stored the primary node 210c of the node pair 201c.

Because 1 is stored in the node type 260c of the node 210c, this node is a leaf node, and thus includes an index key and a processing source identifier. "000111" is stored in the index key 250c, and "a" is stored in the processing source identifier 270c. The node type 261c of the node 211c is 0, the discrimination bit position 231c of the node 211c is 2, and in the coupled node indicator is stored the array element number 221c of an array element in which is stored the primary node 210d of the node pair 201d.

The node type 260d of the node 210d is 0, the discrimination bit position 230d of the node 210d is 5, and in the coupled node indicator is stored the array element number 220d of an array element in which is stored the primary node 210e of the node 201e. The node type 261d of the node 211d that is paired with the node 210d is 1, and "011010" is stored in the index key 251d and "d" is stored in the processing source identifier.

The node types 260e and 261e of the nodes 210e and 211e of the node pair 201e are both 1, indicating that both are leaf nodes. In the index keys 250e and 251e of each are stored "010010" and "010011" respectively as index keys. Also, "c" and "b" are stored in their processing source identifiers, 270e and 271e, respectively.

The discrimination bit position 231b of the node 211b, which is the other node of the node pair 201b, has 2 stored therein, and the array element number 221b of the array element in which is stored the primary node 210f of the node pair 201f is stored in the coupled node indicator of the link target.

The node types 260f and 261f of the nodes 210f and 211f of the node pair 201f are both 0, indicating that both are branch nodes. In the discrimination bit positions 230f and 231f of each are stored 5 and 3, respectively. The array element number 220f of the array element in which is stored the primary node 210g of the node pair 201g is stored in the coupled node indicator of the node 210f, and the array element number 221f of an array element in which is stored the node [0] 210h, which is the primary node of the node pair 201h, is stored in the coupled node indicator of the node 211f The node types 260g and 261g of the nodes 210g and 211g of the node pair 201g are both 1, indicating that both are leaf nodes, and "100010" and "100011" are stored in the index keys 250g and 251g thereof, respectively. Also, "e" and "f" are stored in their processing source identifiers, 270g and 271g, respectively.

In the same manner, the node types 260h and 261h of the node [0] 210h of the node pair 201h, and the node [1] 211h, which is paired therewith, are both 1, indicating that both are leaf nodes, and "101011" and "101100" are stored in the index keys 250h and 251h thereof, respectively. Also, "g" and "h" are stored in their processing source identifiers, 270h and 271h, respectively.

The processing flow in searching for the index key "100010" from the above-noted tree is briefly described below. The discrimination bit positions are numbered 0, 1, 2, ... and so on from the left.

First, processing is started from the root node 201a using the bit string "100010" as the search key. Because the discrimination bit position 230a of the root node 210a is 0, examining the bit value of the discrimination bit position 0 reveals 1. This being the case, 1 is added to the array element number 220a stored in the coupled node indicator and linking is done to the node 211b stored in the resulting array element number. Because 2 is stored in the discrimination bit position 231b of the node 211b, examination of the bit value of the discrimination bit position 2 reveals 0, resulting in linking to the node 210f stored in the array element having the array element number 221b stored in the coupled node indicator.

Because 5 is stored in the discrimination bit position 230f of the node 210f, and because examination of the bit value of the discrimination bit position 5 of the search key "100010" reveals 0, linking is done to the node 210g stored in the array element having the array element number 220f stored in the coupled node indicator.

Because the node type 260g of the node 210g is 1, indicating a leaf node, the index key 250g is read out and a comparison is performed with the search key, thereby revealing equality between the two, both of which are "100010". Searching is performed in this manner using the coupled node tree.

Next, the significance of the configuration of the coupled node tree will be described, with reference made to FIG. 2B.

The configuration of the coupled node tree is prescribed by a set of index keys. In the example of FIG. 2B, the discrimination bit position of the root node 210a is 0 because there is an index key having a 0 at the 0th bit and an index key having a 1 at the 0th bit in the index keys described in the embodiment example of FIG. 2B. The group of index keys having 0 at the 0th bit is classified under the node 210b, and the group of index keys having 1 at the 0th bit is classified under the node 211b.

That the discrimination bit position of the node 211b is 2 reflects a property of the index keys, this being that the 1st bits of all the nodes 211h, 210h, 211g, and 210g are the same value 0, a difference therebetween first occurring at the 2nd bit.

Similar to the case of the 0th bit, the cases of the 2nd bit being 1 are classified on the node 211f side, and the cases of the 2nd bit being 0 are classified on the node 210f side. Then because index keys having a 2nd bit that is 1 differ with regard to the 3rd bit, 3 is stored in the discrimination bit position of the node 211f, and because the 3rd and 4th bits of index keys having 0 as the 2nd bit are the same and differ at the 5th bit, 5 is stored in the discrimination bit position of the node 210f.

At the link target of the node 211f, because there is only one having a 3rd bit of 1 and one having a 3rd bit of 0, nodes 210h and 211h are leaf nodes, with "101011" and "101100" stored in the index keys 250h and 251h, respectively.

Even in the event that the index key set includes "101101" or "101110" in place of "101100", because there is equality with "101100" up until the 3rd bit, only the index key stored in the node 211h would change, there being no change in the structure of the tree itself. However, if "101101" is included in addition to "101100", the node 211h would become a branch node, the discrimination bit position thereof being 5. If the index key to be added is "101110", the discrimination bit position would be 4.

As described above, the coupled node tree structure is determined by the bit values of each bit position of the index keys included in the set of index keys.

To add to the above, because there is branching for each bit position having different bit values, meaning between a node that has a bit value of 1 and a node that has a bit value of 0, if the leaf nodes are traversed giving priority to the node [1] side and the tree depth direction, the index keys stored therewithin will be "101100" for the index key 251h of the node 211h, "101011" for the index key 250h of the node 210h, ..., and "000111" for the index key 250c of the node 210c, these being sorted in descending order.

That is, in a coupled node tree the index keys are disposed in the tree in a sorted sequence.

When searching using a search key, the index key is followed over a path disposed on a coupled node tree, and in the case, for example of a search key "101100" it is possible to reach the node 211h. As can be imagined from the above-noted description, even if the search key is made "101101" or "101110", the node 211h will be reached, and a comparison with the index key 251h will result in the failing to find for the identical index key.

Also, even in the case in which searching is done with "100100", in the link path of nodes 210a, 211b, and 210f, because the 3rd and 4th bits of the search key are not used and the 5th bit is 0, the node 210g will be reached, similar to the case searching with "100010". In this manner, the discrimination bit positions are used in accordance with bit makeup of the index keys stored in the coupled node tree to perform branching.

Figure 3A:
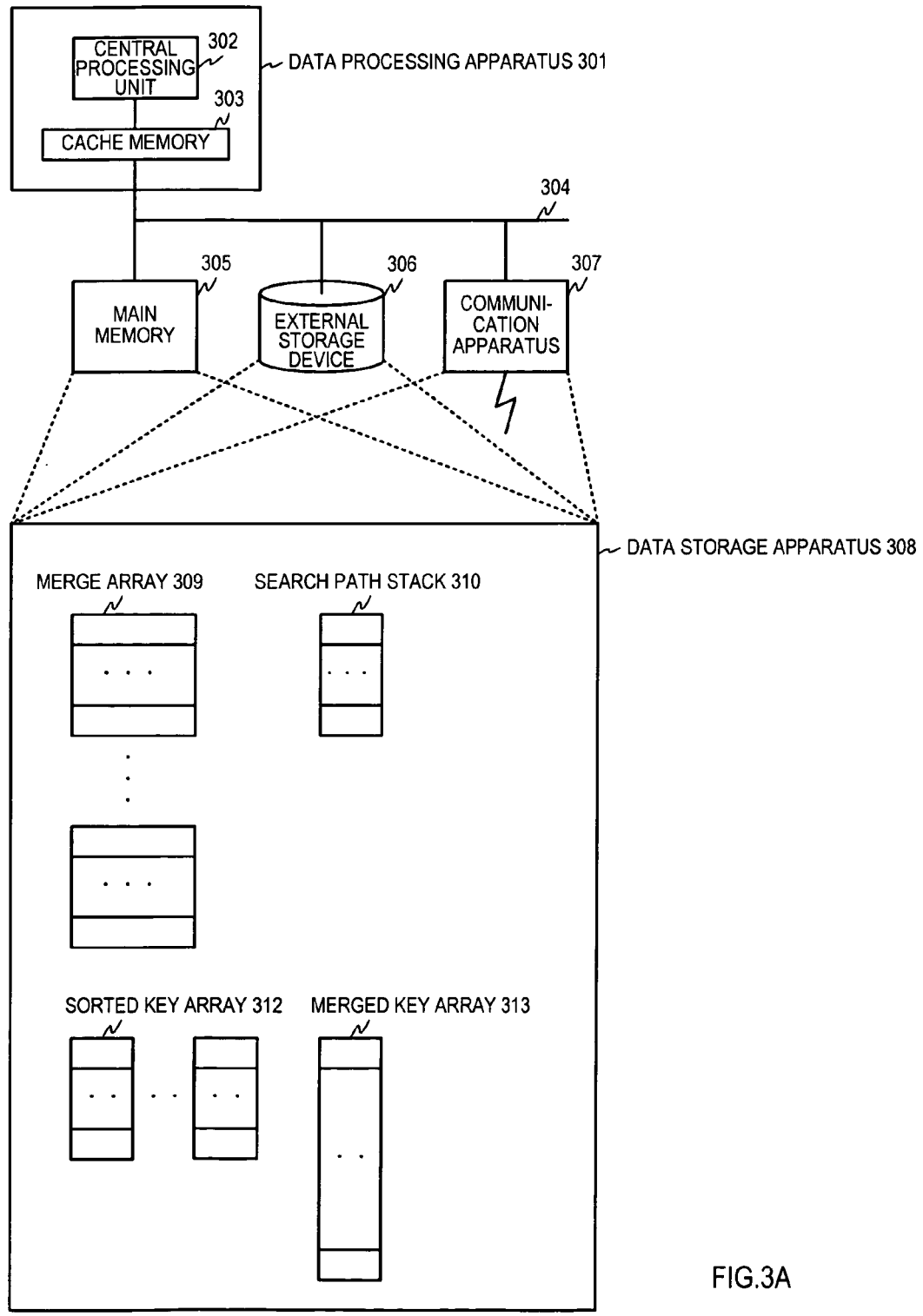
FIG. 3A is a drawing describing an exemplary hardware configuration for the first preferred embodiment of the present invention.

FIG. 3A is a drawing describing an example of a hardware configuration for a preferred embodiment of the present invention.

Merge sort processing in a preferred embodiment of the present invention is implemented by a data processing apparatus 301 having at least a central processing unit 302 and a cache memory 303, and using a data storage apparatus 308. The data storage apparatus 308, which has a merge array 309 into which is disposed a coupled node tree, a plurality of sorted key arrays 312 which hold keys that were sorted in the initial stage of merge sort processing, a merged key array 313 which holds keys that are merged and are sorted over all, and a search path stack 310, into which are stored array element numbers of nodes which are traversed during the search, can be implemented by a main memory 305 or a storage device 306, or alternatively, by using a remotely disposed apparatus connected via a communication apparatus 307.

In the example described in FIG. 3A, although the main memory 305, the storage device 306, and the communication apparatus 307 are connected to the data processing apparatus 301 by a single bus 304, there is no restriction to this connection method. The main memory 305 can be disposed within the data processing apparatus 301, and the search path stack 310 can be implemented as hardware within the central processing unit 302. It will be understood that it is alternatively possible to select appropriate hardware elements in accordance with the usable hardware environment and the size of the index key set, for example, having the array 309 held in the storage device 306 and having the search path stack 310 held in the main memory 305.

Also, although it is not particularly illustrated, a temporary memory area can of course be used to enable various values obtained during processing to be used in subsequent processing, depending on the processing to be done.

Figure 3B:
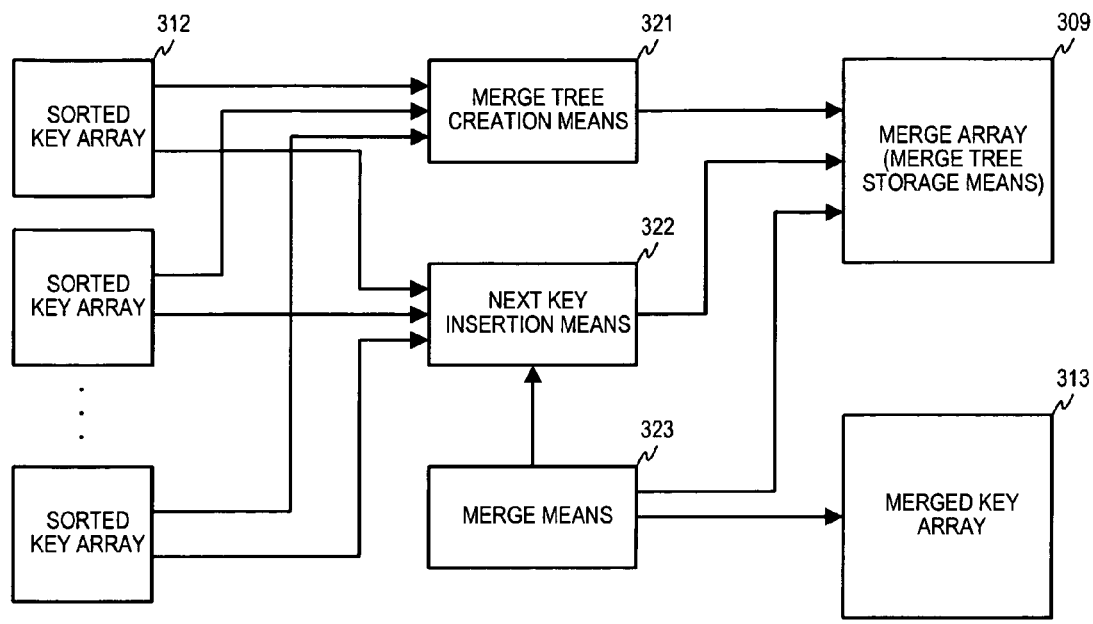
FIG. 3B is a drawing describing an exemplary functional block configuration of a merge sort apparatus related to the first preferred embodiment of the present invention.

FIG. 3B is a drawing describing an exemplary functional block configuration of a merge sort related to the first preferred embodiment of the present invention. As shown in the drawing, the merge sort apparatus consists of sorted key arrays 312 holding a plurality of sorted keys, a merge tree generating means 321 that extracts from each of sorted key arrays 312 the smallest or largest key as an index key while affixing a processing source identifier that identifies the sorted key array 312 from which the key was extracted, and generates coupled node trees for merging (merge trees), and stores the keys in the merge array (merge tree storage means) 309, a merge means 323 that writes out to the merged key array 313 a key that was obtained by a minimum value or maximum value search of the merge tree and deletes that key from the merge tree, and a next key insertion means 322 that extracts the next key from the sorted key array 312 that originally held the key that was just written out and inserts it into the merge tree. The arrows in the drawing show the access or data flow among the blocks.

Also, although the example shown in the drawing has an array as the area holding the data, it is not necessary to restrict the data storage area to an array.

Figure 4:
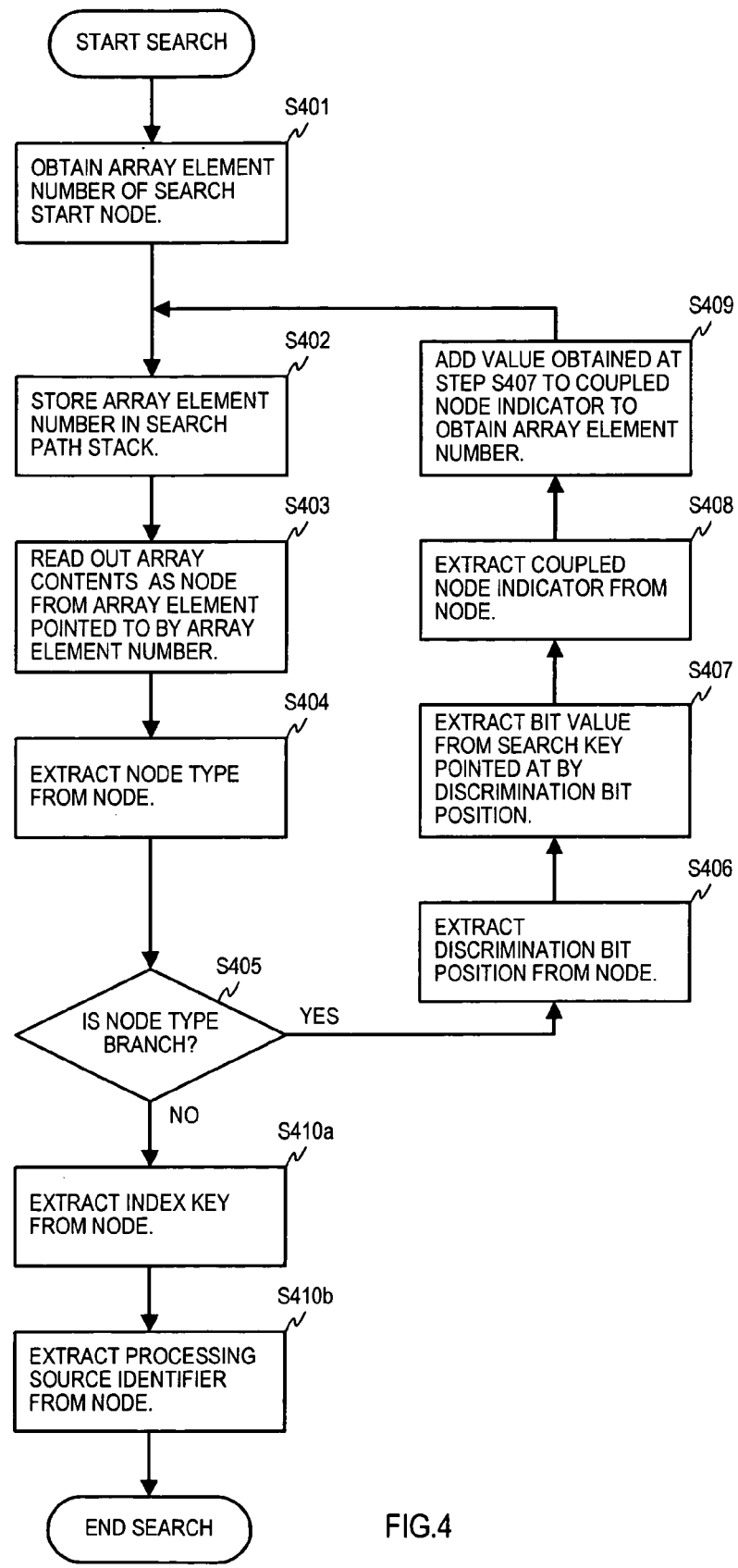
FIG. 4 is a flowchart showing the basic operations of a bit string search related to the first preferred embodiment of the present invention.

FIG. 4 is a flowchart showing the basic operations of a bit string search related to a preferred embodiment of the present invention. In comparison with the flowchart proposed in the above cited Japanese Patent Application 2006-293619 proposed by this applicant, a step to extract the processing source identifier stored in a leaf node is added.

First, at step S401, the array element number of the search start node is acquired. The array element corresponding to the acquired array element number holds an arbitrary node of the coupled node tree. The specification of the search start node is performing in various applied searches to be described below.

Although the array element number of the obtained search start node is set in an unillustrated search start node setting area, this search start node setting area, as was noted above, is one of the "temporary memory areas used to enable various values obtained during processing to be used in subsequent processing, depending on the processing to be done". In the description herein below, an expression like "is set in an unillustrated search start node setting area" is at times replaced by "obtain the array element number of the search start node", "set as the search start node", or "set in the search start node".

Next, at step S402, the obtained array element number is stored in the search path stack 310, and at step S403 the array element is read out as the node to be referenced corresponding to the array element number. Then, at step S404 the node type is extracted from the read-out node, and at step S405 a determination is made as to whether the node type indicates a branch node.

In the determination at step S405, if the read-out node is a branch node, processing proceeds to step S406, at which information regarding the discrimination bit position is extracted from the node and, at step S407 the bit value corresponding to the extracted discrimination bit position is extracted from the search key. Then, at step S408, the coupled node indicator is extracted from the node, and at step S409 the bit value extracted from the search key and the coupled node indicator are added, thereby obtaining a new array element number, at which point return is made to S402.

Thereafter, the processing from step S402 to step S409 is repeated until the determination at step S405 is that the node is a leaf node and processing proceeds to step S410a. At step S410a, the index key is extracted from the leaf node, and at step S410b the processing source identifier is extracted from the leaf node, and processing ends.

As was described above, it does not always happen that the index key extracted in step S410a coincides with the search key, but that means that an index key identical to the search key is not included in the coupled node tree. Even in that case, the index key extracted in step S410a can be used in various processing described later.

Figure 5A:
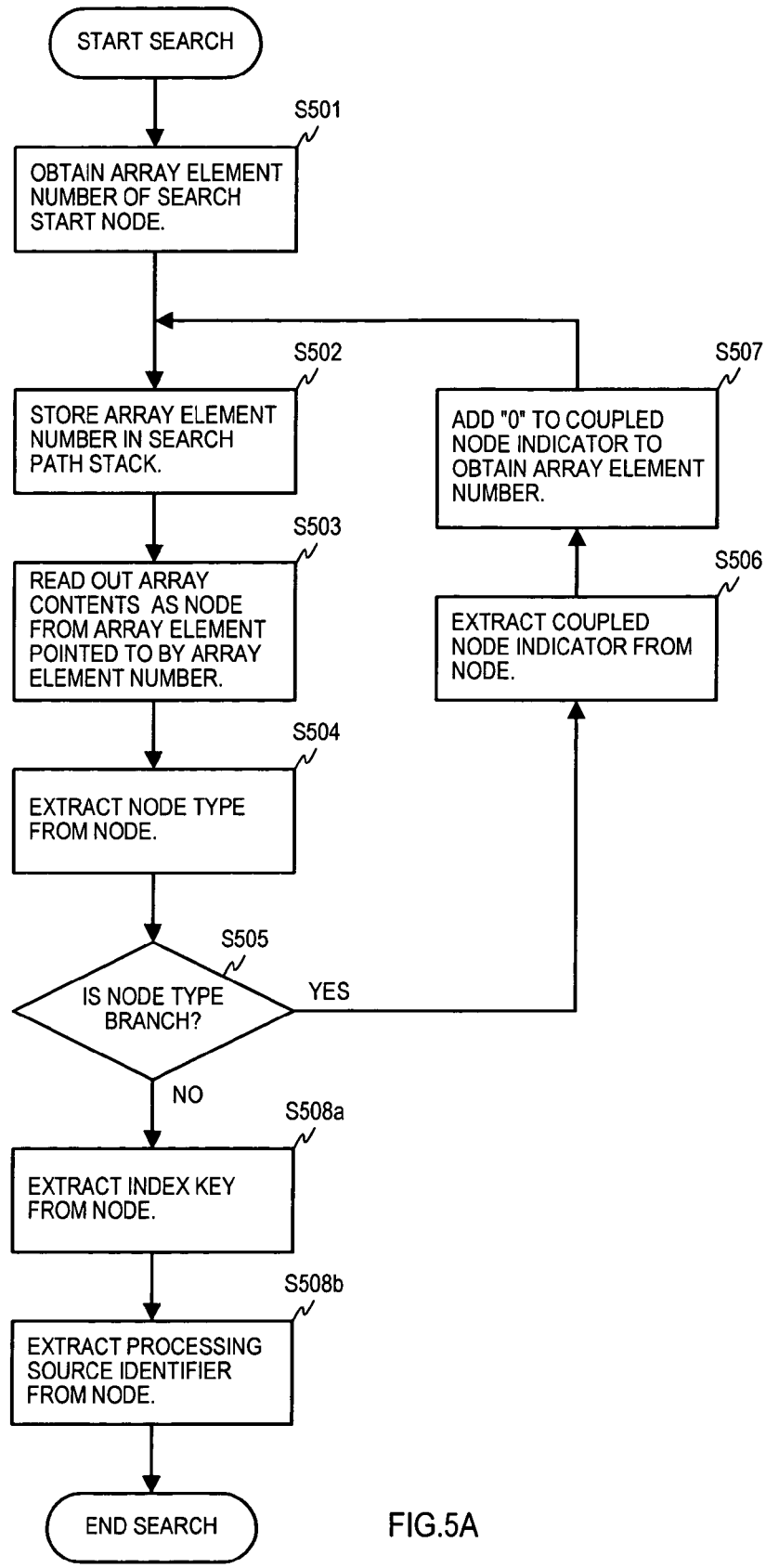
FIG. 5A is a flowchart showing the processing for obtaining the minimum value of the index keys stored in a coupled node tree.

FIG. 5A is a flowchart showing the processing for obtaining the minimum value of the index keys stored in a coupled node tree. In comparison with the flowchart proposed in the above cited Japanese Patent Application 2006-293619 proposed by this applicant showing the processing for obtaining the minimum value in a coupled node tree (including a subtree), a step to extract the processing source identifier stored in a leaf node is added.

First, the processing from obtaining the array element number of the search start node in step S501 to the determination of the node type in step S505 is the same as that in steps S401 to S405, respectively, of FIG. 4 described above.

When the determination of the node type in step S505 is that the node type is a branch node, processing proceeds to step S506, wherein a coupled node indicator of the array is extracted from the node, and at step S507, the value "0" is added to the extracted coupled node indicator, that result being used as a new array element number, and processing returns to step S502. Thereinafter, the processing of step S502 to step S507 is repeated until the determination in step S505 is that the node is a leaf node, and at step S508a, the index key is extracted from the leaf node, and at step S508b the processing source identifier is extracted from the leaf node, and processing is terminated.

In the processing shown in the above FIG. 5A, "0" is added to all of the coupled node indicators in order to traverse node [0]. In other words, in accordance with FIG. 5A the node that is the link target is always made node [0] of the node pair, and branching is done in the direction of nodes holding index keys with ever smaller values. In this way, as was described earlier, the smallest index key in the coupled node tree, which has a tree configuration that is a linearly arranged configuration, can be extracted.

Figure 5B:
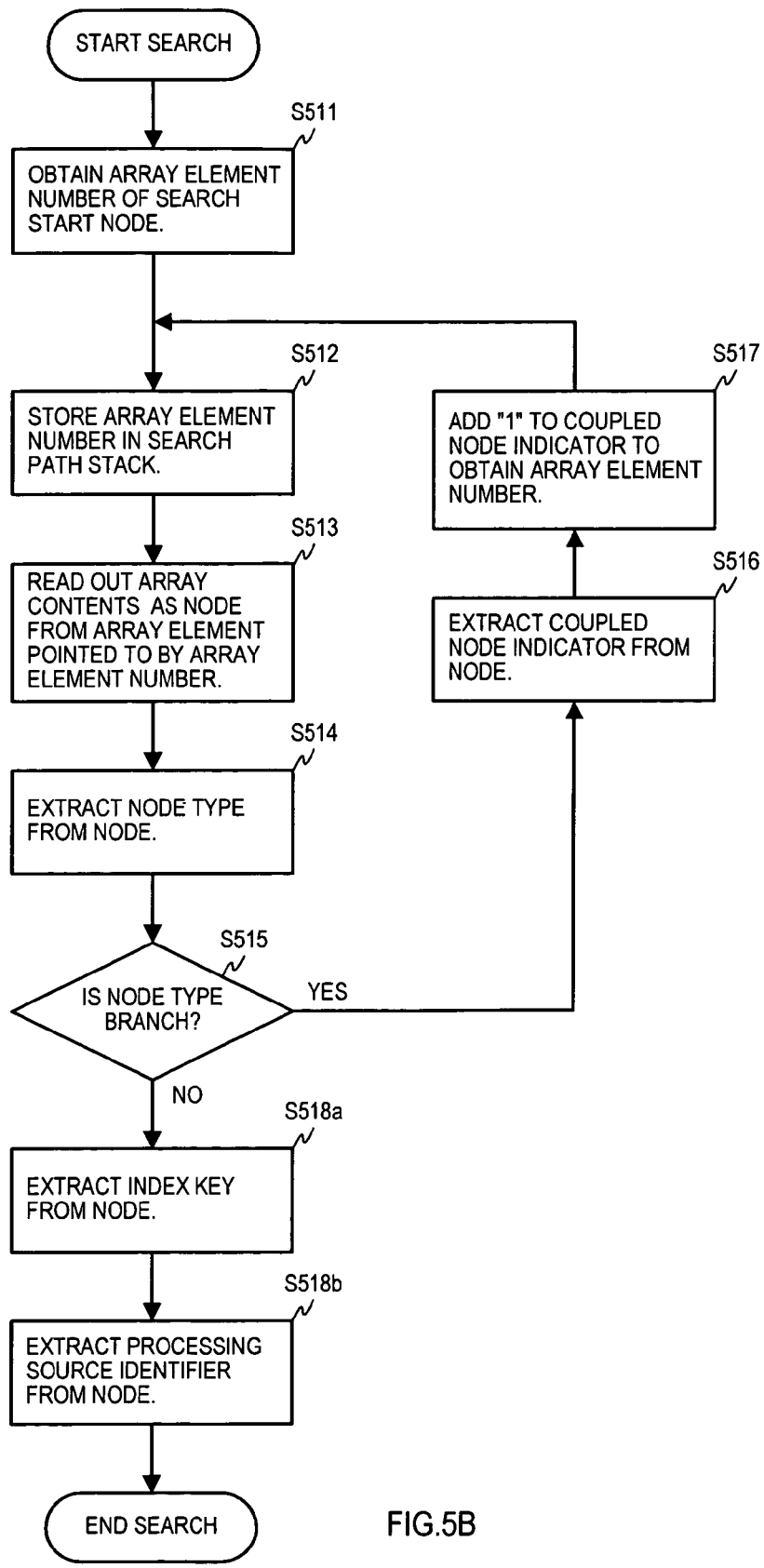
FIG. 5B is a flowchart showing the processing for obtaining the maximum value of the index keys stored in a coupled node tree.

FIG. 5B is a flowchart showing the processing for obtaining the maximum value of the index keys stored in a coupled node tree related to a preferred embodiment of this invention. In comparison with the flowchart proposed in the above cited Japanese Patent Application 2006-293619 proposed by this applicant showing the processing for obtaining the maximum value in a coupled node tree (including a subtree), a step to extract the processing source identifier stored in a leaf node is added.

The processing to obtain a maximum value of the index keys to be described hereinafter is equivalent to traversing the nodes [1] from the search start node to a leaf node. Hereinafter, the process to obtain the largest of the index keys in an arbitrary subtree is described by comparing the process with the above process to obtain the smallest of the index keys and focusing on the points of difference.

In the series of steps shown in FIG. 5B, the processing from step S511 to step S516 and from step S518a to step S518b corresponds to the processing from step 501 to step S506 and from step S508a to step S508b, respectively, in FIG. 5A, and executes an analogous processing. The point differing with the processing to obtain the minimum value in FIG. 5A is that the value "1" is added to the coupled node indicator in step S517. In this way, linking is always made to the node [1] of the node pair expressed by the coupled node indicator, and by repeating successively the steps S512 to S517 until a leaf node is reached, the maximum value of the index keys can be obtained.

As shown in FIG. 4, FIG. 5A, and FIG. 5B, when executing the basic operations of searching for an index key or the search processing for a minimum value or maximum value of the index keys, the array element numbers of the array elements accessed are successively stored in the search path stack 310.

Also, in the search processing for a minimum value or maximum value of the index keys shown in the above FIG. 5A and FIG. 5B, the coupled node tree was described as being stored in an array but there is no necessity for it to be stored in an array, and it clear that search processing for a minimum value or maximum value of the index keys can be enabled by linking to, of the two nodes configuring a node pair, only the primary node or only the node that is arranged in a memory area adjacent to the primary node.

Figure 6A:
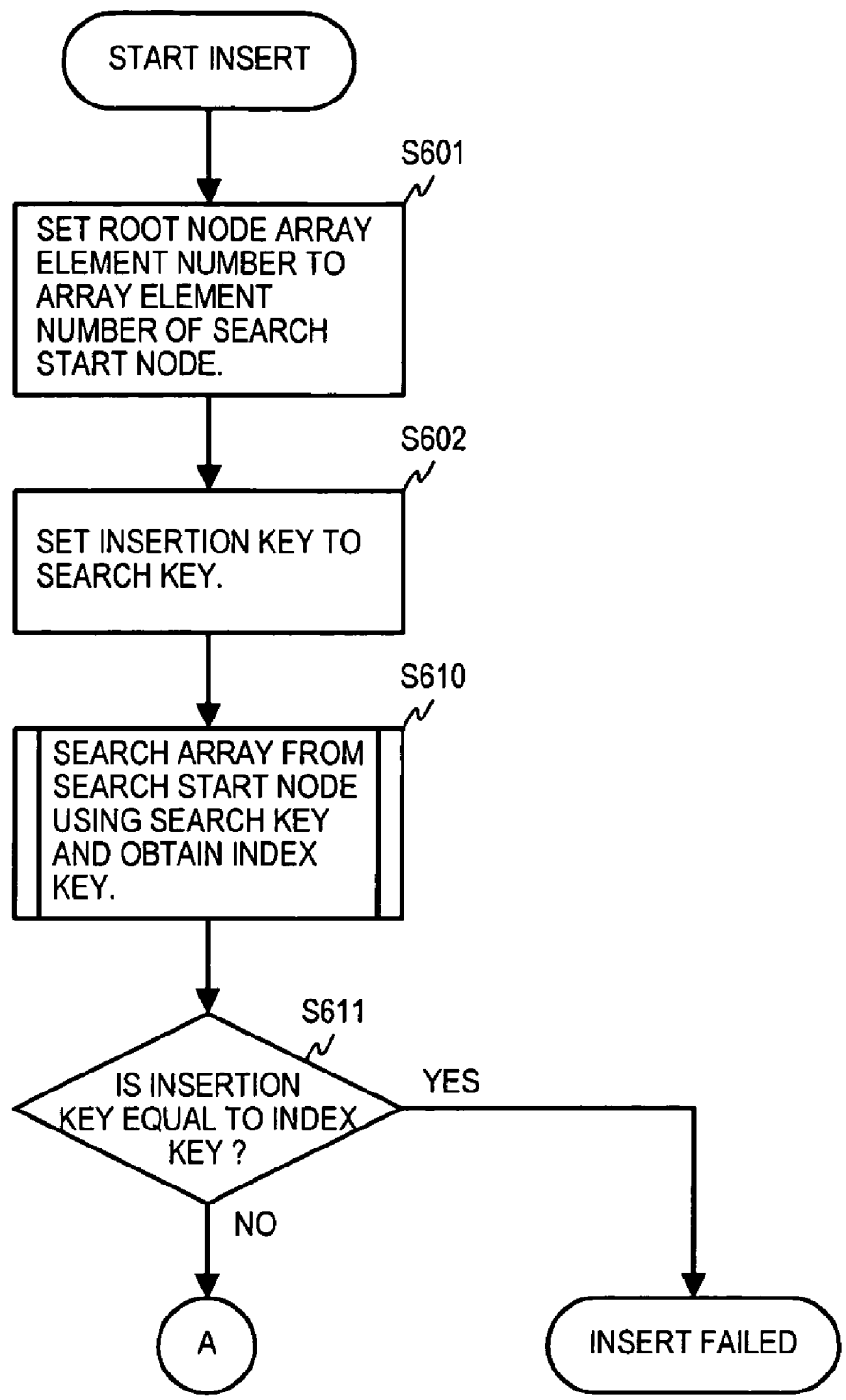
FIG. 6A is a drawing showing the processing flow for the search processing that is the first stage of insertion processing related to the first preferred embodiment of this invention.
Figure 6B:
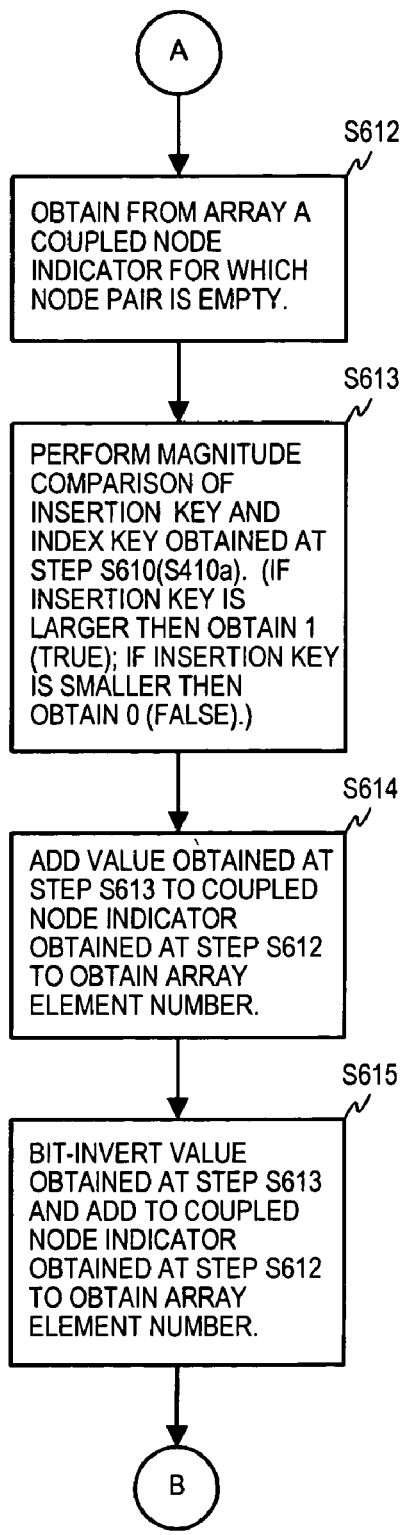
FIG. 6B is a processing flow diagram describing the processing to prepare array elements for the node pair to be inserted, related to the first preferred embodiment of this invention.
Figure 6C:
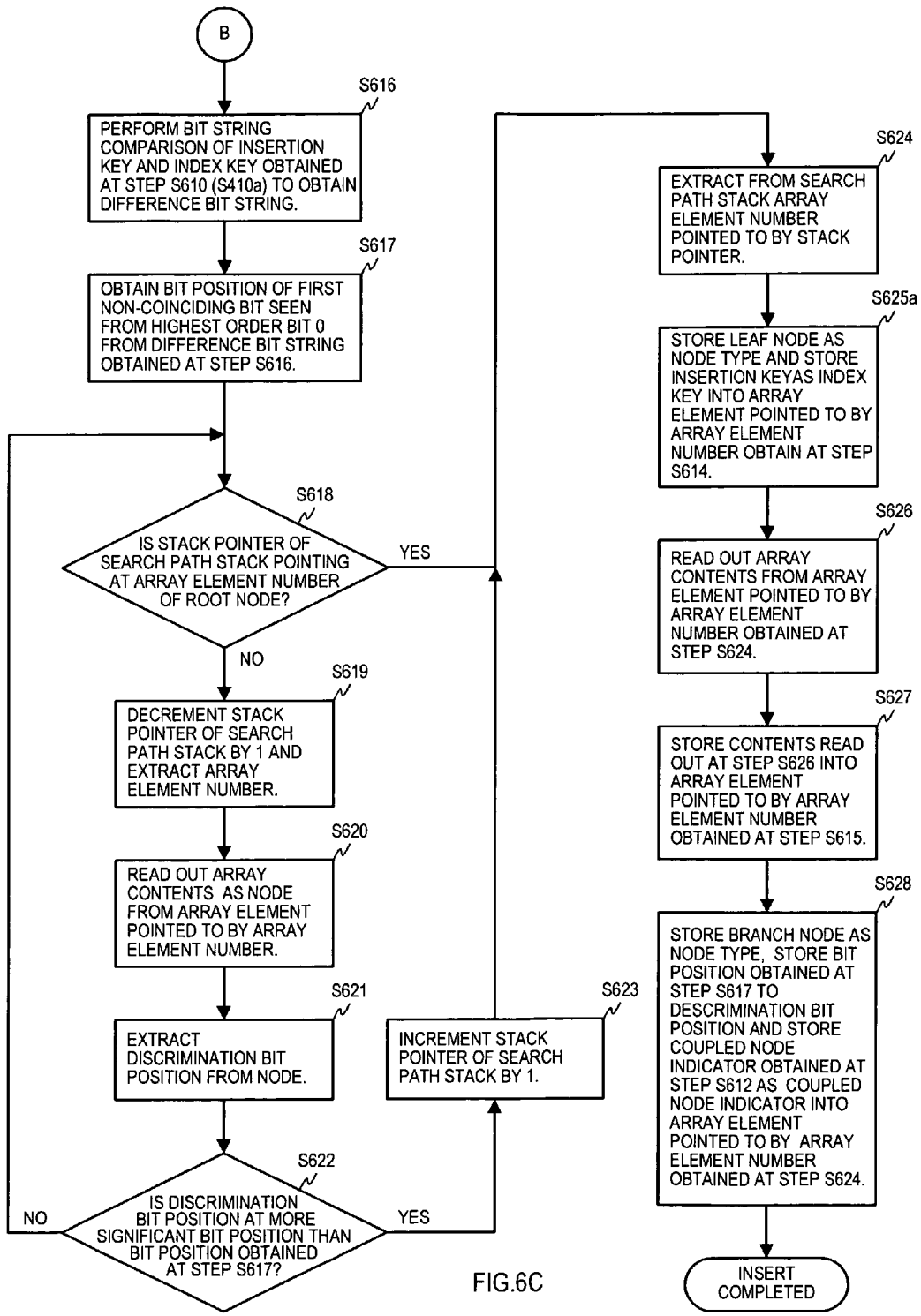
FIG. 6C is a drawing showing the processing flow that completes the insertion processing by obtaining the insertion position of a node pair and storing the contents of each node of the node pair.

Next, the node insertion processing in the coupled node tree, related to a preferred embodiment of this invention, will be described, referring to FIG. 6A to FIG. 6C and FIG. 7. FIG. 6A to FIG. 6C describe the usual insertion processing, and FIG. 7 describes the processing for insertion of a root node. By root node insertion processing and usual insertion processing, because a coupled node tree is generated, the description of the node insertion processing is also a description of the processing to generate a coupled node tree.

If a comparison is made with the node insertion processing in a coupled node tree proposed in Japanese Patent Application 2006-187872, filed by the applicant of the present invention, this invention differs in the point that a processing source identifier, which identifies the sorted key array from which a given insertion key was extracted, is stored in the same leaf node in which that insertion key is stored as the index key.

FIG. 6A is a drawing showing the processing flow for search processing, which is the first stage of insertion processing, this corresponding to the using of an insertion key as a search key in the search processing shown in FIG. 4.

In step S601, the array element number of the root node is set in the area for setting the array element number of the search start node, and in step S602, the insertion key is set in the search key. Next in step S610, the search processing shown in FIG. 4 is executed and an index key is obtained, and processing proceeds to step S611.

In step S611, the insertion key and the index key obtained in step S610 are compared and if they coincide the insertion fails because the insertion key already exists in the coupled node tree, and processing is terminated. If they do not coincide, processing proceeds to the next processing, that of step S612 and thereafter in FIG. 6B.

FIG. 6B is a processing flowchart describing the processing to prepare an array element number for a node pair to be inserted. At step S612, an empty node pair is obtained from the array, and the array element number of the array element to be made the primary node is acquired from the node pair.

Proceeding to step S613, a magnitude comparison is performed between the insertion key and the index key acquired at step S610 and, in the case in which the insertion key is larger, the Boolean value 1 is obtained, but if the insertion key is smaller, the Boolean value 0 is obtained. Proceeding to step S614, the Boolean value obtained at step S613 is added to the array element number of the primary node obtained at step S912 to obtain an array element number.

Proceeding to step S615, the logical negation value of the Boolean value obtained at step S613 is added to the array element number of the primary node obtained at step S612 to obtain an array element number.

The array element number obtained at step S614 is the array element number of the array element into which a leaf node having the insertion key as an index key is stored, and the array element number obtained at step S615 is the array element number into which a branch node or a leaf node that formed a pair with that leaf node is stored.

That is, by means of the magnitude relationship between the index key stored in the leaf node obtained by the first stage of search processing and the insertion key, a determination is made of into what node of the node pair to be inserted the branch node holding the insertion key is to be stored.

For example, in the case in which "011011" is to be inserted into the coupled node tree of FIG. 2B, the index key resulting from the search is the "011010" that is stored in node 211d. A Boolean value is obtained by performing a magnitude comparison between the insertion key "011011" and the index key "011010" stored in the node 211d, and, in this example, because the insertion key is larger, the Boolean value 1 is obtained, so that the leaf node that holds the insertion key is stored in an array element having an array element number obtained by adding 1 to the coupled node indicator of the node pair to be inserted. The index key "011010" is stored in an array element having an array element number obtained by adding the logical negation value of the Boolean value obtained by the magnitude comparison to the coupled node indicator.

When this is done, because the index key "011010" and the insertion key "011011" differ at the 5th bit, the node 211d is a branch node, with a discrimination bit position of 5, whose coupled node indicator is the array element number of a primary node of the node pair to be inserted.

In the case also in which "011001" is to be inserted into the coupled node tree of FIG. 2B, the index key resulting from the search is "011010" that is stored in node 211d. In this case, because the insertion key is smaller, the Boolean value 0 is obtained, so that the leaf node that holds the insertion key is stored in an array element having an array element number obtained by adding 0 to the coupled node indicator of the node pair to be inserted. Then, because the index key "011010" and the insertion key "011001" differ at the 4th bit, the node 211d is a branch node with a discrimination bit position of 4, whose coupled node indicator is the array element number of a primary node of the node pair to be inserted. Next, processing proceeds to the processing of step 5616 and thereafter in FIG. 6C.

FIG. 6C is a drawing showing the processing flow of storing a node in the array prepared as shown in FIG. 6B, determining the insertion position therein, and changing the contents of an existing node to complete to the insertion processing.

The processing from step S616 to step S623 is processing to determine the position on the coupled node tree for insertion of a node pair, and the processing of step S624 and thereafter is processing for setting data in each node and completing the insertion processing.

At step S616, a bit string comparison, for example an exclusive-OR, is performed between the insertion key and the index key obtained at step S910 so as obtain a difference bit string.

Proceeding to step S617, from the difference bit string obtained at step S616 the first bit position starting from the most-significant 0th bit at which there is a non-coincidence is obtained. This processing can be performed by, for example, a CPU having a priority encoder, the difference bit string being input thereto and the difference bit position being obtained. It is alternatively possible to perform the equivalent processing using software, to obtain the first bit position at which there is non-coincidence.

Next, proceeding to step S618, a determination is made as to whether the stack pointer of the search path pointer is pointing at the array element of the root node. If it is, processing proceeds to step S624, but if it is not processing proceeds to step S619.

At step S619, the stack pointer of the search path stack is decremented by 1, and the array element number stacked at that point is extracted.

Proceeding to step S620, the array element at the array element number extracted at step S619 is read out as a node.

Proceeding to step S621, the discrimination bit position is extracted from the node read out at step S620.

Next, proceeding to step S622, a judgment is made as to whether the discrimination bit position read out at step S621 is of higher order than the bit position obtained at step S617. In this case, the term higher order means more to the left in the bit string, that is, having a lower bit position value.

If the result of the judgment at step S622 is negative, return is made to step S618, and repetition is done until either the judgment at step S618 is affirmative or the judgment at step S622 is affirmative. When an affirmative judgment results at step S622, at step S623 the stack pointer of the search path stack is incremented by 1, and processing proceeds to the processing of step S624 and thereafter.

In the above-described processing at step S616 to step S623, in order to determine the position of insertion of a node pair, a bit string comparison is performed between the index key that is to be inserted and index key obtained by searching, and then a check is made of the relative positional relationship between the leading (most significant) bit position at which the bit value is different in the bit string comparison and the discrimination bit positions of the branch nodes for which array element numbers are stored in the search path stack. The next branch node link target of the branch node at which the discrimination bit position is a more significant is made the insertion position for the node pair to be inserted.

For example, when inserting "111000" into the coupled node tree of FIG. 2B, the index key resulting from the search is the "101011" stored in the node 210h. A bit string comparison between the insertion key "111000" and the index key "101011" stored in the node 210h obtains the bit position 1 as the most significant bit position of a bit value that is different. The search path stack is successively traversed in reverse until the relative position relationship between the obtained bit position 1 and the discrimination bit position of the branch node stored in the array element having an array element number stored in the search path stack is such that the discrimination bit position is more significant, so that the root node 210a is reached. At that point the search path stack pointer is incremented by 1 to obtain the array element number of the node 211b. The insertion key "111000" is inserted into the link target of the node 211b.

If the root node is reached by traversing the search path stack in reverse but the discrimination bit position of the root node is not a bit position that is more significant than the bit position of the most significant bit having a different bit value in the previously determined bit string comparison, this is the case in which at the upper-order bit of the index key of the coupled node tree the bits that are more significant than the discrimination bit position of the root node all have equal values. This means that in the index key to be inserted, there is for the first time a bit value that differs by the value of a bit that is in a higher level position than the discrimination bit position of the root node. Therefore, the node pair to be inserted becomes the direct link target of the root node, and the discrimination bit position of the root node changes to the position of the most significant bit of the insertion key, which differs in value from the existing index key.

Next, the processing of step S624 and thereafter, which is the processing to set data at each node and complete the insertion processing, will be described.

At step S624, the array element number that is pointed to by the stack pointer of the search path stack is extracted.

At step S625a, 1 (leaf node) is stored in the node type of the array element pointed to by the array element number obtained at step S614 and the insertion key is stored in the index key. Also the processing source identifier that identifies the sorted key array from which the insertion key was extracted is stored.

Proceeding to step S626, the array element at the array element number obtained at step S624 is read out from the array.

Next, at step S627, the contents read out at step S626 are stored in the array element having the array element number obtained at step S615.

Finally, at step S628, 0 (branch node) is stored in the node type of the array element pointed to by the array element number obtained in step S624, the bit position obtained at step S617 is stored in the discrimination bit position, and the array element number obtained at the step S612 is stored in the coupled node indicator, and processing is terminated.

In the above-described example of inserting "111000" into the coupled node tree of FIG. 2B, the contents of node 211b are written into the node [0] of the empty node pair that has been obtained (step S627) and the node [1] thereof is made a leaf node that holds "111000" (step S625). Then the bit position 1 of the most significant bit, that is, the bit value that differs in the bit string comparison, is stored in the discrimination bit position of the node 211b, and the array element number of the array element in which is stored the primary node of the obtained node pair is stored into the coupled node indicator (step S628).

Figure 7:
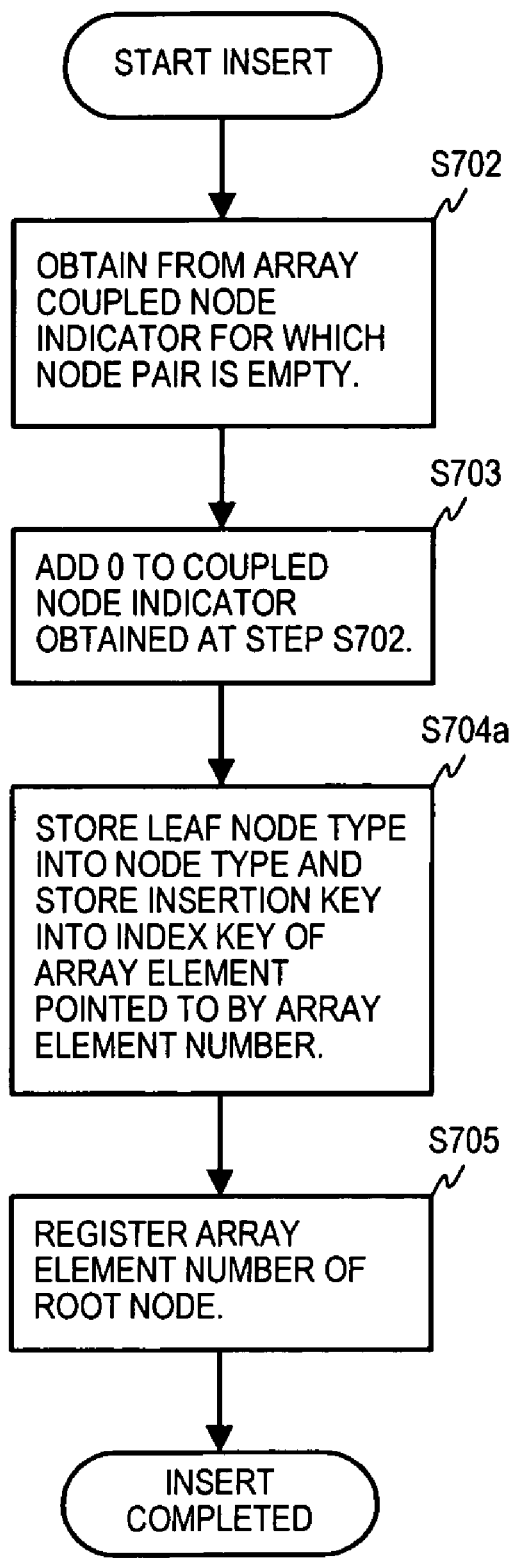
FIG. 7 is a processing flow diagram describing root node insertion processing related to the first preferred embodiment of this invention.

FIG. 7 is a drawing describing the processing of creating a new coupled node tree and registering it, that is, the process of inserting a root node, related to a preferred embodiment of this invention.

First, at step S702, an empty node pair is obtained from the array, and the array element number of the array element to be made the primary node is acquired from the node pair. Next at step S703, the array element number is determined by adding 0 to the array element number obtained at step S702. (In actuality, this is equal to the array element number obtained at step S702).

Further, at step S704, 1 (leaf node) is stored in the node type of the root node of the array element having the array element number obtained at step S703, an identifier of the sorted key array from which the insertion key is extracted is stored in the processing source identifier, and the insertion key is stored in the index key, and at step S706 the array element number of the root node obtained at step S702 is registered and processing is terminated.

As described above, it will be understood that when there is a set of index keys, the index keys are successively extracted therefrom, and the processing of FIG. 7 and FIG. 6A to FIG. 6C is repeated so as to enable the creation of a coupled node tree according to the present invention corresponding to the set of index keys.

Next, referring to FIG. 8A and FIG. 8B, the processing flow will be described for deleting a specific index key from a set of index keys associated with a coupled node tree, related to a preferred embodiment of this invention.

Figure 8A:
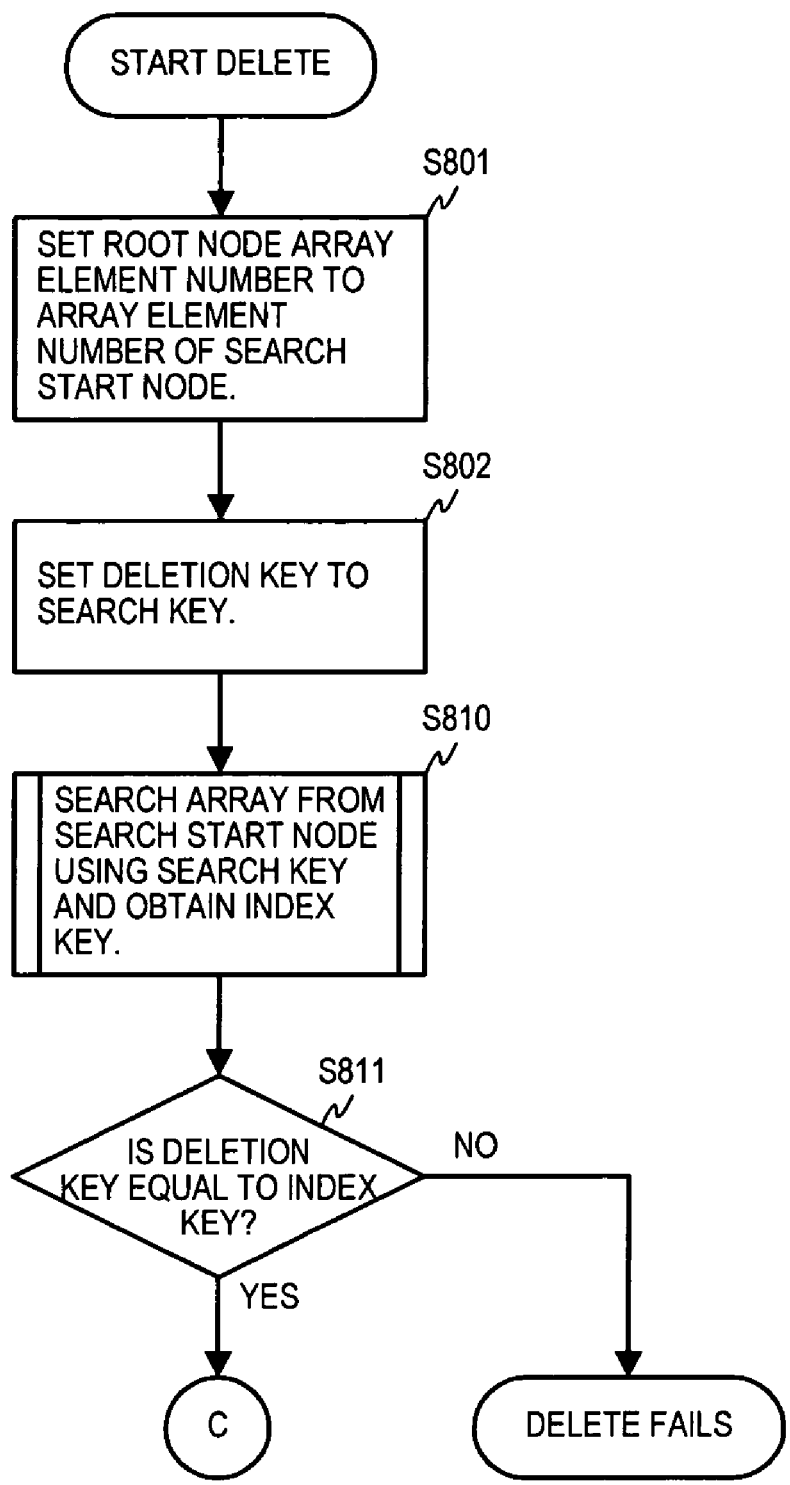
FIG. 8A is a drawing showing the processing flow for the search processing that is the first stage of deletion processing related to the first preferred embodiment of this invention.

FIG. 8A is a drawing showing the processing flow for search processing, which is the first stage of deletion processing, this corresponding to the using of a deletion key as the search key in the searching processing shown in FIG. 4. Step S1101 corresponds to S401 of FIG. 4 wherein the search start node is the root node and the deletion key is the search key.

In step S801, the array element number of the root node is set in the area for setting the array element number of the search start node, and in step S802, the deletion key is set in the search key.

Next, in step S810, the search processing shown in FIG. 4 is executed, and an index key is obtained as the search result, and processing proceeds to step S811.

In step S811, the deletion key and the index key are compared and if they do not coincide the deletion fails because the key to be deleted does not exist in the coupled node tree, and processing is terminated. If they do coincide, processing proceeds to the next processing, that of step S812 and thereafter in FIG. 8B.

Figure 8B:
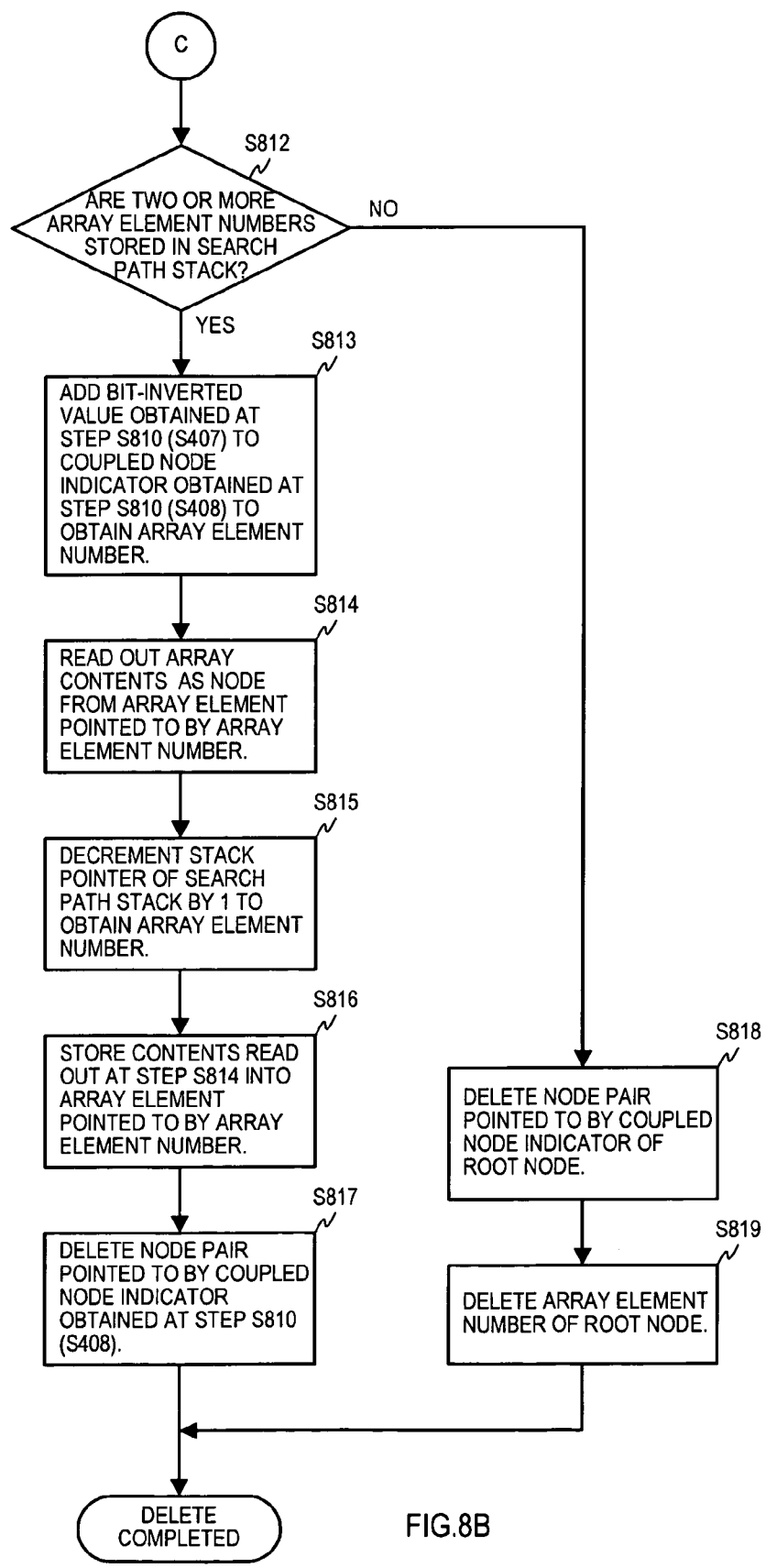
FIG. 8B is a drawing describing the latter stage of deletion processing related to the first preferred embodiment of this invention.

FIG. 8B is a drawing describing the processing flow of the latter stage of the deletion processing.

First, at step S812, a judgment is made as to whether or not there are at least 2 array element numbers on the search path stack. Stated differently, the condition in which there are fewer than 2 array element numbers is the one in which there is only 1, this being the array element number of the array element in which the root node is stored. In this case, processing proceeds to step S818, at which the node pair of the array element number of the root node obtained at step S801 is deleted. Next, proceeding to step S819, the array element number of the root node that had been registered is deleted, thereby completing the processing.

If at step S812 the judgment is made that there are two or more array element numbers stored in the search path stack, processing proceeds to step S813, at which an array element number is obtained by adding the inversion of the value obtained at step S407 to the coupled node indicator obtained at step S408, both steps being executed in the search processing performed at step S810. This processing is performed to determine the array element number of a node that forms a pair with a leaf node at which is stored the index key to be deleted.

Next, at step S814, the contents of the array element having the array element number obtained at step S813 are read out, and at step S815 the stack pointer of the search path stack is decremented by 1 and the array element number is extracted.

Next, at step S816, the contents of the array element having the array element read out at step S814 are written over the array element having the array element number obtained at step S815. This processing replaces the branch node that is the link source to the leaf node in which the index key to be deleted with the above-noted node that forms a pair with the leaf node.

Finally, at step S817, processing is completed by deleting the node associated with the coupled node indicator obtained in step S408 which is executed in the search processing performed at step S810.

The above was a description of the art related to a coupled node tree that is used in the merge sort of a preferred embodiment of this invention.

Figure 9:
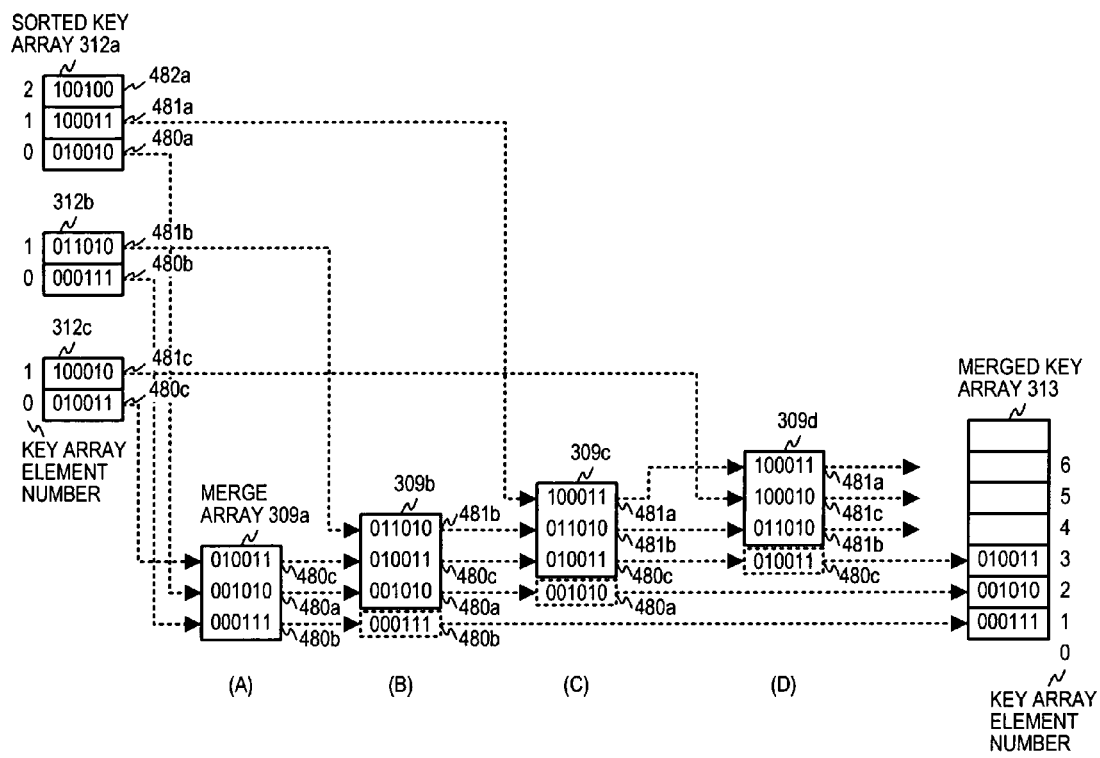
FIG. 9 is a drawing describing in general an implementation example 1.
Figure 9:
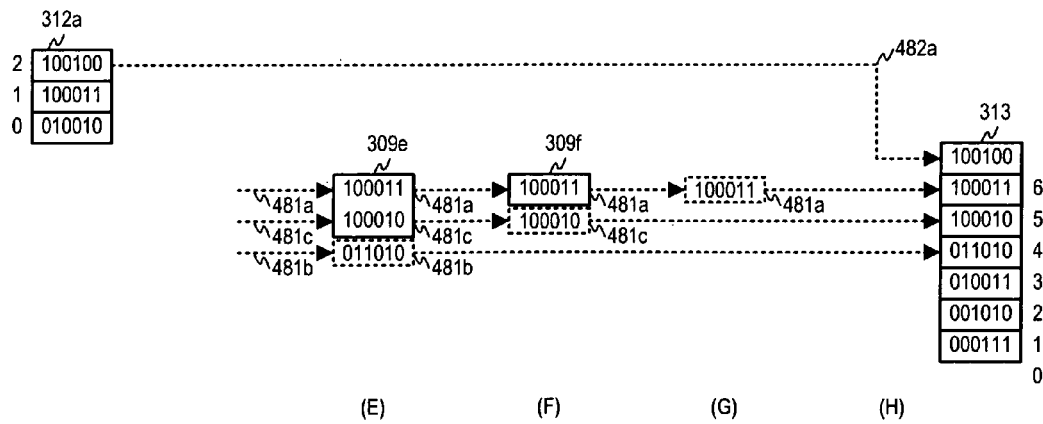

Next, referencing FIG. 9 to FIG. 11F, implementation example 1 of this invention using the coupled node tree related to the first preferred embodiment of this invention is explained. FIG. 9 is a drawing describing in general this implementation example. Section (1) of FIG. 9 describes the prior stage of merge processing and section (2) of FIG. 9 describes the latter stage.

In the example shown in section (1) of FIG. 9, in sorted key array 312a, the key 480a with the value "010010" is stored in the array element with the key array element number 0, the key 481a with the value "100011" is stored in the array element with the array element number 1, and the key 482a with the value "010010" is stored in the array element with the array element number 2. Also, in sorted key array 312b, the key 480b with the value "000111" is stored in the array element with the key array element number 0, the key 481b with the value "011010" is stored in the array element with the array element number 1, and in sorted key array 312c, the key 480c with the value "010011" is stored in the array element with the key array element number 0, the key 481c with the value "100010" is stored in the array element with the array element number 1. Furthermore, the codes (A) to (H) in the illustration indicate each of the steps of the merge processing.

With respect to steps (A) to (D) in section (1) of FIG. 9, the steps (E) to (H) in section (2) of FIG. 9 show the latter stage of merge processing.

In the first step, step (A), the minimum values 480a, 480b, and 480c are extracted from the sorted key arrays 312a, 312b, and 312c respectively and are stored in the merge array 309a.

In the next step, step (B), the key 480b that is the minimum value of the keys stored in merge array 309a is stored in the array element with the key array element number 0 in merged key array 313 and that key 480b is deleted from merge array 309a. Then, the key 481b that became the minimum value in sorted key array 312b after the key 480b was originally extracted is extracted from sorted key array 312b wherefrom the key 480b was originally extracted, and that value is inserted in merge array 309a, resulting in the merge array 309b.

In the next step, step (C), the key 480a that is the minimum value stored in merge array 309b is stored in the array element with the key array element number 1 in merged key array 313, and the key 480a is deleted from merge array 309b. Next, the key 481a that became the minimum value in sorted key array 312a after the key 480a was originally extracted is extracted from sorted key array 312a wherefrom the key 480a was originally extracted, and that value is inserted in merge array 309b, resulting in the merge array 309c.

In the next step, step (D), the key 480c that is the minimum value stored in merge array 309c is stored in the array element with the key array element number 2 in merged key array 313, and the key 480c is deleted from merge array 309c. The key 481c that became the minimum value in sorted key array 312c after the key 480c was originally extracted is extracted from sorted key array 312c wherefrom the key 480c was originally extracted, and that value is inserted in merge array 309c, resulting in the merge array 309d.

At this stage, as shown in section (1) of FIG. 9, the keys 480b "000111", 480a "001010", and 480c "010011" are stored in array elements with the key numbers 0 to 2 respectively in merged key array 313. Also, all the keys in sorted key array 312b and sorted key array 312c have been extracted, leaving only the non-extracted keys in sorted key array 312a.

Section (2) of FIG. 9 gives an example of the processing after all the keys have been extracted from a sorted key array of the processing source.

At step (E), the key 481b that is the minimum value stored in merge array 309d is stored in the array element with the key array element number 3, and that value, key 481b, is deleted from merge array 309d, resulting in merge array 309e.

Next, at step (F) the key 481c that is the minimum value stored in merge array 309e is stored in the array element with the key array element number 4, and that value, key 481c, is deleted from merge array 309e, resulting in merge array 309f.

In the next step, step (G), the key 481a that is the minimum value stored in merge array 309f is stored in the array element with the key array element number 5, and that value, key 481a, is deleted from merge array 309f, resulting in an empty merge array.

In the next step, step (H), the key 482a is extracted from sorted key array 312a which still has unextracted keys remaining and it is stored in the array element with key array element number 6 in merged key array 313, and merge sort is completed.

The merge arrays 309a to 309f described above have a data structure of the coupled node tree related to a preferred embodiment of this invention. Herein below is provided a detailed description of processing using a coupled node tree.

Also in the description below, a coupled node tree may be called a merge array or even just a tree. And, for sake of convenience, the merge arrays 309a to 309f were assigned different codes, but they are, of course, the same single merge array. The same applies to the merge arrays described below.

Figure 10A:
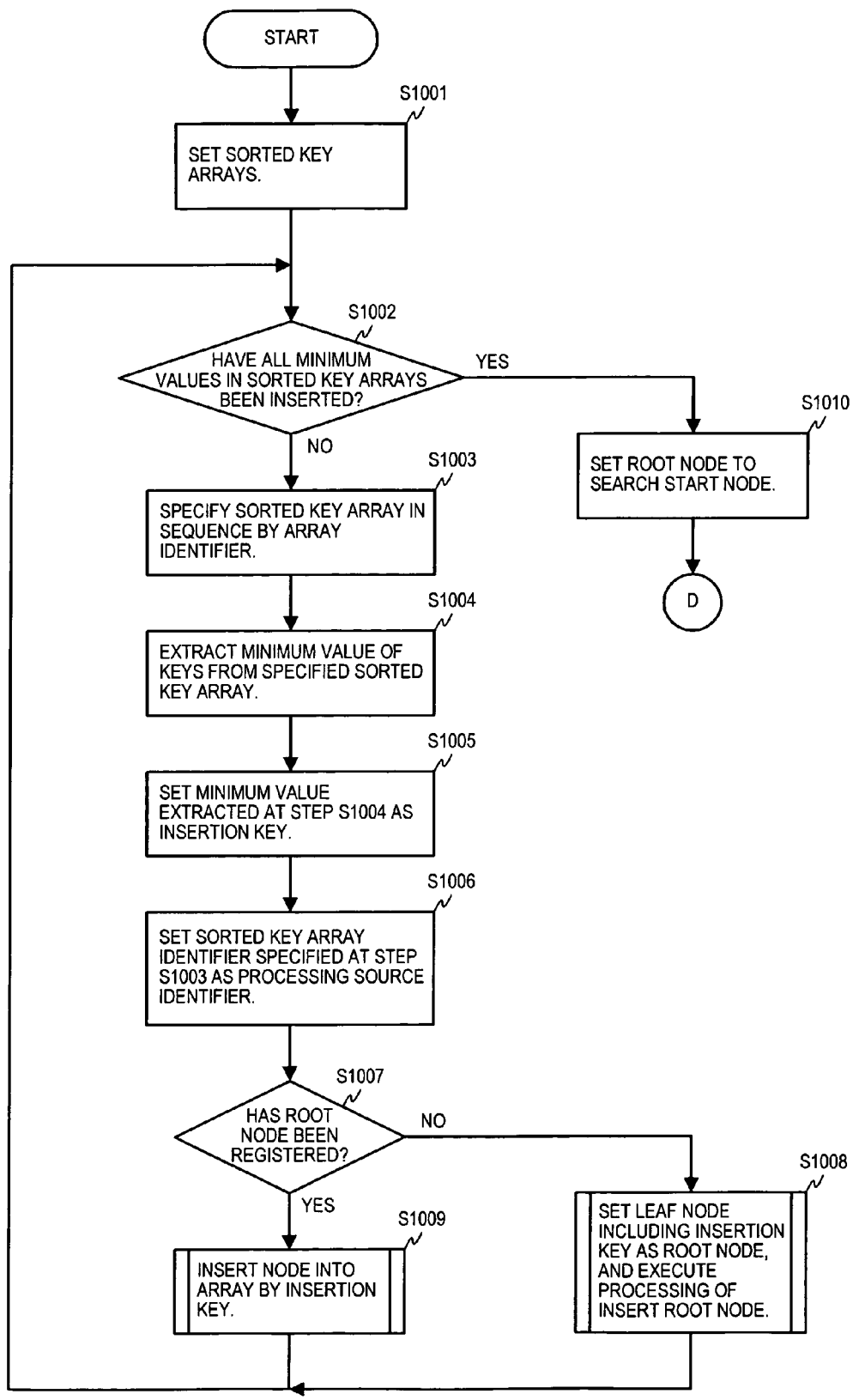
FIG. 10A is a drawing describing the initial processing of a merge sort using a coupled node tree in implementation example 1.
Figure 10B:
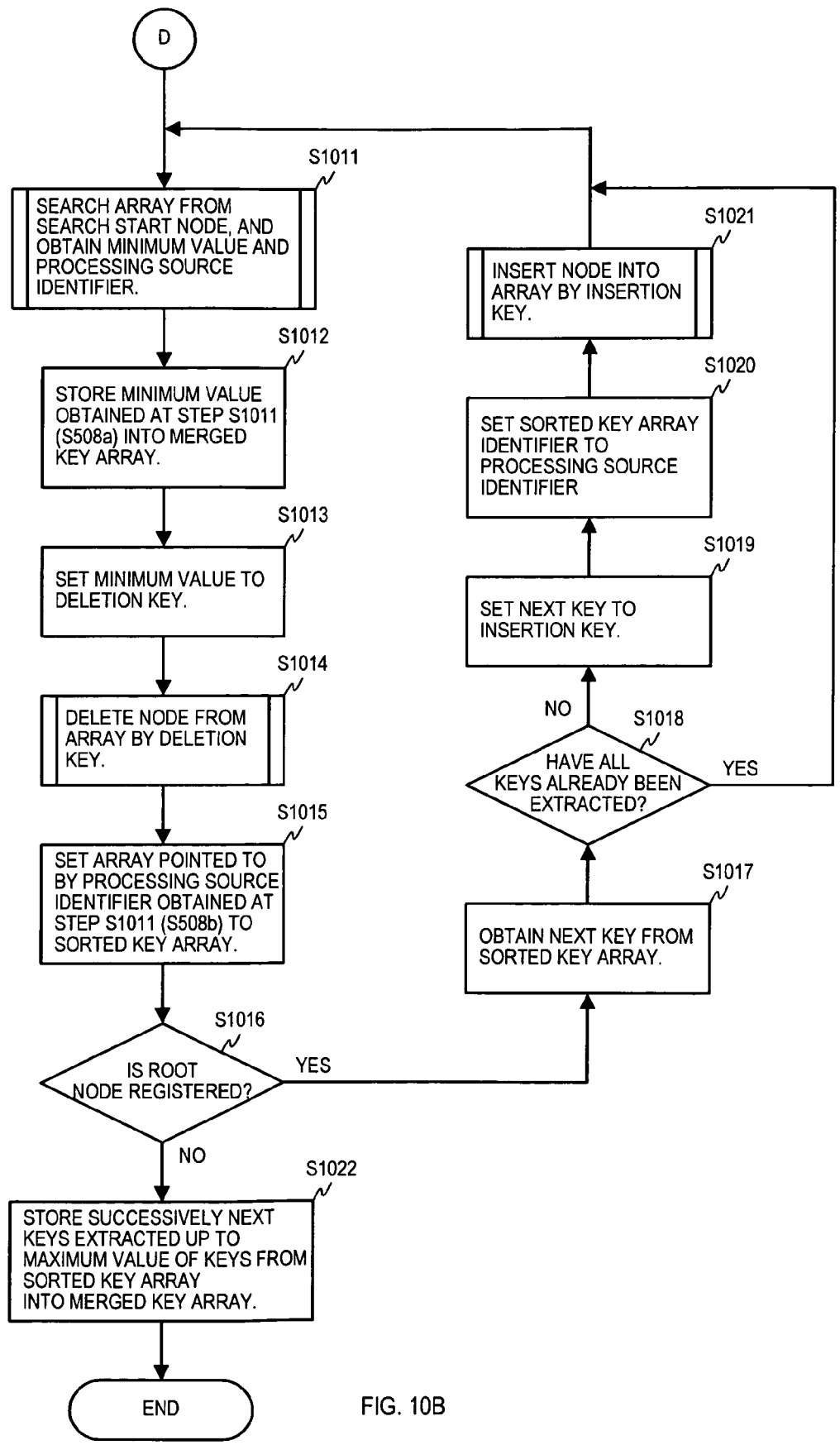
FIG. 10B is a drawing describing the processing to search for a minimum value in a coupled node tree and to execute a merge, in implementation example 1.

FIG. 10A and FIG. 10B are drawings describing the merge sort processing flow using a coupled node tree in implementation example 1.

FIG. 10A describes the initial processing from generating, for example, the merge array 309a shown in FIG. 9 so that it has the structure of a coupled node tree up until setting the array element number of the root node of the generated coupled node tree in the area for setting the array element number of the search start node. FIG. 10B is a drawing describing the processing of searching for a minimum value thereafter and merging it.

While making appropriate references to FIG. 9 and FIG. 11A to FIG. 11F, the processing flow of this implementation example is described using FIG. 10A and FIG. 10B.

As shown in FIG. 10A, in step S1001a sorted key array is set. At this time, the sorted key array is assumed to have been assigned an identifier. In the example shown in FIG. 9, the sorted key arrays 312a, 312b, and 312c are set. The sort method for setting each of the sorted key array can be arbitrarily chosen and there is no restriction on the choice.

Next, in step S1002, a determination is made whether all the minimum values in the sorted key arrays have been inserted in the coupled node tree. If they have been inserted, in step S1010, the array element number of the root node is set in the area for setting the array element number of the search start node, initial processing is completed, and processing proceeds to step S1011 and thereafter shown in FIG. 10B.

If insertion is not completed, processing proceeds to step S1003, wherein the sorted key arrays are specified in sequence by array identifier, and in step S1004 the minimum value of the keys is extracted from the specified sorted key array.

Next, in step S1005, the minimum value extracted in step S1004 is set as the insertion key, and at step S1006, the sorted key array identifier specified in step S1003 is set in the processing source identifier.

Figure 11A:
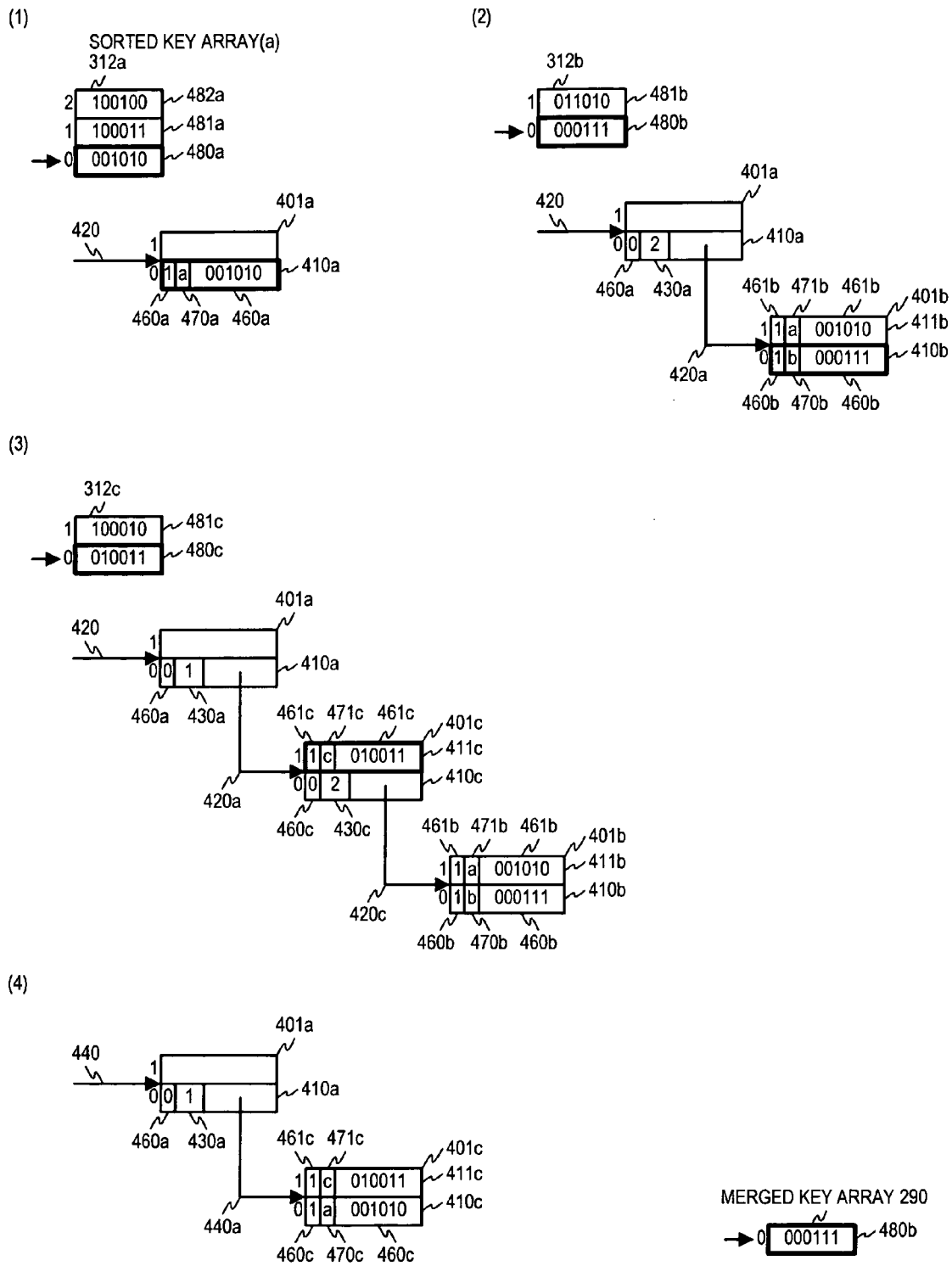
FIG. 11A is a first drawing describing in a coupled node tree the example shown in FIG. 9.

As exemplified in FIG. 11A (1), the sorted key array 312a is specified, and key 480a that is the minimum value, pointed to by the pointer shown by the arrow, is extracted and set in the insertion key, and the identifier "a" is set in the processing source identifier.

Next, proceeding to step S1007, a determination is made whether the root node has been registered. If it has not been registered, processing proceeds to step S1008, and the leaf node including the insertion key is made to be the root node, and the processing to insert a root node shown in FIG. 7 is executed, and processing returns to step S1002.

If it has been registered, processing proceeds to step S1009, wherein the insertion processing shown in FIG. 6A to FIG. 6C is executed and a node is inserted in the array by the insertion key and processing returns to step S1002.

In the example shown in FIG. 11A (1), the coupled node indicator 420 of the empty node pair 401a is obtained, and the root node 410a is stored in node [0]. The "1" that indicates a leaf node is stored in the node type 460a of root node 410a, the identifier "a" of sorted key array 312a is stored in the processing source identifier 471a, and the minimum value "001010" of sorted key array 312a is stored in index key 450a.

Also in the example shown in FIG. 11A (2), the sorted key array 312b is specified, and the key 480b that is the minimum value, pointed to by the pointer shown with an arrow, is extracted and set in the insertion key, and the identifier "b" is set in the processing source identifier. Then, leaf node 410b, which includes the value "000111" of key 480b as its index key, is inserted in the coupled node tree shown FIG. 11A (1).

The node type 460a of the root node 410a of the coupled node tree shown in FIG. 11A (2) is "0", its discrimination bit position 430a is "2", its coupled node indicator is the branch node 420a, and the node pair 401b pointed to by the coupled node indicator 420a is inserted. A "1" is stored in the node type 460b in node 410b, whose node position is node [0], a "b" is stored in its processing source identifier 470b, and "000111" is stored in its index key 450b, whereas the contents of the root node 410a of the coupled node tree shown in FIG. 11A (1) is copied into node 411b, whose node position is node [1].

In the example shown in FIG. 11A (3), the sorted key array 312c is specified, and the key 480c that is the minimum value, pointed to by the pointer shown by the arrow, is set in the insertion key, and the identifier "c" is set in the processing source identifier. Then, the leaf node 411c, which includes the value "010011" of the key 480c as its index key, is inserted in the coupled node tree shown in FIG. 11A (2).

The node type 460a of the root node 410a of the coupled node tree shown in FIG. 11A (3) is "0", its discrimination bit position 430a is "1", its coupled node indicator is the branch node 420a, and the node pair 401b pointed to by the coupled node indicator 420a is inserted. The contents of the root node 410a of the coupled node tree shown in FIG. 11A (2) is copied into node 410c, whose node position is node [0]. A "1" is stored in the node type 461c of node 411c, whose node position is node [1], a "c" is stored in its processing source identifier 471c, and "010011" is stored in its index key 451c. The contents of the node pair 401b pointed to by the coupled node indicator 420c of node 410c is the same as the contents of node pair 401b shown in FIG. 11A (2).

The coupled node tree shown in FIG. 11A (3) is in the status of having been generated with respect to the sorted key arrays shown in FIG. 9, and corresponds to the merge array 309a shown in FIG. 9.

Next, referencing FIG. 10B, the process of executing a merge sort by repeating a coupled node tree minimum value search and deletion processing is described.

As shown in FIG. 10B, in step S1011, the minimum value search shown in FIG. 5A is executed, and a minimum value and processing source identifier is obtained, and, in step S1012, the minimum value obtained in step S1011 is stored in the merged key array.

Next, proceeding to step S1013, the minimum value obtained in step S1011 is set in the deletion key, and, in step S1014, the deletion processing shown in FIG. 8A and FIG. 8B is executed and the node including the deletion key is deleted.

In the example shown in FIG. 11A (3) and (4), the minimum value "000111" stored in leaf node 410b is obtained, and stored in the key array element number 0 of merged key array 313 pointed to by the pointer shown by an arrow. Then, node 410b is deleted from the tree shown in FIG. 11A (3), and, as shown in FIG. 11A (4), the contents of node 411b shown FIG. 11A (3), which is a pair to node 410b, is copied into node 410c.

Next, in step S1015, the processing source identifier obtained in step S1011 is set in the sorted key array identifier setting area as the sorted key array identifier.

Next, in step S1016, a determination is made whether the root node is registered. In this determination, the determination that the root node is not registered happens when, as exemplified in FIG. 11E (3) and (4), the node that includes the minimum value in the merge array is the root node, and at step S1014, the merge array is purged, that is to say the array element number of the root node is deleted, and the registration is retracted.

When, in step S1016, a determination is that the root node is registered, processing moves to step S1017, wherein an attempt is made to extract the next key from the sorted key array pointed to by the identifier set in the sorted key array identifier setting area at step S1015.

Figure 11B:
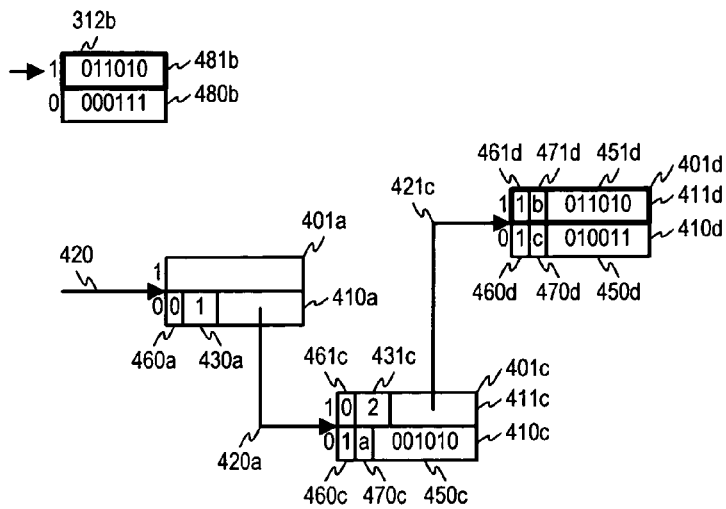
FIG. 11B is a second drawing describing in a coupled node tree the example shown in FIG. 9.
Figure 11B:
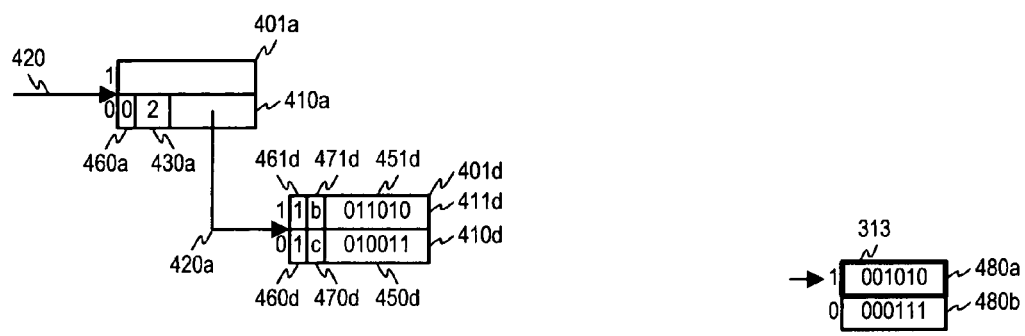

In the example shown in FIG. 11B (1) the key 481b stored in the array element with the key array element number 1 in sorted key array 312b, pointed to by the pointer shown with an arrow, is extracted as the next key.

Following step S1017, processing proceeds to step S1018, wherein a determination is made whether a next key was extracted in step S1017 or not, that is to say whether all the keys have already been extracted or not.

Figure 11C:
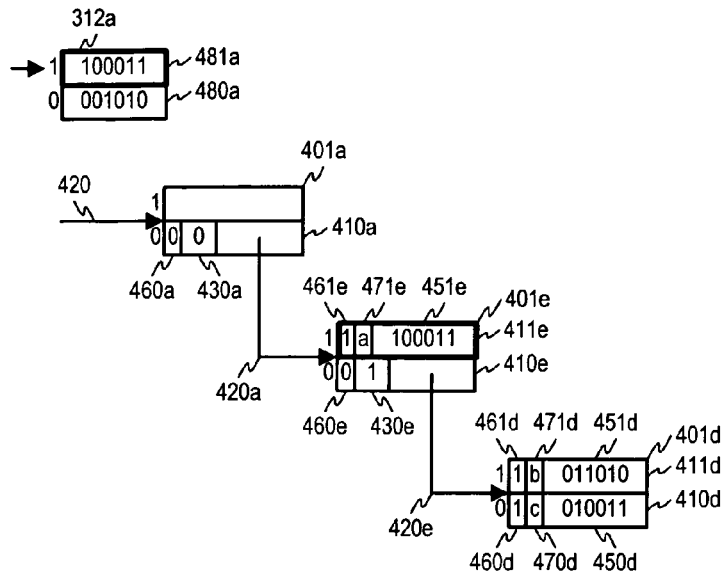
FIG. 11C is a third drawing describing in a coupled node tree the example shown in FIG. 9.
Figure 11C:
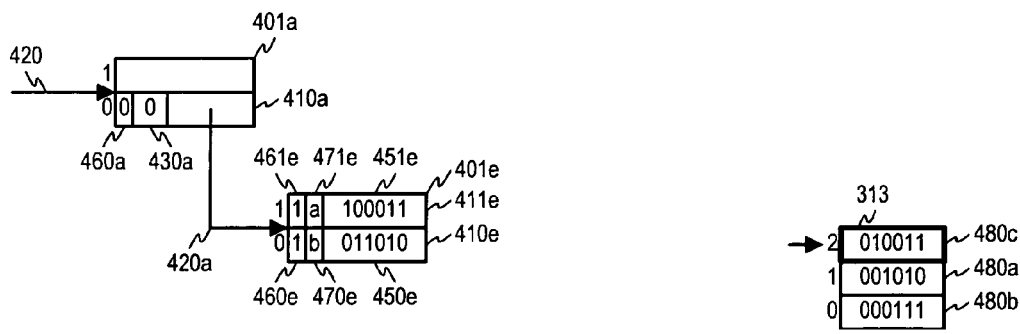
Figure 11D:
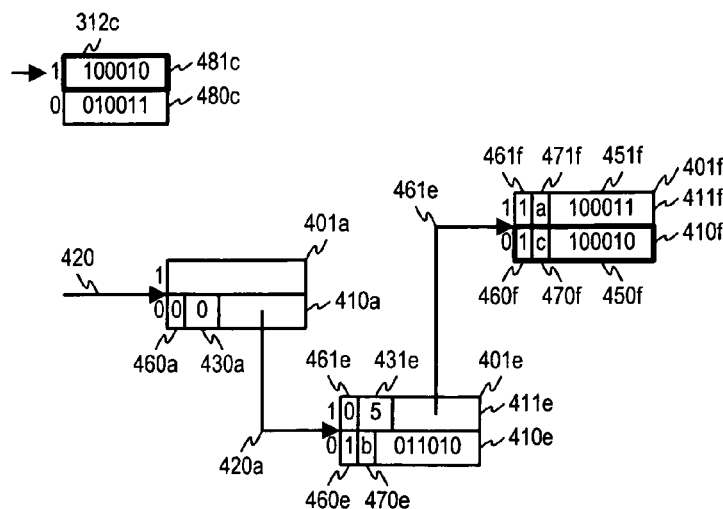
FIG. 11D is a fourth drawing describing in a coupled node tree the example shown in FIG. 9.
Figure 11D:
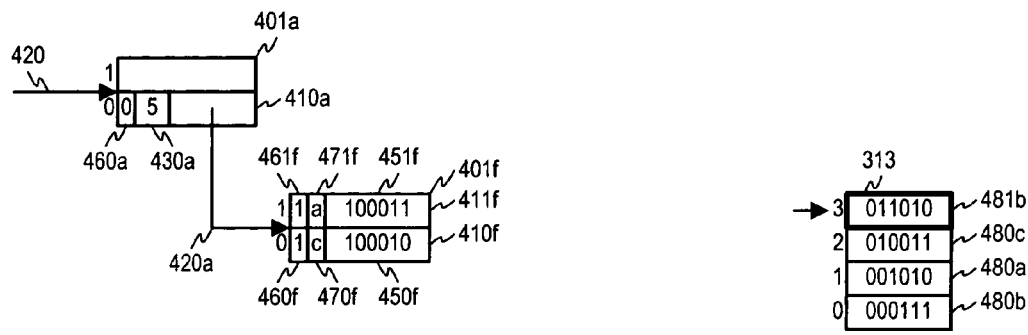
Figure 11E:
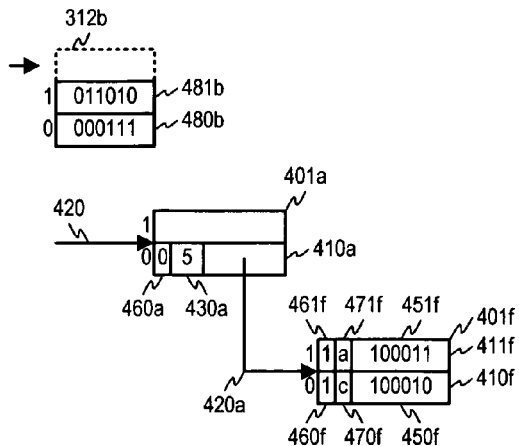
FIG. 11E is a fifth drawing describing in a coupled node tree the example shown in FIG. 9.
Figure 11E:
Figure 11E:
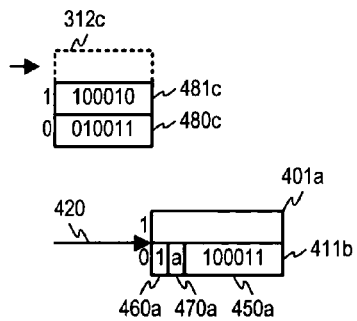
Figure 11E:

As shown in the example in FIG. 11E (1), from the fact that no key is stored in the array element pointed to by the pointer of sorted key array 312b, in this case, because the next key cannot be extracted in step S1017, the determination in step S1018 is that all the keys have been extracted.

If all the keys have been extracted, return is made to step S1011, and if they are not all extracted, processing proceeds to the processing of step S1019 to step S1021.

At step S1019, the key extracted at step S1017 is set in the insertion key, and at step S1020, the processing source identifier set in step S1015, that is to say, the processing source identifier obtained in step S1011, is set in the processing source identifier setting area for the insertion processing. Then, in step S1021, the insertion processing shown in FIG. 6A to FIG. 6C is executed and return is made to step S1011.

As was described above, in the example shown in FIG. 11B (1), the key 481b stored in the array element with the key array element number 1 in sorted key array 312b, pointed to by the pointer shown by an arrow, is extracted as the next key and stored in the index key 451d of the node 411d stored in the coupled node tree shown in FIG. 11B (1).

The processing of the above steps S1011 to S1021 is repeated until a determination is made in step S1016 that the root node is not registered, and when the determination is that the root node is not registered, processing proceeds to step S1022.

At step S1022, the next keys are extracted up to the maximum value of the keys from the sorted key array pointed to by the identifier set in the sorted key array identifier setting area in step S1015 and stored successively in the merged key array, and processing is terminated.

As was described above, the determination in step S1016 that the root node is not registered is due to the fact that the merge processing has progressed, that over time all of the keys have been extracted from each of the sorted key arrays, that there are no more keys to be inserted in the merge array, and, finally, that the remaining root node has been deleted. However, the possibility remains that there still might be unextracted keys in the sorted key array pointed to by the processing source identifier of the root node.

For that reason, the processing in step S1022 exists to extract those keys and successively store them in the merged key array.

With the processing of step S1022, merge processing is completed, and thus the general merge sort of all the keys stored in the sorted key array is completed.

FIG. 11A to FIG. 11F are drawings describing the generation, insertion, and deletion processing of a coupled node tree corresponding to the merge array when the sorted key arrays 310a, 310b, and 310c shown in FIG. 9 are provided. This is partially repetitive, but referencing FIG. 11A to FIG. 11F, the merge processing when the sorted key arrays 310a, 310b, and 310c shown in FIG. 9 are provided is described.

First, as shown in FIG. 11A (1), the minimum value 480a extracted from the sorted key array 312a is registered as the root node of the merge array. As shown, the coupled node indicator 420 of an empty node pair 401a is obtained, and the root node 410a is stored in node [0]. The "1" that indicates a leaf node is stored in the node type 460a of the root node 410a, the identifier "a" of sorted key array 312a is stored in its processing source identifier 471a, and "001010" is stored in its index key 450a.

Next, as shown in FIG. 11A (2), the key 480b that is the minimum value in sorted key array 312b, pointed to by the pointer shown by an arrow, is extracted, and the leaf node 410b that includes the value "000111" of key 480b as its index key is inserted in the tree shown in FIG. 11A (1), and the tree shown in FIG. 11A (2) is obtained.

Next, as shown in FIG. 11A (3), the key 480c that is the minimum value in sorted key array 312c, pointed to by the pointer shown by an arrow, is extracted, and the leaf node 411c that includes the value "010011" of key 480c as its index key is inserted in the tree shown in FIG. 11A (2), and the tree shown in FIG. 11A (3) is obtained.

Since all of the minimum values in the sorted key arrays are inserted in the merge array by the above, next, as shown in FIG. 11A (4), the minimum value "000111" in the merge array is stored in merged key array 313, and the leaf node 410b that includes that minimum value is deleted from the tree shown in FIG. 11A (3), and the tree shown in FIG. 11A (4) is obtained.

FIG. 11B (1) shows sorted key array 312b pointed to by the processing source identifier of the minimum value in merge array 309a and a tree being made by insertion of the leaf node that includes, as an index key, the next key, key 481b, pointed to by the pointer shown by an arrow, into the tree shown in FIG. 11A (4). In other words, the next key is extracted from sorted key array 310 and inserted in the merge array.

Next, as shown in FIG. 11B (2), the minimum value "001010" in the merge array is stored in the merged key array 313, and the leaf node 410c that includes that minimum value is deleted.

Since the value of the processing source identifier 470c for leaf node 410c is "a", next, as shown in FIG. 11C (1), the next key, key 481a, is extracted from the sorted key array 312a and inserted in the merge array. Next, as shown in FIG. 11C (2), the minimum value "010011" in the merge array is stored in the merged key array 313 and the leaf node 410d that includes that minimum value is deleted.

Since the value of the processing source identifier 470d of leaf node 410d is "c", next, as shown in FIG. 11D (1), the next key, key 481c, is extracted from the sorted key array 312c and inserted in the merge array. Next, as shown in FIG. 11D (2), the minimum value "011010" of the merge array is stored in merged key array 313, and the leaf node 410e that includes that minimum value is deleted.

Since the value of the processing source identifier 470e of leaf node 410e is "b", next, as shown in FIG. 11E (1), an attempt is made to extract a next key from sorted key array 312b, but since all the keys have been extracted from sorted key array 312b the next key is not inserted in the merge array. Next, as shown in FIG. 11E (2), the minimum value "100010" in the merge array is stored in the merged key array 313, and the leaf node 410f that includes that minimum value is deleted.

Since the value of the processing source identifier 470f of leaf node 410f is "c", next, as shown in FIG. 11E (3), an attempt is made to extract a next key from sorted key array 312c, but since all the keys have been extracted from sorted key array 312c the next key is not inserted in the merge array. Next, as shown in FIG. 11E (4), the minimum value "100011" in the merge array is stored in the merged key array 313, and the leaf node 411b that includes that minimum value is deleted.

Figure 11F:
FIG. 11F is a sixth drawing describing in a coupled node tree the example shown in FIG. 9.

From the fact that the root node is deleted, as shown in FIG. 11F, the remaining key 482a is extracted from the sorted key array 312a shown by the value "a" of the processing source identifier 270b of leaf node 411b and stored in merged key array 313 and merge processing is completed.

Next, referencing FIG. 12A to FIG. 14A and FIG. 14B, implementation example 2 and implementation example 3 of this invention, using a coupled node tree related to the first preferred embodiment of this invention, are described.

Figure 12A:
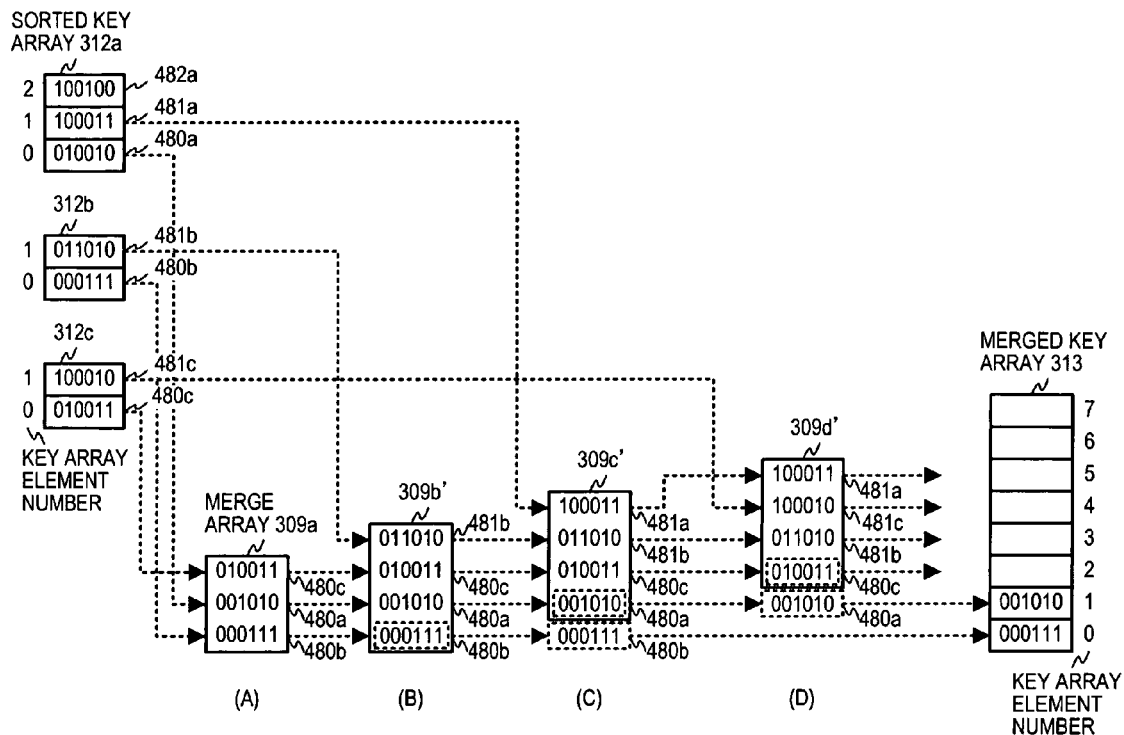
FIG. 12A is a drawing describing in general an implementation example 2.
Figure 12A:
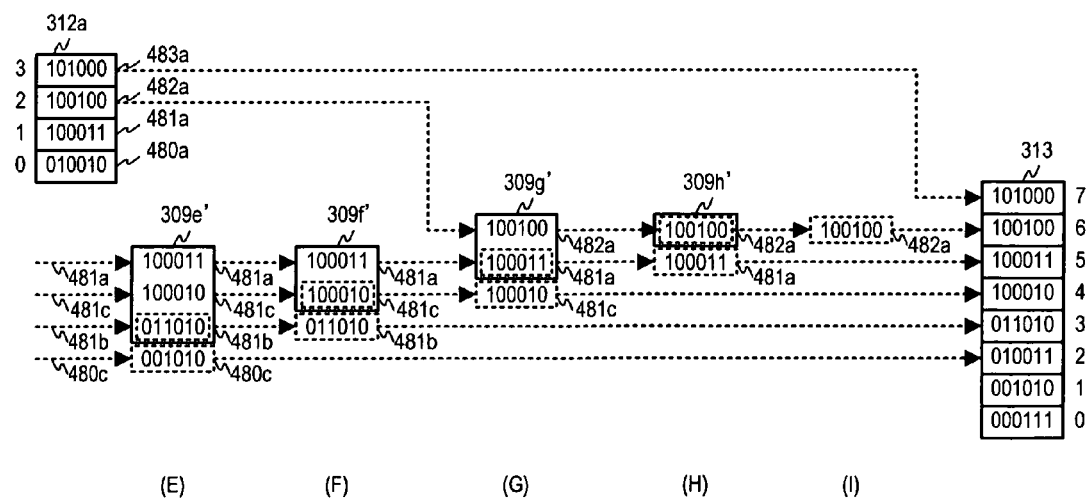
Figure 12B:
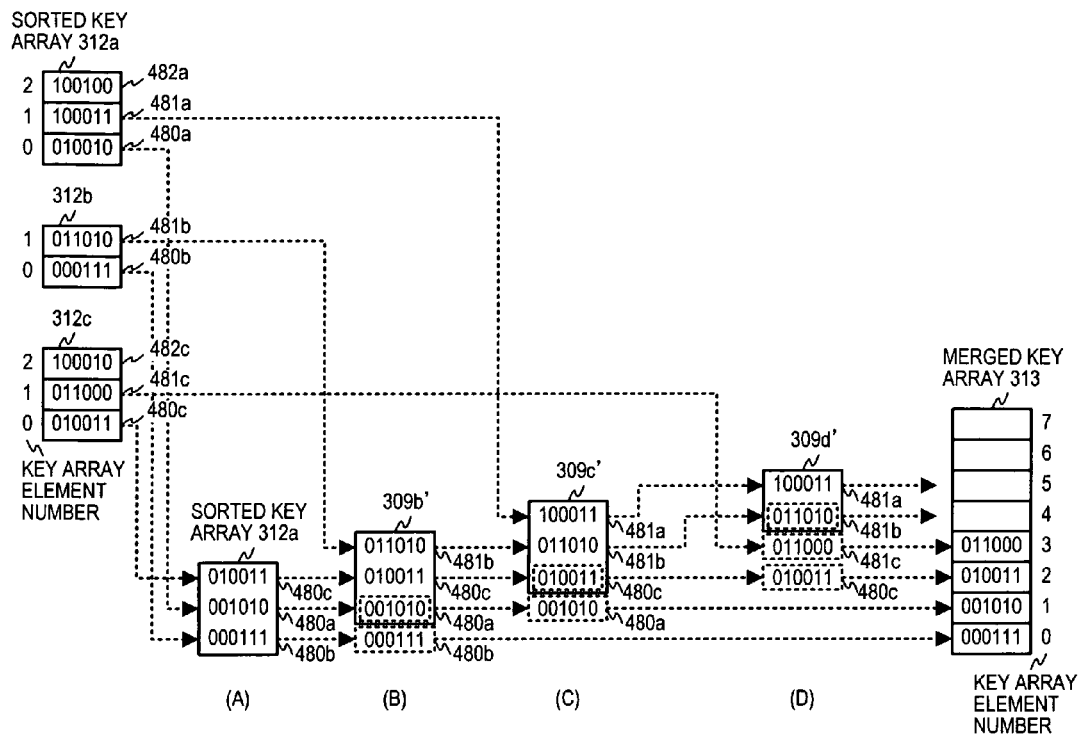
FIG. 12B is a drawing describing in general an implementation example 3.
Figure 12B:
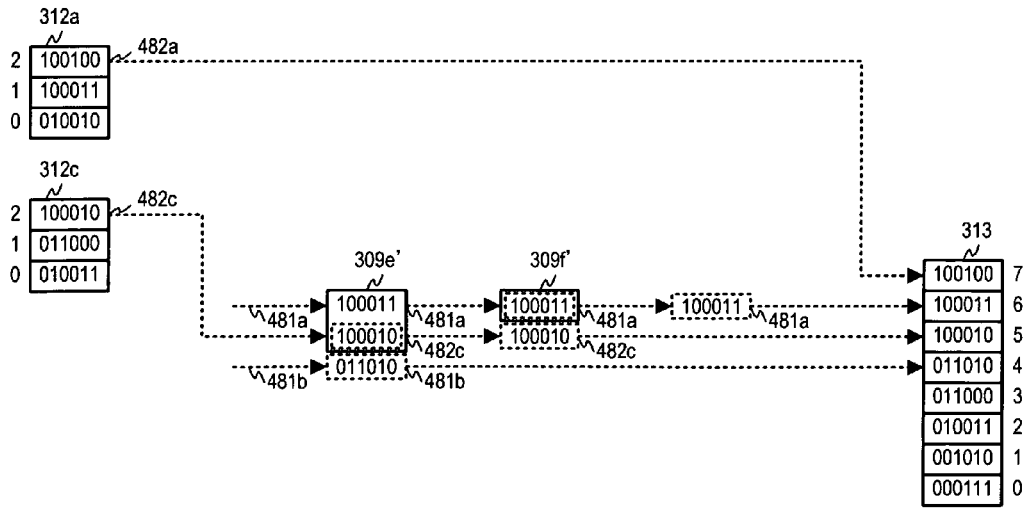
Figure 13A:
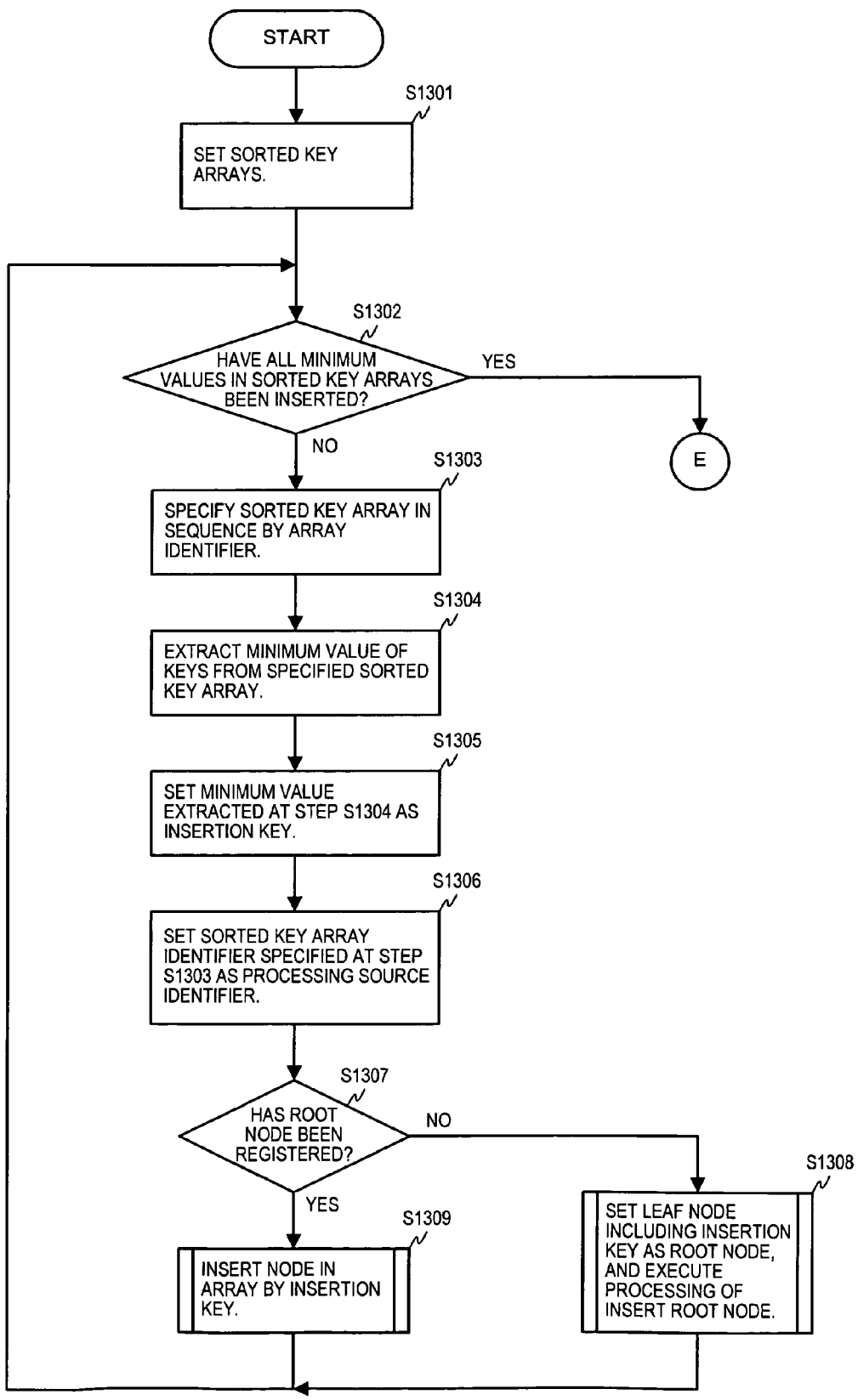
FIG. 13A is a drawing describing the initial processing of a merge sort using a coupled node tree in implementation examples 2 and 3.
Figure 13C:
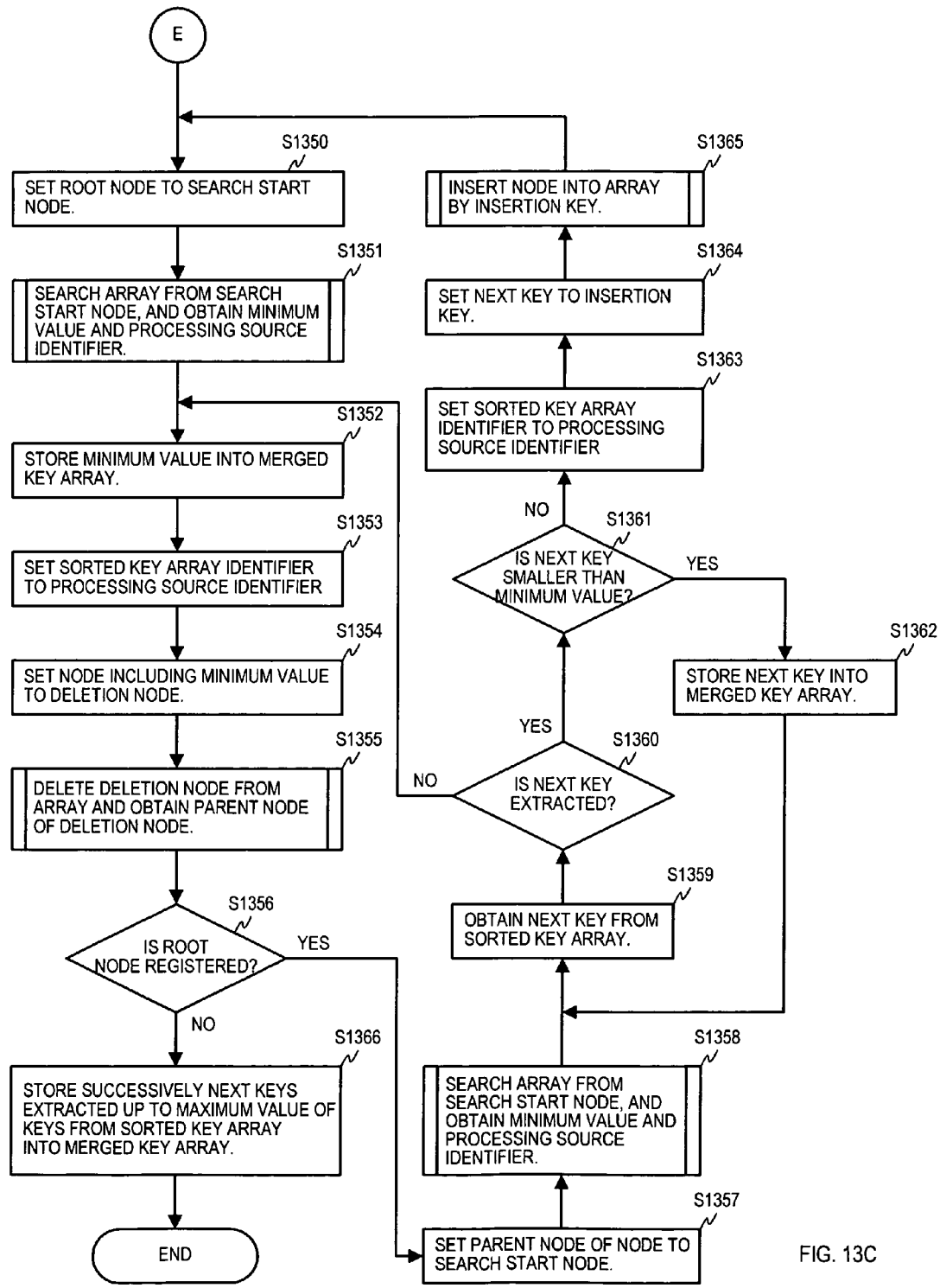
FIG. 13C is a drawing describing the processing to search for a minimum value in a coupled node tree and to execute a merge, in implementation example 3.
Figure 14A:
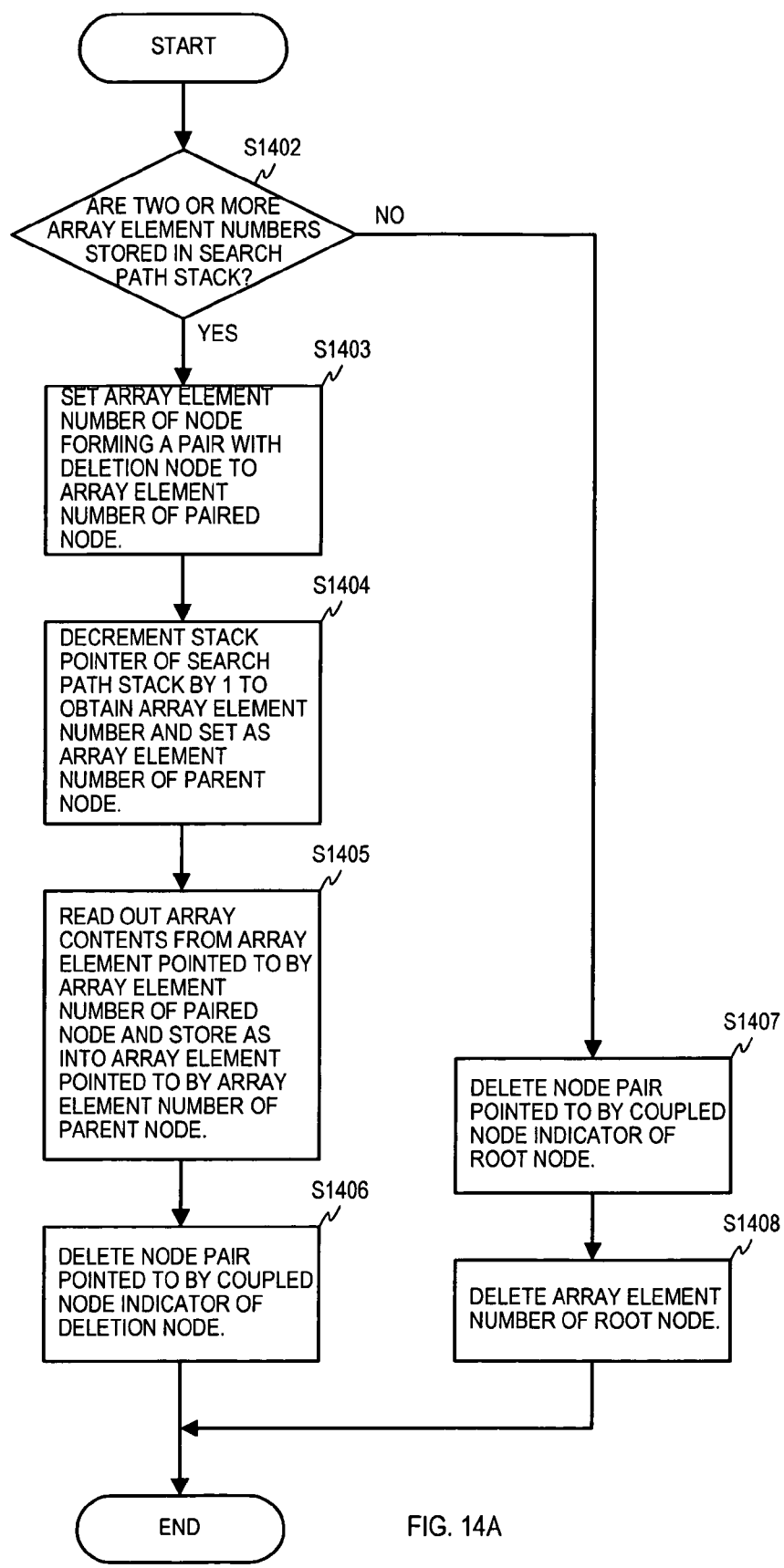
FIG. 14A is a drawing describing the deletion processing in implementation examples 2 and 3.
Figure 14B:
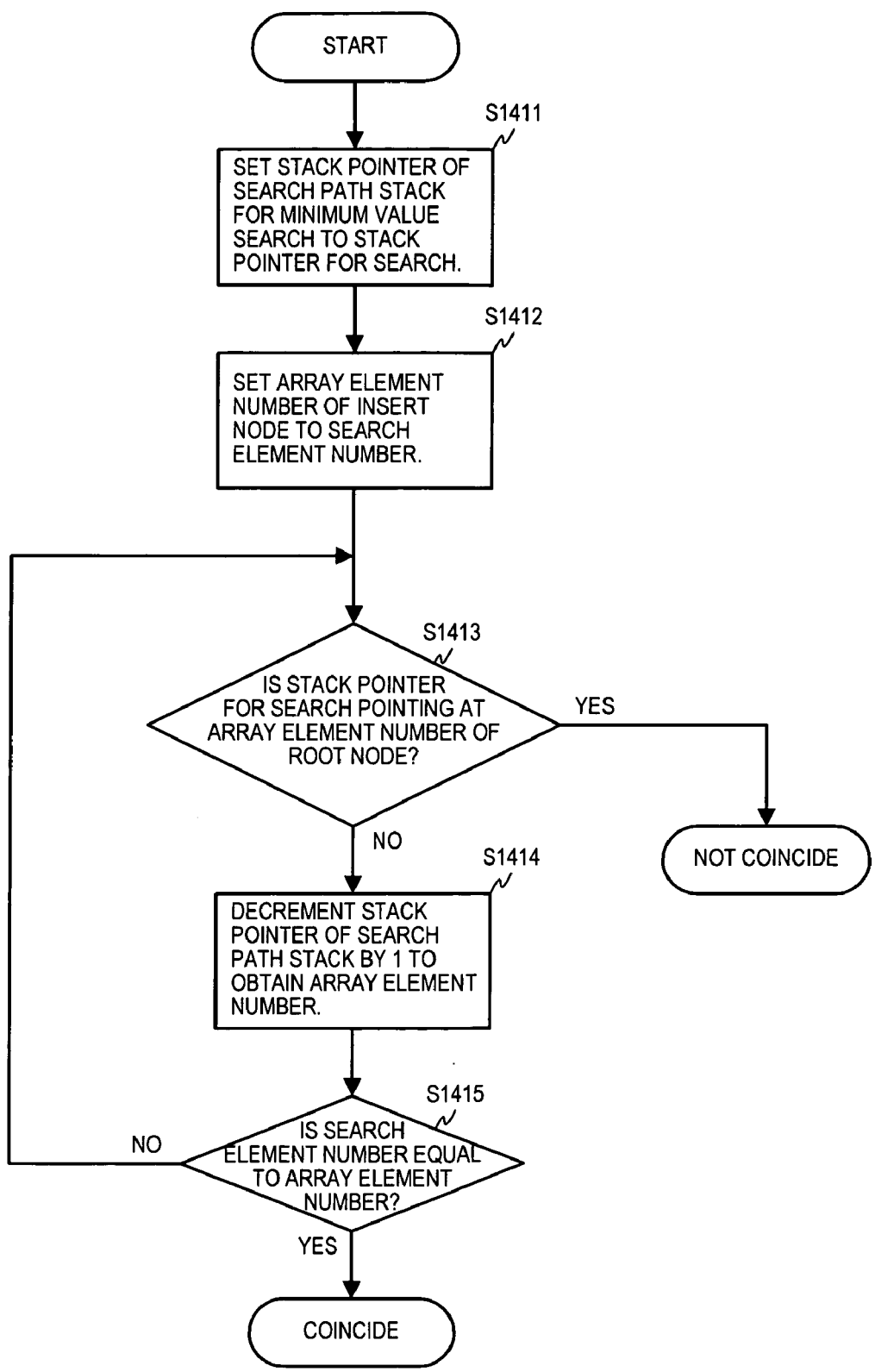
FIG. 14B is a drawing describing the search processing of the search path stack.

FIG. 12A, FIG. 13B, and FIG. 14B relate to implementation example 2 and FIG. 12B and FIG. 13C relate to implementation example 3. FIG. 13A and FIG. 14A are shared by both implementation examples.

In implementation example 1, the process is repeated of performing a minimum value search with the root node as the search start node, and after deleting the minimum value from the merge array inserting the next key. In comparison to that, in implementation examples 2 and 3, the sequence of minimum value search, deletion processing, and insertion processing is changed and by skipping part of the processing, the execution time of the merge processing is reduced.

FIG. 12A is a drawing describing and overview of implementation example 2, and section (1) of FIG. 12A describes the prior stage of merge processing while section (2) of FIG. 12A describes the latter stage of merge processing.

When FIG. 12A is compared with the overview of implementation example 1 shown in FIG. 9, for convenience of explanation, key 483a is added to key array element number 3 of sorted key array 312a. Also, the parts of the merge array other than step (A) are different.

Details are described later, referencing FIG. 13B, but in implementation example 2, process is basically performed in the sequence of minimum value search, insertion processing, and deletion processing. Then, by taking the parent node of the deletion node obtained in the immediately preceding deletion processing as the search start node of the minimum value search, the number of execution steps of the minimum value search is reduced.

The processing in step (A) is the same as the processing of step (A) shown in FIG. 9, and the merge array 309a is generated.

Next, in step (B), key 480b that is the minimum value stored in merge array 309a is stored in the array element with key array element number 0 in merged key array 313. Then, key 481b that is the minimum value after key 480b was extracted is extracted from sorted key array 312b that is the processing source for the extraction of key 480b and it is inserted in merge array 309a, and merge array 309b' is obtained. Furthermore, key 480b that is the minimum value of merge array 309b' is deleted from merge array 309b', and the merge array 309c' is obtained, the array in which the next key should be inserted in the next step, step (C).

In the next step, step (C), key 480a, which is the minimum value stored in merge array 309c', is stored in the array element with key array element number 1 in merged key array 313. Then, the key 481a, which became the minimum value after key 480a was extracted, is itself extracted from sorted key array 312a, which is the processing source from which key 480a was originally extracted, and that key, 481a, is inserted in merge array 309c'. Furthermore, key 480a, which is the minimum value in merge array 309c', is deleted from merge array 309c', and the merge array 309d' is obtained, the array in which the next key should be inserted in the next step, step (D).

in the next step, step (D), key 480c, which is the minimum value stored in merge array 309d', is stored in the array element with key array element number 2 in merged key array 313. Then, the key 481c, which became the minimum value after key 480c was extracted, is itself extracted from the sorted key array 312a that is the processing source from which key 480c was originally extracted, and that key, 481c, is inserted in merge array 309d'. Furthermore, key 480c, which is the minimum value in merge array 309d', is deleted from merge array 309d', and the merge array 309e' is obtained.

At this stage, as shown in section (1) of FIG. 12A, the keys 480b "000111", 480a "001010", and 480c "010011" are stored in the array elements with key array element numbers 0 to 2 respectively in merged key array 313. At this point, all the keys in sorted key array 312b and sorted key array 312c have already been extracted, and unextracted keys only remain in sorted key array 312a.

Section (2) of FIG. 12A shows an example of the processing after all the keys has been extracted from a processing source sorted key array.

At step (E), key 481b, which is the minimum value stored in merge array 309e', is stored in the array element with key array element number 3 in merged key array 313. Since the keys in sorted key array 312b, from which key 481b was extracted, have all been extracted, no key exists to be inserted, and key 481b is deleted from merge array 309d', obtaining merge array 309f.

Next, in step (F), key 481c, which is the minimum value stored in merge array 309f, is stored in the array element with key array element number 4 in merged key array 313. Just as in step (E), key 481c is deleted from merge array 309f, and the merge array 309g' is obtained, the array in which the next key should be inserted in the next step, step (G).

In the next step, step (G), key 481a, which is the minimum value stored in merge array 309g', is stored in the array element with key array element number 5 in merged key array 313. Then, the key 482a, which became the minimum value after key 481a was extracted, is itself extracted from the sorted key array 312a that is the processing source from which key 481a was originally extracted, and that key, 482a, is inserted in merge array 309d'. Furthermore, key 481a, which is the minimum value in merge array 309d', is deleted from merge array 309g', and the merge array 309h' is obtained.

In the next step, step (H), key 482a, which is the minimum value stored in merge array 309W, is stored in the array element with key array element number 6 in merged key array 313. Since the keys in merge array 309W, from which key 482a was extracted, have all been extracted, no key exists to be inserted, and key 482a is deleted from merge array 309d', resulting in an empty merge array.

In the last step, step (I), key 483a is extracted from sorted key array 312a, which still had unextracted keys, and that key is stored in the array element with key array element number 7 in merged key array 313, and merge sort is completed.

Next, referencing FIG. 13A, FIG. 13B, FIG. 14A, and FIG. 14B, merge sort processing flow using a coupled node tree in this implementation example is described.

FIG. 13A is a drawing describing the initial processing until the merge array 309a in the example shown in FIG. 12A is generated into something with the structure of a coupled node tree, and FIG. 13B is a drawing describing the following processes of searching for a minimum value in the merge array and storing it in the merged array.

When FIG. 13A is compared to the processing flow in FIG. 10A, related to implementation example 1, as can be understood from the previous description referencing FIG. 12A, because the processing is completely the same except that the step that sets the search start node has been moved to the FIG. 13B side, that description is omitted, and of the merge processing in this implementation example, the processes of searching for a minimum value in the merge array and storing that in the merged array are next described using FIG. 13B.

As shown in FIG. 13B, in step S1310, the root node is set in the search start node.

Next, proceeding to step S1311, the minimum value search shown in FIG. 5A is executed, and the minimum value and its processing source identifier are obtained, and in step S1312, the minimum value obtained in step S1311 is stored in the merged key array.

Next, in step S1313, the processing source identifier obtained in step S1311 is set in the sorted key array identifier setting area as the sorted key array identifier.

Next, proceeding to step S1314, an attempt is made to extract the next key from the sorted key array pointed to by the identifier set in the sorted key array identifier setting area at step S1313.

Following step S1314, processing proceeds to step S1315, wherein a determination is made whether a next key was extracted in step S1314, in other words, whether all the keys have been extracted.

If all the keys have been extracted, processing proceeds to step S1319, and if they have not been all extracted, processing proceeds to steps S1316 to S1318b.

At step S1316, the processing source identifier set in step S1313, that is, the one obtained in step S1311 is set in the processing source identifier setting area for insertion processing, and, at step S1317, the key extracted in step S1314 is set in the insertion key. Then, in step S1318, the insertion processing shown in FIG. 6A to FIG. 6C is executed. During this process of insertion processing, in the step S624 shown in FIG. 6C, the array element number of the node (hereinafter called the insertion node) immediately above the node obtained in step S614 which holds the insertion key as an index key is obtained. Also, for a reason to be explained later, the search path stack for this insertion processing is a different stack than the search path stack for the minimum value search.

Next in step S1318c, the search path stack obtained as a result of the minimum value search executed in step S1311 is searched using the array element number of the insertion node obtained in step S1318. Details of this search of the search path stack are described later referencing FIG. 14B.

Next, proceeding to step S1318d, using the result of the search in step S1318c, a determination is made whether an array element number matching the array element number of the insertion node exists in the search path stack of the minimum value search. If a match does not exist, processing moves to step S1319, and if a match exists, after the processing of steps S1318a and S1318b, processing proceeds to step S1319.

In step S1318a, the root node is set in the search start node, and in step S1318b, the minimum value search shown in FIG. 5A is executed from the root node, and a minimum value and its processing source identifier are obtained. Also, the search path stack obtained as a result of the minimum value search executed in step S1311 is searched, and the reason why the minimum value search is again performed at step S1318b is described hereinafter.

In step S1319, the array element number of the node including the minimum value obtained in step S1318b is set in the deletion node setting area, and next, proceeding to step S1320, the deletion node is deleted from the merge array and at the same time the parent node immediately above the deletion node is obtained. In this deletion processing, the search path stack for the minimum value search is used. Also, details of the processing in step S1320 are described herein below referencing FIG. 14A.

Next, proceeding to step S1321, a determination is made whether the root node is registered. If the root node has still not been deleted and is registered, processing proceeds to step S1322, and the parent node obtained in step S1320 is set in the search start node, and processing returns to step S1311.

If the root node has been deleted and is not registered, processing proceeds to step S1323, and according to the sorted key array pointed to by the identifier set in the sorted key array identifier setting area in step S1313, the next keys are extracted up to the maximum value of the keys and are stored successively in the merged key array, and processing is terminated.

As was described above, implementation example 2 intends to reduce the number of execution steps in the minimum value search by making the search start node of the minimum value search to be the parent node of the deletion node obtained in the immediately preceding deletion processing. However, the next minimum value cannot be determined until the next key is inserted.

Thus, as shown in step S1318, the next key is first inserted. Then, the node that includes the minimum value, obtained by a minimum value search of the tree before the next key was inserted, is deleted from the tree wherein the next key was inserted. However, if the insertion node exists on the path traversed during the minimum value search, insertion processing inserts the node pair that includes the leaf node holding the insertion key, between the insertion node and the leaf node including the minimum value. Thus, the path from the root node to the leaf node holding the minimum value after the insertion of the next key does not coincide with that before the insertion of the next key. And in the deletion processing executed next, since the parent node of the deletion node cannot be set correctly, and deletion processing itself cannot be performed correctly, it is necessary to perform the minimum value search again from the root node and to refresh the search path stack for the minimum value search.

Conversely, if the insertion node does not exist in the path traversed during the minimum value search, since insertion processing does not insert the node pair that includes the leaf node holding the insertion key, between the insertion node and the leaf node including the minimum value, the path from the root node to the leaf node holding the minimum value after the insertion of the next key coincides with that before the insertion of the next key. Thus, in this case, the parent node of the deletion node can be correctly set in deletion processing even after the insertion processing, and deletion processing is correctly executed, and the next minimum value search can be performed from that parent node.

Also, if a description is made to be doubly sure, the fact that the deletion node is the node that includes the minimum value ensures that the node that includes the next minimum value is a node underneath the parent node of the deletion node due to the sequentially of the coupled node tree. Thus, the parent node can be the search start node for the next minimum value search.

Next, referencing FIG. 14A, the processing to delete the deletion node from the merge array while obtaining the parent node is described.

As shown in FIG. 14A, at step S1402, a determination is made whether 2 or more array element numbers are stored in the search path stack. Just as was described for step S812 in FIG. 8B, the fact that 2 or more array element numbers are not stored, putting it another way, the fact that only 1 array element number is stored, means that that array element number is the array element holding the root node. In that case processing moves to step S1407, and the node pair related to the array element number of the root node is deleted. Next, proceeding to step S1408, the array element number registered as the root node is deleted, and processing is terminated.

When the determination in step S1402 is that 2 or more array element numbers are stored in the search path stack, processing proceeds to step S1403, and the array element number of the node that is a pair to the deletion node set in step S1401 is obtained and is set as the array element number of the paired node.

Next, proceeding to step S1404, the stack pointer of the search path stack used in the minimum value search of step S1311 shown in FIG. 13B is decremented by 1, and an array element number is extracted and is set as the array element number of the parent node.

Next, proceeding to step S1405, the contents of the array element pointed to by the array element number of the paired node set in step S1403 are read out and are stored in the array element pointed to by the array element number of the parent node set in step S1404.

Next, proceeding to step S1406, the node pair related to the array element number of the deletion node is deleted, and processing is terminated.

Next, referencing FIG. 14B, the search processing of the search path stack is described.

As shown in FIG. 14B, in step S1411, the stack pointer of the search path stack for the minimum value search executed in step S1311 shown in FIG. 13B is set as the stack pointer for the search.

Next, at step S1412, the array element number of the insertion node obtained in step S1318 shown in FIG. 13B is set in the search element number setting area as the search element number.

Next, at step S1403, a determination is made whether the stack pointer for the search points to the array element number of the array element wherein the root node is stored. If the stack pointer for the search points to the array element number of the array element wherein the root node is stored, the fact that none of the array element numbers stored in the search path stack of the minimum value search match the array element number of the insertion node is output, and processing is terminated.

If the stack pointer for the search does not point to the array element number of the array element wherein the root node is stored, processing proceeds to step S1414, and the stack pointer for the search is decremented by 1, and an array element number is extracted.

Next, in step S1415, a determination is made whether the search element number set in step S1402 and the array element number extracted in step S1414 coincide. If they do not coincide, return is made to step S1413.

If they do coincide, the fact that the array element number of the insertion node coincides with an array element number stored in the search path stack of the minimum value search is output and processing is terminated.

Next, implementation example 3 is described. Although details are described hereinafter referencing FIG. 13C, it should be noted that the processing sequence of minimum value search, deletion processing, and insertion processing in implementation example 3 is basically the same as that in implementation example 1, but after the deletion processing the parent node of the deletion node is set as the search start node and an intermediate minimum value search is performed, and a magnitude comparison is performed between that minimum value and the key extracted next from the processing source, and if the next key is smaller the insertion processing is skipped and that value is stored directly in the merged key array.

FIG. 12B is a drawing describing an overview of implementation example 3. Section (1) of FIG. 12B is a drawing describing the prior stage of merge processing, and section (2) of FIG. 12B is a drawing describing the latter stage of merge processing.

When FIG. 12B is compared with the overview of implementation example 1 shown in FIG. 9, for the convenience of explanation, key 482c has been added to key array element number 2 in sorted key array 312c. Also the parts of the merge array other than those of step (A) are different.

The processing of step (A) is the same as the processing of step (A) shown in FIG. 9, and merge array 309a is generated.

In the next step, step (B), key 480b that is the minimum value stored in merge array 309a is stored in the array element with the key array element number 0 in merged key array 313, and key 480b is deleted from merge array 309a. Next, key 480a that is the next minimum value in merge array 309a after key 480b had been deleted is obtained along with its processing source identifier. Then, the next key, key 481b, which is the minimum value after key 480b was extracted, is extracted from sorted key array 312b of the processing source from which key 480b was extracted, and a magnitude comparison is performed with key 480a. Since the next key 481b is larger than the key 480a which is the next minimum value in merge array 309a, key 481b is inserted in merge array 309a and merge array 309b' is obtained.

In the next step, step (C), key 480a that is the minimum value stored in merge array 309b' is stored in the array element with the key array element number 1 in merged key array 313, and key 480a is deleted from merge array 309b'. Next, key 480c that is the next minimum value in merge array 309b' after key 480a had been deleted is obtained along with its processing source identifier. Then, the next key, key 481a, which is the minimum value after key 480a was extracted, is extracted from sorted key array 312a of the processing source from which key 480a was extracted, and a magnitude comparison is performed with key 480c. Since the next key 481a is larger than the key 480c which is the next minimum value in merge array 309b', key 481a is inserted in merge array 309b' and merge array 309c' is obtained.

In the next step, step (D), key 480c that is the minimum value stored in merge array 309c' is stored in the array element with the key array element number 2 in merged key array 313 and is deleted from merge array 309c'. Next, key 481b that is the next minimum value in merge array 309c' after key 480c had been deleted is obtained along with its processing source identifier. Then, the next key, key 481c, which is the minimum value after key 480c was extracted, is extracted from sorted key array 312c of the processing source from which key 480c was extracted, and a magnitude comparison is performed with key 481b. Since the next key 481c is smaller than key 481b that is the next minimum value in merge array 309c', the next key 481c is stored the array element with the key array element number 3 in merged key array 313. In step (D), there are no next keys to be inserted in merge array 309c' and the merge array 309c' after key 480c is deleted becomes the merge array 309d' in the illustration.

At this stage, as shown in section (1) of FIG. 12B, the keys 480b "000111", 480a "001010", 480c "010011", and 481c "011000" have been stored in array elements with the key array element numbers 0 to 3 respectively in merged key array 313. Then, all the keys in sorted key array 312b have been extracted but unextracted keys remain in sorted key array 312a and sorted key array 312c.

At step (E) shown in section (2) of FIG. 12B, key 482c, which is the minimum value after key 481c has been extracted from sorted key array 312c, is extracted and a magnitude comparison is performed with key 481b. Since the next key 482c is larger than key 481b, which is the minimum value in merge array 309d', key 482c is inserted in merge array 309d'.

Then, key 481b, which is the minimum value stored in merge array 309d' after key 482c has been inserted, is stored in the array element with the key array element number 4 in merged key array 313, and is deleted from merge array 309d', obtaining merge array 309e'.

At the next step, step (F), because all the keys in sorted key array 312b, which is the processing source from which key 481b being deleted in step (E) was extracted, have been extracted, there are no keys to be inserted in merge array 309e'. The key 482c that is the minimum value stored in merge array 309e' is stored in the array element with the key array element number 5 in merged key array 313, and key 482c is deleted from merge array 309e', obtaining merge array 309f.

Even in the next step, step (F), since all the keys in sorted key array 312c, which is the processing source from which key 482c being deleted in step (F) was extracted, have been extracted, there are no keys to be inserted in merge array 309f. The key 481a, which is the minimum value stored in merge array 309f, is stored in the array element with the key array element number 6 in merged key array 313, and key 481a is deleted from merge array 309f. Then, as shown in the drawing, the merge array is empty, that is to say, the root node of the coupled node tree has been deleted.

In the final step, step (H), key 482a is extracted from sorted key array 312a, wherein unextracted keys remain, and is stored in the array element with the key array element number 7 in merged key array 313, and merge sort is completed.

Next the flow of the merge processing in implementation example 3 is described. In the example shown in FIG. 12A the initial process up to the point wherein merge array 309a is generated as an object having the structure of a coupled node tree is the same as the processing flow of implementation example 2 shown in FIG. 13A. Thus, the processing following that, of searching for a minimum value in the merge array and storing it in the merged array, is described referencing FIG. 13C.

As shown in FIG. 13C, in step S1350, the root node is set as the search start node.

Next, proceeding to step S1351, the minimum value search shown in FIG. 5A is executed and a minimum value and its processing source identifier is obtained, and, in step S1352, the minimum value obtained in step S1351 is stored in the merged key array.

Next in step S1353, the processing source identifier obtained in step S1351 is set in the sorted key array identifier setting area as the sorted key array identifier.

Next, proceeding to step S1354, the array element number of the node that includes the minimum value obtained in either step S1351 or in step S1358 descried later is set in the deletion node setting area, and, next, in step S1355, the deletion node is deleted from the merge array while the array element number of the parent node immediately above the deletion node is obtained. Also, details of the processing in step S1355 was described above referencing FIG. 14A.

Next, proceeding to step S1356, a determination is made whether the root node is registered. If the root node has not yet been deleted and is registered, processing proceeds to steps S1357 and following, and return is made to step S1352 or step S1350.

If the root node has been deleted and is not registered, processing proceeds to step S1366, wherein keys are extracted from the sorted key array pointed to by the identifier set in sorted key array identifier setting area at step S1353, starting with the next key up to the key with the maximum value, and those keys are successively stored in the merged key array, and processing is terminated.

In step S1357, the parent node obtained in step S1355 is set in the search start node, and processing proceeds to step 51358, wherein the minimum value search shown in FIG. 5A is executed, and a minimum value and its processing source identifier are obtained.

Next, proceeding to step S1359, an attempt is made to extract the next key from the sorted key array pointed to by the identifier set in the sorted key array identifier setting area at step S1353.

Following on step S1359, processing proceeds to step S1360, wherein a determination is made whether a next was extracted in step S1359, that is to say, whether all the keys have been extracted.

If all the keys have been extracted, a return is made to step S1352, and as was described for the steps (E) and (F) in FIG. 12B, the insertion processing is skipped, and the minimum value is stored in the merged key array, and deletion processing is performed.

If all the keys have not been extracted, processing proceeds to step S1361. At step S1361, a determination is made as to the magnitude relationship between the next key extracted in step S1359 and the minimum value obtained in step S1358.

If the next key is smaller than the minimum value, since even if the next key is inserted in the merge array and a minimum value search is performed, what is obtained is that next key, so no insertion processing is performed and a branch is made to step S1362, wherein the next key is stored in the merged key array, and a return is made to step S1359, wherein a next key is again extracted.

If the next key is not smaller than the minimum value, the processing of step S1363 to step S1365 that inserts the key in the merge array is executed, and a return is made to step S1350.

In step S1363, the processing source identifier set in step S1353, that is the identifier obtained in step S1351, is set in the processing source identifier setting area for the insertion processing, and at step S1364, the key extracted at step S1359 is set in the insertion key. Then, in step S1365, the insertion processing shown in FIG. 6A to FIG. 6C is executed and a return is made to step S1350.

Next, referencing FIG. 15 to FIG. 24C, the merge sort related to the second preferred embodiment of this invention is described. This preferred embodiment of the invention, as was proposed in the Japanese patent application 2007-114915 noted above, arranges the index keys in an area separate from the coupled node tree, and uses a coupled node tree that stores in the leaf nodes, not the index keys themselves, but rather pointers to the area wherein the index keys are arranged. That technique can be applied to merge sort in this implementation example by storing the processing source identifier with the index key.

Figure 15:
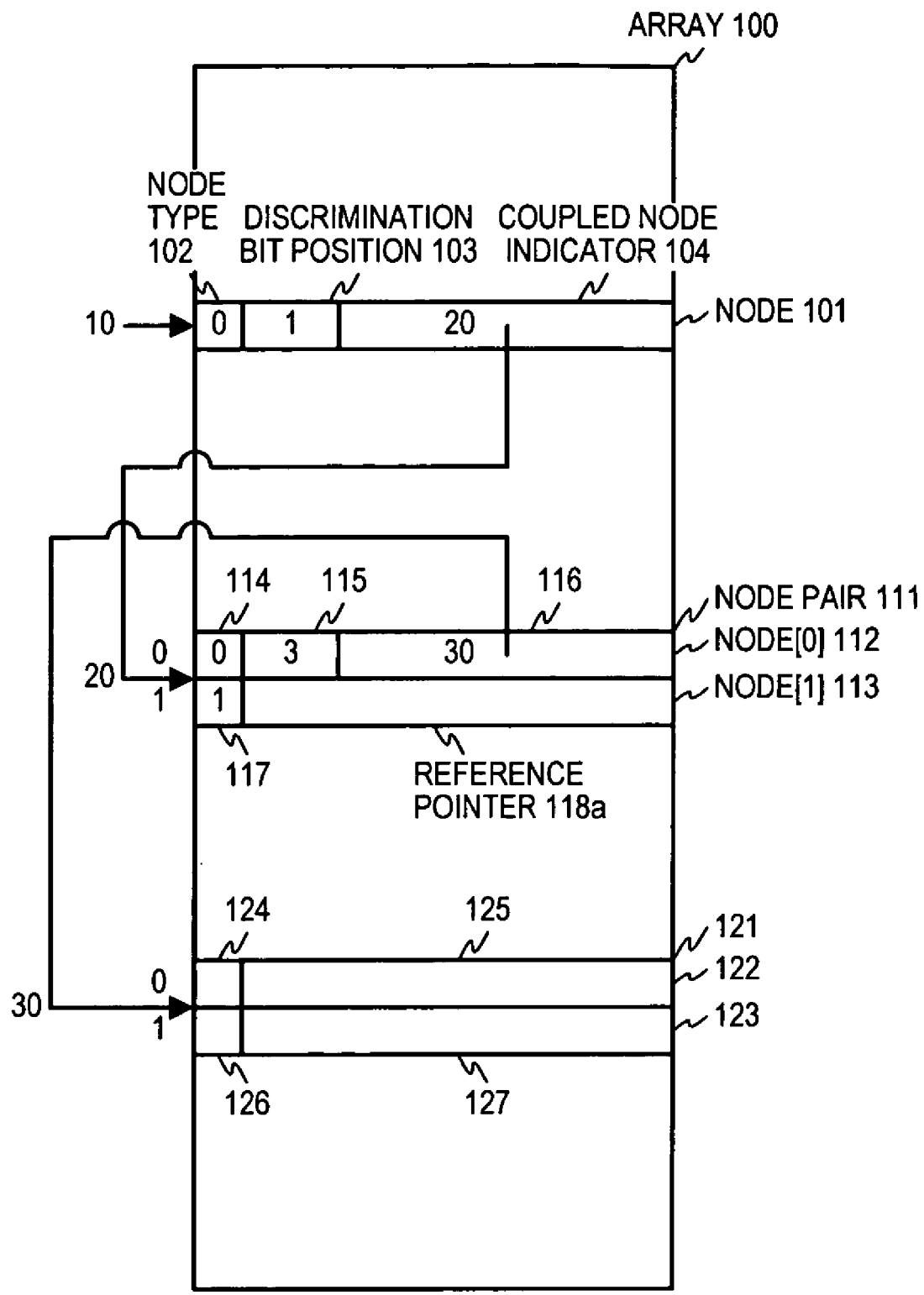
FIG. 15 is a drawing describing an exemplary configuration of a coupled node tree stored in an array, related to the second preferred embodiment of this invention.

FIG. 15 is a drawing describing a configurational example of a coupled node tree stored in an array related to the second preferred embodiment of this invention. When this drawing is compared to the configurational example related to the first preferred embodiment of this invention shown in FIG. 2A, the only difference is that node [1], which is a leaf node, holds a reference pointer 118a that points to the area wherein the index key and processing source identifier are stored rather than the processing source identifier 119 and index key 118 shown in FIG. 2A and since all other points are the same, this description is omitted.

Figure 16:
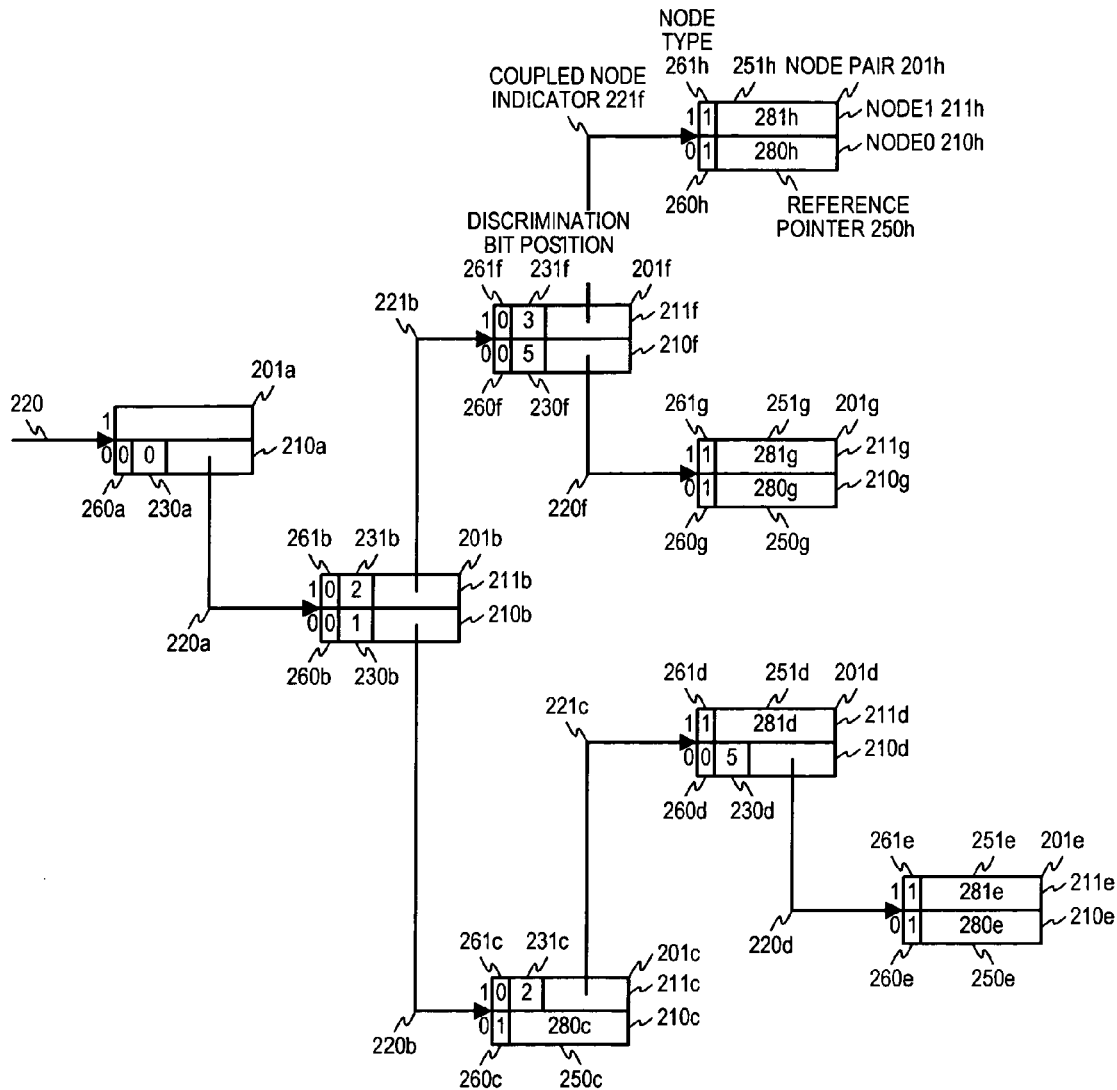
FIG. 16 is a drawing showing conceptually the tree configuration of a coupled node tree related to the second preferred embodiment of this invention.
Figure 16:
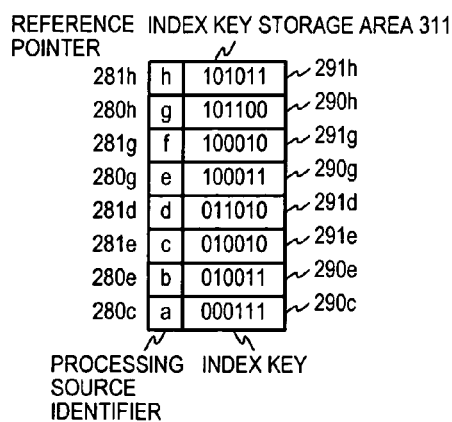

Section (1) of FIG. 16 is a drawing showing conceptually the tree structure of a coupled node tree related to a preferred embodiment of this invention, and section (2) of the same figure is a drawing showing the key information storage area 311 that holds the key information composed of the processing source identifier and index key and that is pointed to by the reference pointer.

The coupled node tree shown in section (1) of FIG. 16 is one wherein processing source identifier and index key of each leaf node of the coupled node tree shown in FIG. 2B has been replaced by the reference pointers 280c, 281d, 280e, 281e, 280g, 281g, 280h, and 281h, and the processing source identifier and index key that are the key information corresponding to that shown in FIG. 2A are stored in the areas of the key information storage area 311 shown in section (2) of FIG. 16 and are pointed to by each of the reference pointers.

Figure 17:
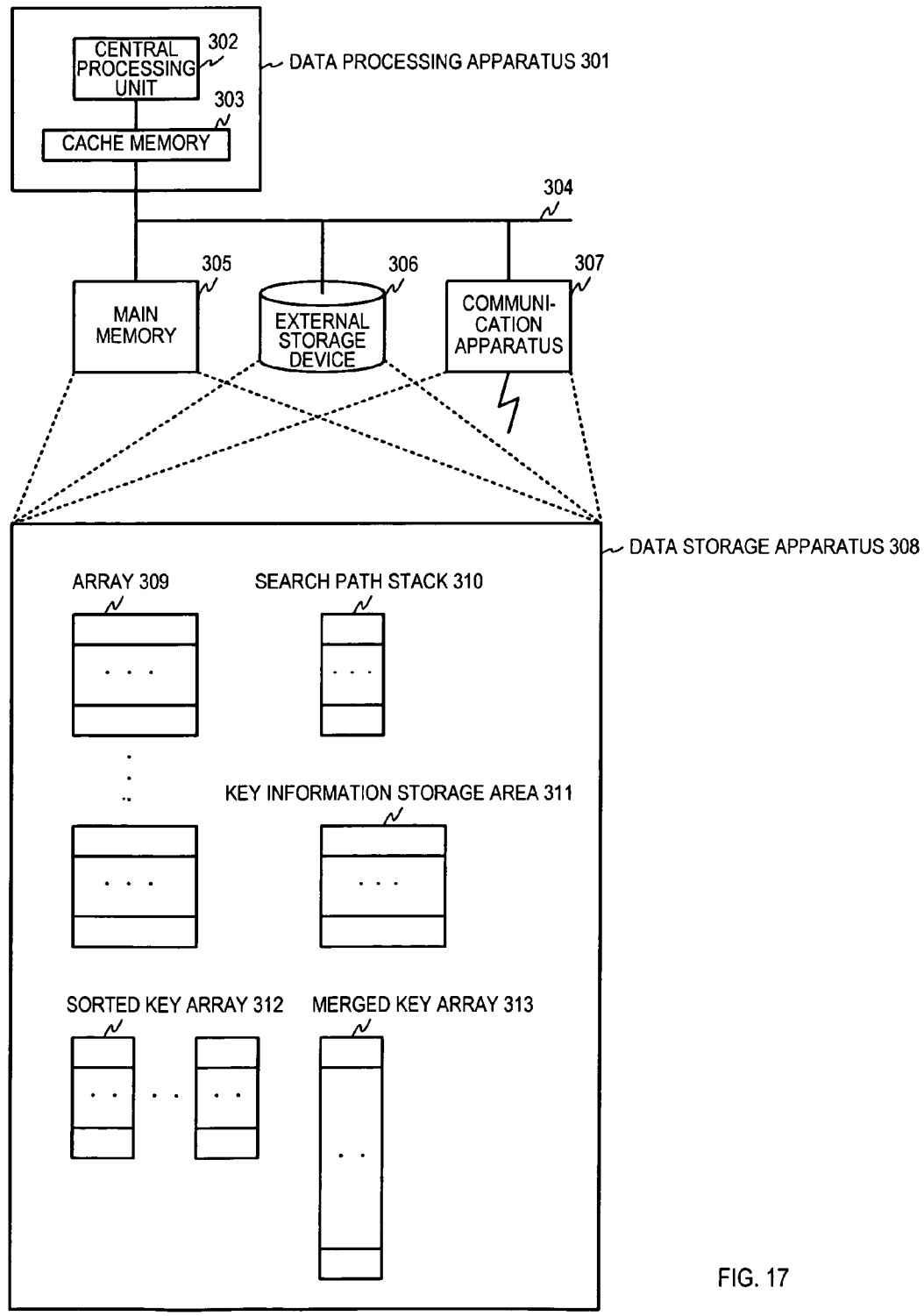
FIG. 17 is a drawing describing an exemplary hardware configuration for the second preferred embodiment of the present invention.

FIG. 17 is a drawing describing a hardware configurational example for this embodiment of the invention. When comparison is made to the hardware configuration example for the first preferred embodiment of this invention shown in FIG. 3A, since only the key information storage area 311 is added to the data storage apparatus 308, this description is omitted.

Figure 18:
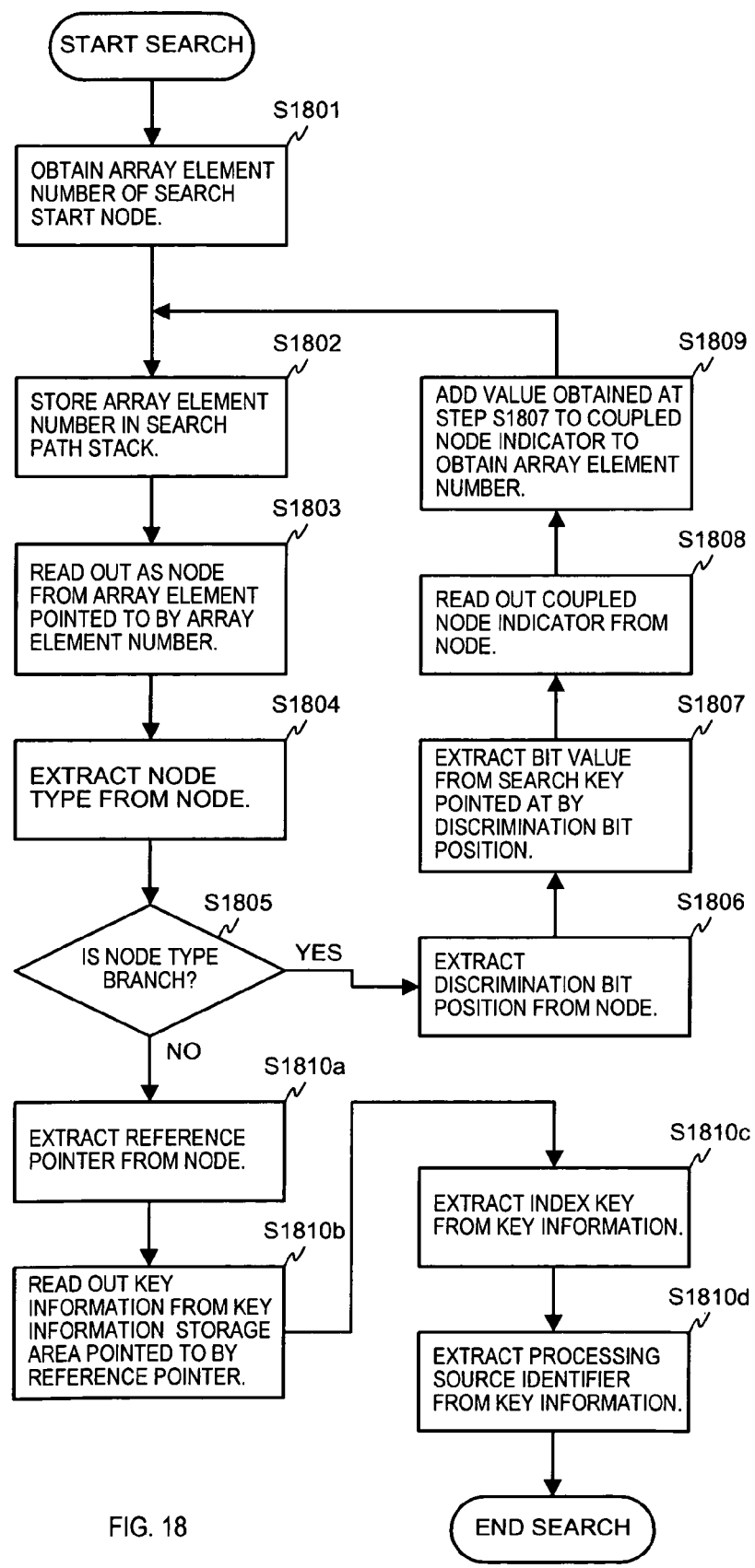
FIG. 18 is a flowchart showing the basic operations of a bit string search related to the second preferred embodiment of this invention.

FIG. 18 is a flowchart showing the basic operations of a bit string search using a coupled node tree related to this preferred embodiment.

Since the processing of step S1801 to step S1809 is the same as that of steps S401 to S409 in the flowchart showing the basic operations of a bit string search in the first preferred embodiment of this invention shown in FIG. 4, this description is omitted.

At step S1805, when a determination is made that the node type does not indicate a branch node, in other words indicates a leaf node, processing branches to step S1810a, and a reference pointer is extracted from that leaf node, and at step S1810b, the key information pointed to by that reference pointer is read out.

Then, at step S1810c, the index key is extracted from the key information, and at step S1810d, the processing source identifier is also extracted from the key information and processing is terminated.

Figure 19A:
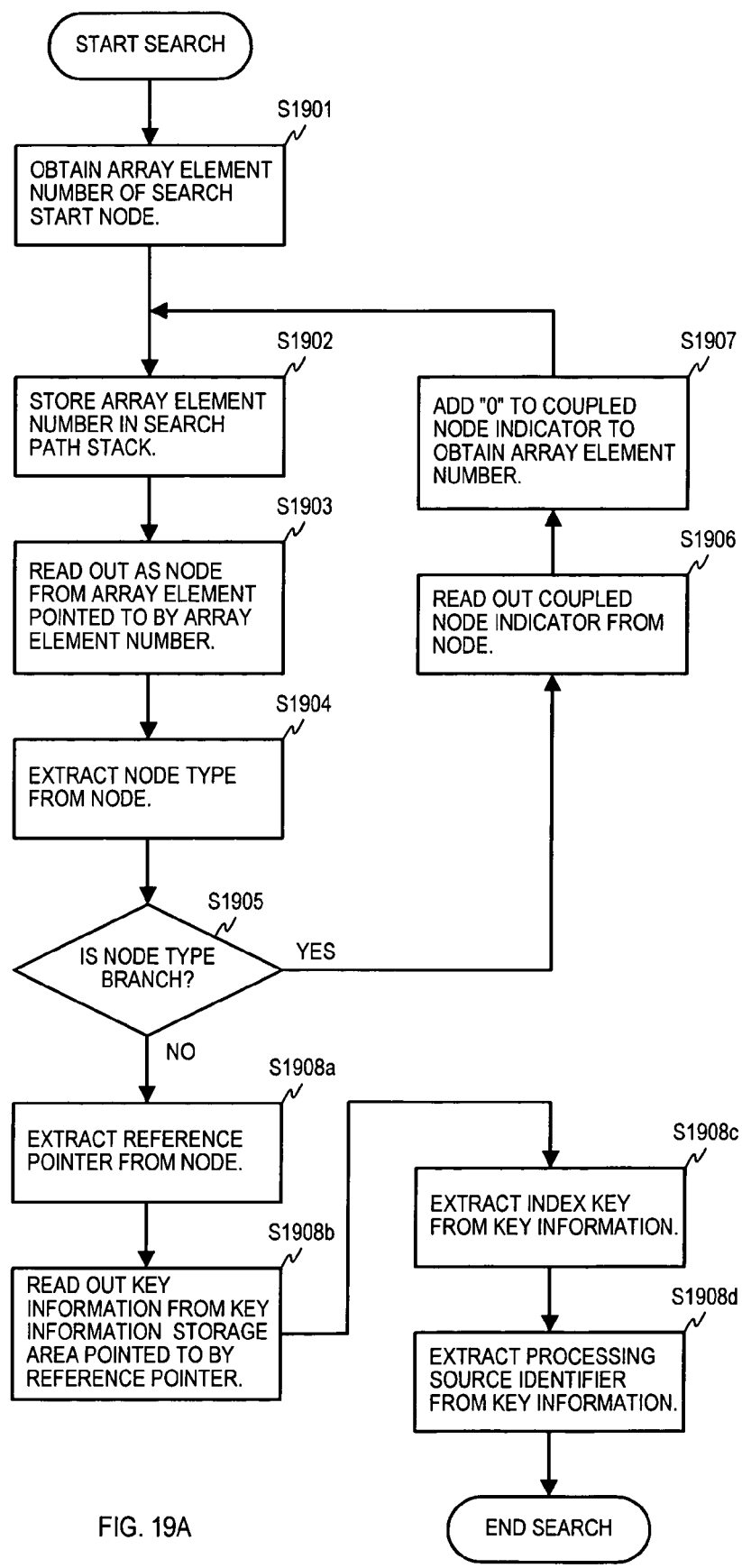
FIG. 19A is a flowchart showing the processing to obtain the minimum value of the index keys using a coupled node tree related to the second preferred embodiment of this invention.

FIG. 19A is a flowchart showing the processing to obtain the minimum value of the index keys using a coupled node tree related to this preferred embodiment.

Since the processing of step S1901 to step S1907 is the same as that of step S401 to step S409 in the flowchart showing a minimum value search in the first preferred embodiment of this invention shown in FIG. 5A, that description is omitted.

When a determination is made in step S1905 that the node type does not indicate a branch node, in other words, that indicates a leaf node, processing branches to step S1908a, and a reference pointer is extracted from that leaf node, and, at step S1908b, the key information pointed to by the reference pointer is read out.

Then, at step S1908c, an index key is extracted from the key information, and at step S1908d, the processing source identifier is also extracted from the key information, and processing is terminated.

Figure 19B:
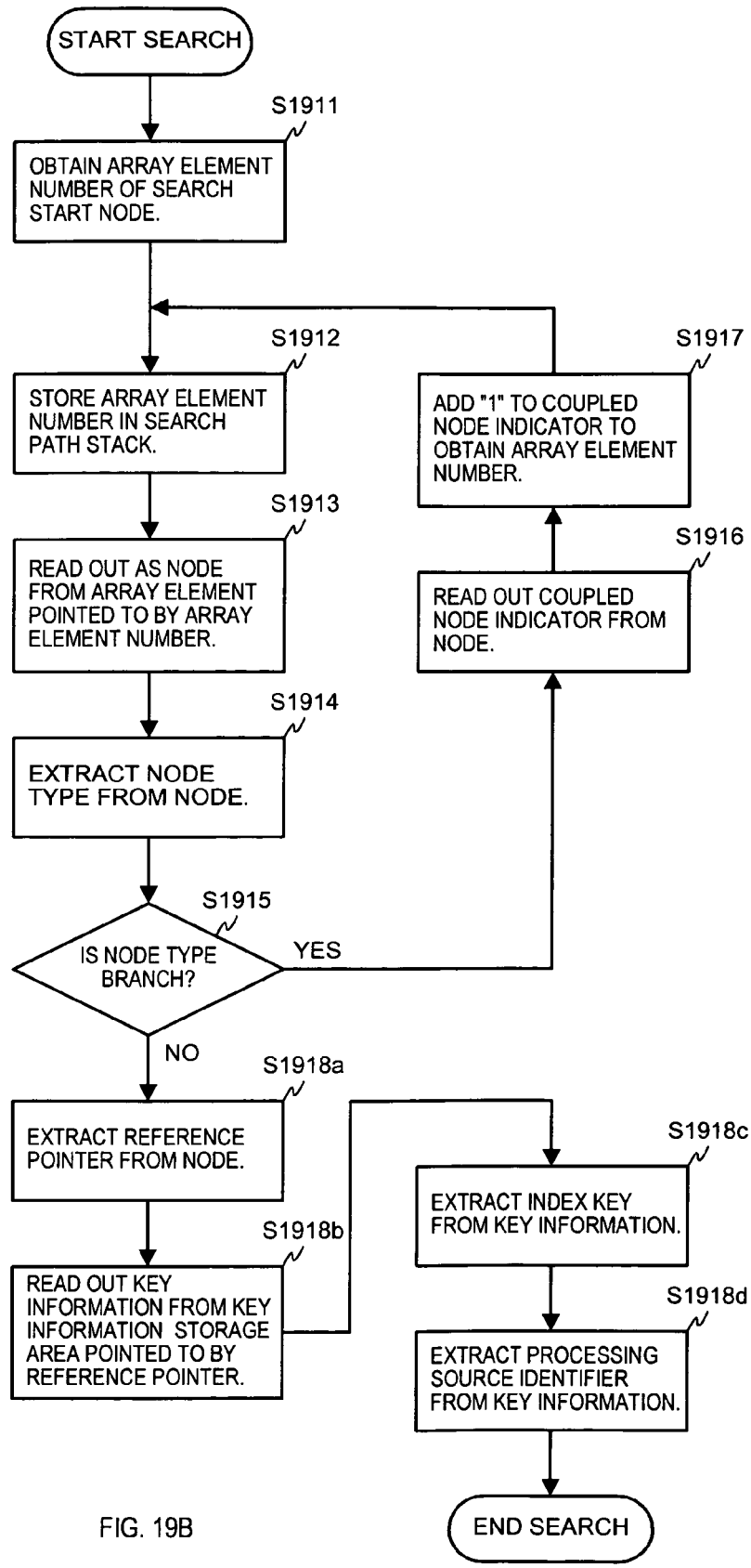
FIG. 19B is a flowchart showing the processing to obtain the maximum value of the index keys using a coupled node tree related to the second preferred embodiment of this invention.

FIG. 19B is a flowchart showing the processing to obtain the maximum value of the index keys using a coupled node tree related to this preferred embodiment.

Since the processing of steps S1911 to S1918d is the same as that of steps S1901 to S1908d shown in FIG. 19A except that, in step S1917, the value 1 is added to coupled node indicator in order to obtain the array element number, that description is omitted.

Figure 20A:
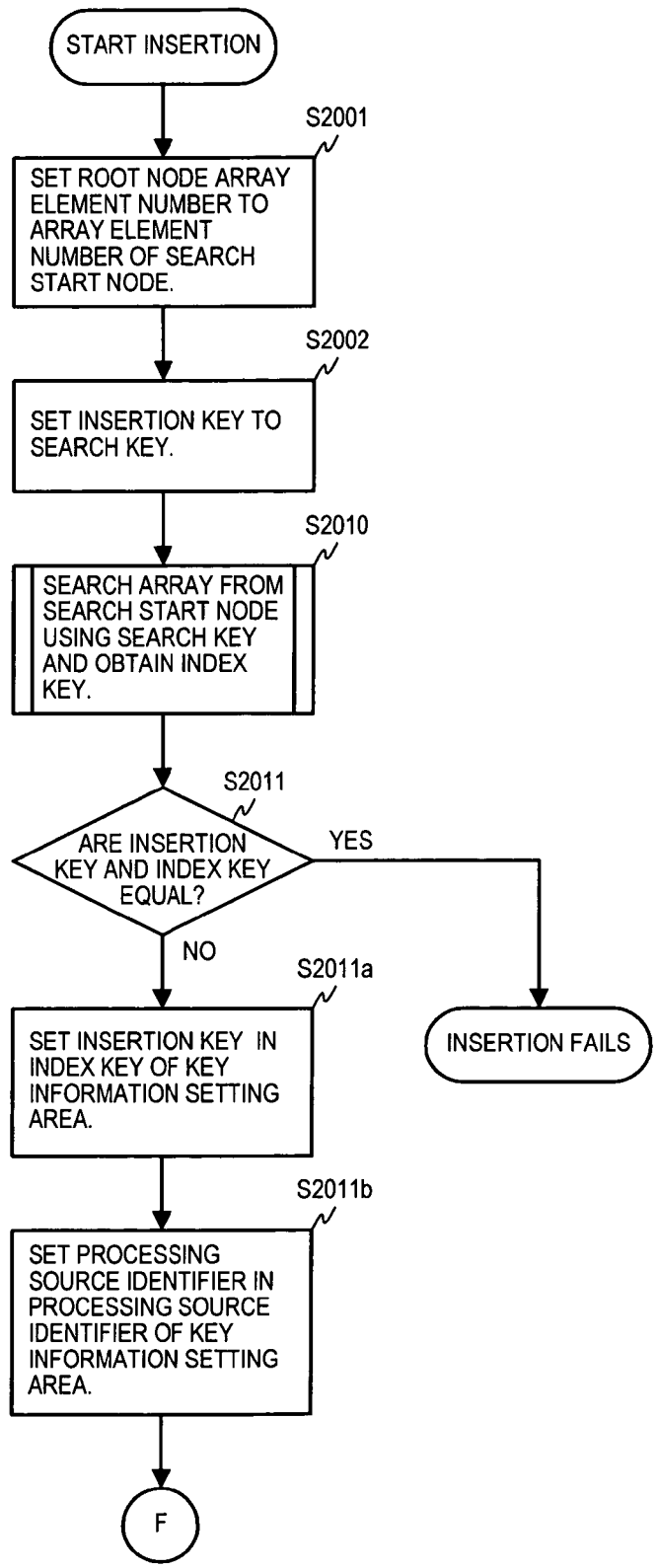
FIG. 20A is a drawing showing the processing flow of the search processing that is the prior stage of insertion processing related to the second preferred embodiment of this invention.
Figure 20B:
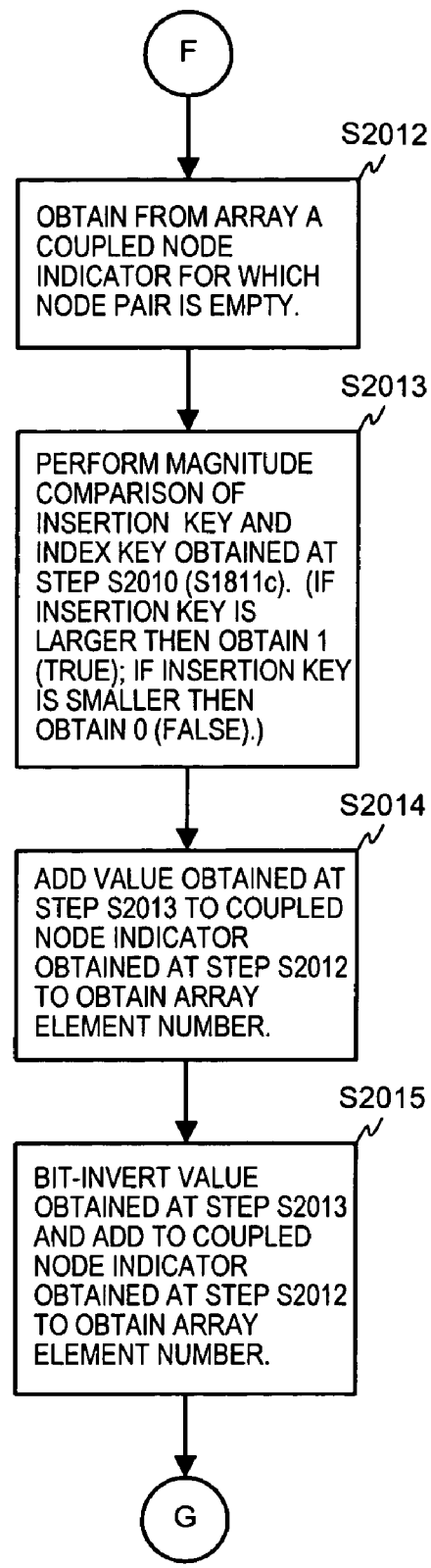
FIG. 20B is a processing flow diagram describing the processing to prepare array elements for the node pair to be inserted, related to the second preferred embodiment of this invention.
Figure 20C:
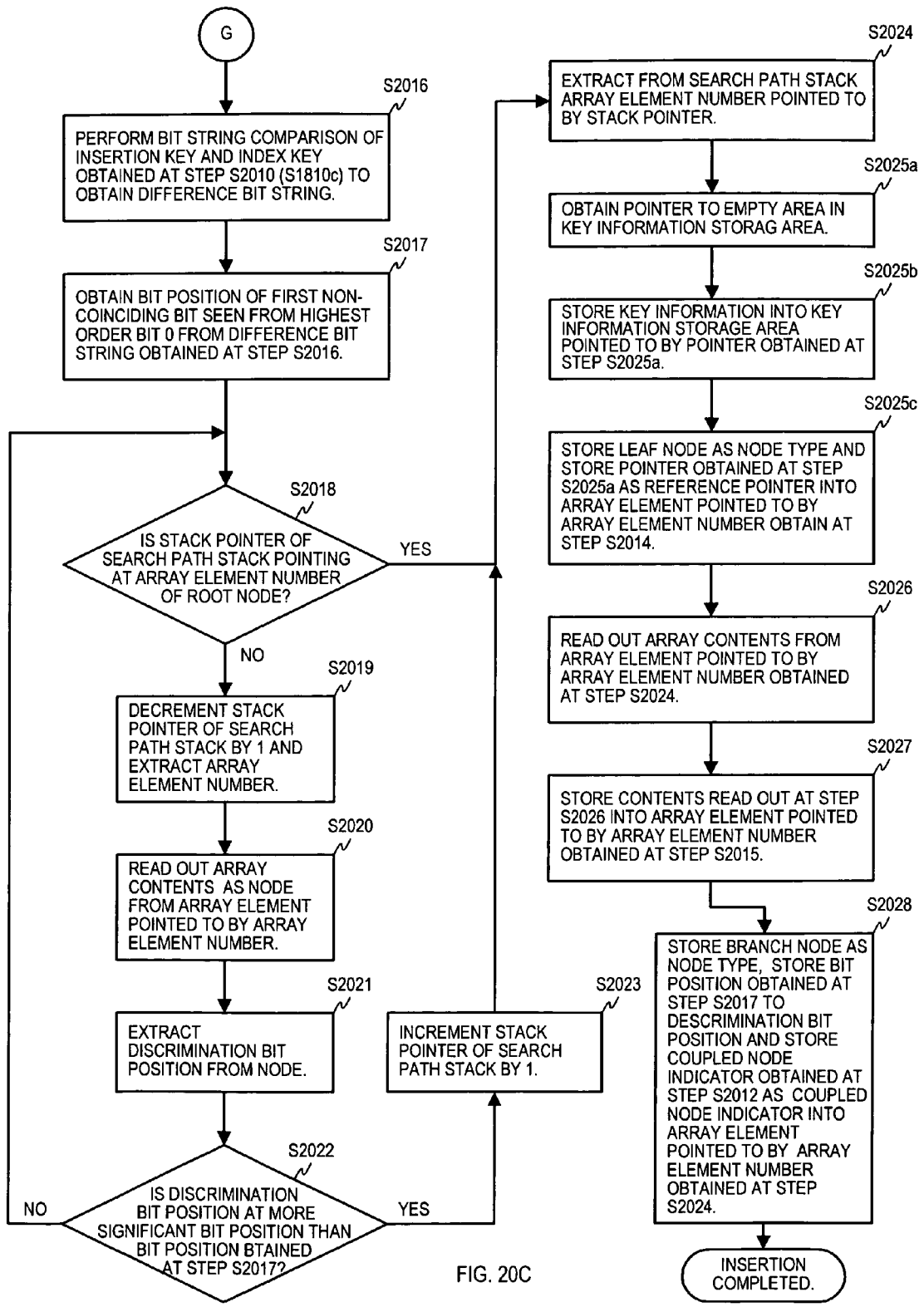
FIG. 20C is a drawing showing the processing flow that completes the insertion processing by obtaining the insertion position of a node pair and storing the contents of each node of the node pair, related to the second preferred embodiment of this invention.

FIG. 20A to FIG. 20C and FIG. 21 are drawings describing node insertion processing in a coupled node tree related to this preferred embodiment. FIG. 20A to FIG. 20C describe the ordinary insertion processing, and FIG. 21 describes root node insertion processing.

FIG. 20A is a drawing showing the processing flow of the search processing that is the prior stage of insertion processing.

In step S2001, the array element number of the root node is set in the area for setting the array element number of the search start node, and in step S2002, the insertion key is set in the search key.

Next, in step S2010, the search processing shown in FIG. 18 is executed, and an index key is obtained as the search result, and processing proceeds to step S2011.

In step S2011, the insertion key and the index key obtained in step S2010 are compared, and if they coincide, the insertion key already exists in the coupled node tree, so the insertion fails and processing is terminated. If the insertion key and the index key obtained in step S2010 do not coincide, processing proceeds to step S2011a, and the insertion key is set in the index key of the key information setting area.

Next, in step S2011b, the processing source identifier of the insertion key is set in the processing source identifier of the key information setting area, and processing proceeds to step S2012 of FIG. 20B.

FIG. 20B is a processing flowchart describing the processing to prepare array elements for the node pair to be inserted.

Since this processing and the processing of the first preferred embodiment of this invention shown in FIG. 6B are the same except for the fact that the search processing in FIG. 20A is the processing shown in FIG. 18, that description is omitted.

FIG. 20C is a drawing showing the processing flow to store a node in the array prepared in FIG. 20B, while obtaining that insertion position, and changing the contents of the current node, and completing the insertion processing. Since the processing of steps S2016 to S2024 shown in FIG. 20C is the same as the processing in steps S616 to S624 shown in FIG. 6C of the first preferred embodiment of this invention, that description is omitted.

After step S2024, in step S2025a, a pointer to an empty area in the key information storage area is obtained. How this pointer to an empty area is obtained can depend of the management method for the key information storage area.

Next, proceeding to step S2025b, the key information set in step S2011a and step S2011b is stored in the key information storage area pointed to by the pointer obtained in step S2025a.

Next, proceeding to step S2025c, the node type of leaf is stored in the node type of the array element pointed to by the array element number obtained in step S2014 and the pointer obtained in step S2025a is stored in its reference pointer.

Since the processing in the following steps, S2026 to S2028 (where processing is terminated), is the same as the processing of steps S626 to S628 shown in FIG. 6C of the first preferred embodiment of this invention, that description is omitted.

Figure 21:
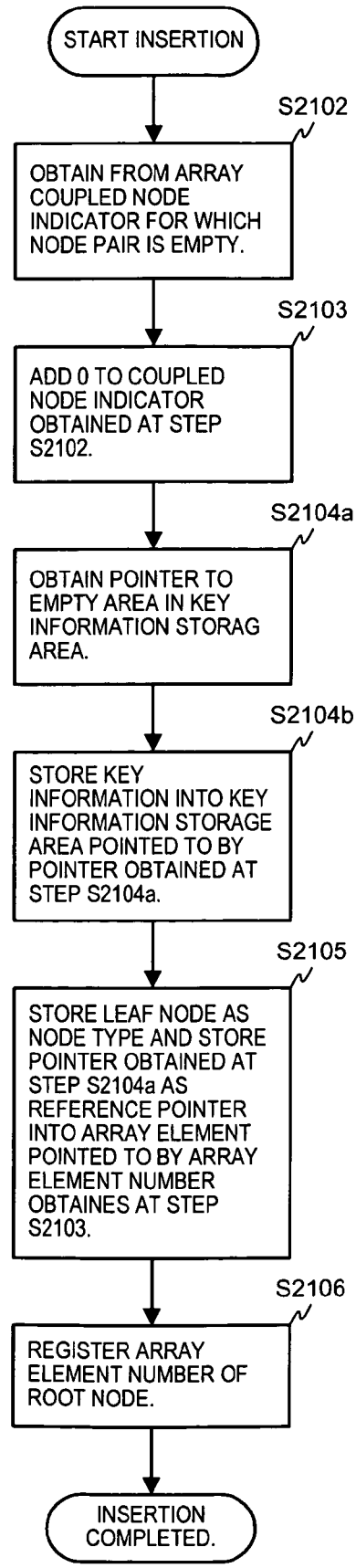
FIG. 21 is a processing flow diagram describing root node insertion processing related to the second preferred embodiment of this invention.

FIG. 21 is a drawing describing the process of generating a new coupled node tree related to this preferred embodiment and registering it, that is to say, describing the insertion processing of a root node.

First, in step S2102, an empty node pair is obtained from the array, and, of the array elements in that node pair, the array element number of the array element that is to be the primary node is acquired. Next, in step S2103, an array element number is obtained which is the array element number obtained in step S2102 to which 0 was added. (Actually that is the same array element number as that acquired in step S2102)

Next, in step S2103a, a pointer to an empty area in the key information storage area is acquired, and the sorted array identifier of the sorted key array from which the insertion key was extracted is stored in the processing source part of the key information in the storage area pointed to by the pointer acquired in step S2103b, and the insertion key is stored in the index key part of the key information.

Furthermore, in step S2104, the node type 1 (leaf node) is stored in the array element with the array element number obtained in step S2103, and the pointer obtained in step S2103a is stored in its reference pointer, and processing proceeds to step S2105.

At step S2105, the array element of the root node acquired in step S2102 is registered and processing is terminated.

Figure 22A:
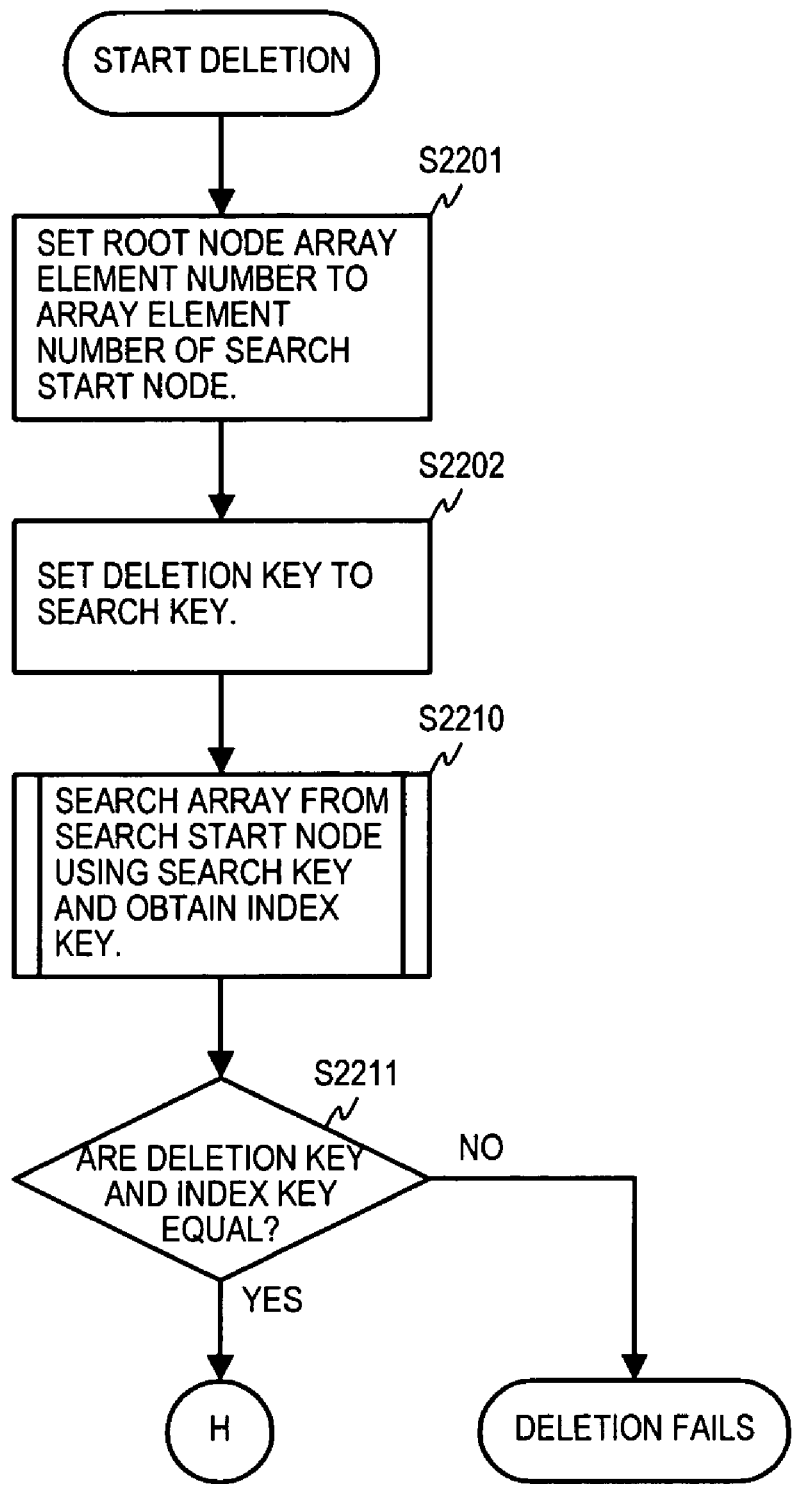
FIG. 22A is a drawing showing the processing flow for the search processing that is the first stage of deletion processing related to the second preferred embodiment of this invention.
Figure 22B:
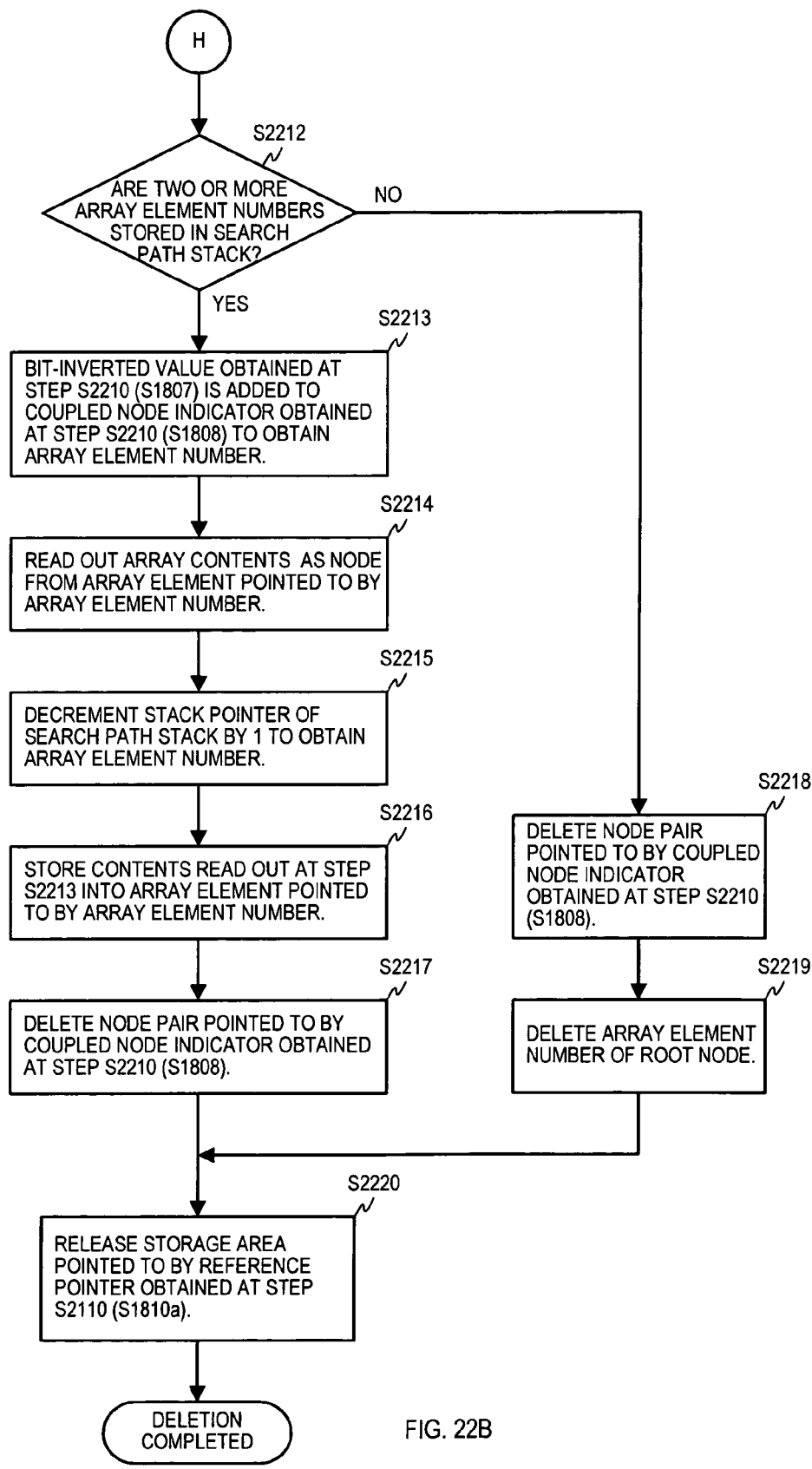
FIG. 22B is a drawing describing the latter stage of deletion processing related to the second preferred embodiment of this invention.

FIG. 22A and FIG. 22B are drawings describing the processing flow of deleting a specific index key from among the index keys in a coupled node tree related to this preferred embodiment.

FIG. 22A is a drawing showing the processing flow of the search processing that is the prior stage of deletion processing, but since this search processing is the same as that of the first preferred embodiment of this invention shown in FIG. 8A except for the fact that the search processing is the processing shown in FIG. 18, that explanation is omitted.

FIG. 22B is a drawing describing the processing flow of the latter stage of deletion processing. Since the processing of steps S2212 to S2219 in FIG. 22B is the same as that of the first preferred embodiment of this invention shown in FIG. 8B, that description is omitted.

Since this implementation example uses a key information storage area, the last processing is that in step S2220, wherein the storage area pointed to by the reference pointer obtained in step S2210 is released, and processing is terminated.

Hereinabove, the coupled node tree and the key information storage area used in a merge sort in this preferred embodiment of the invention was described.

Figure 23A:
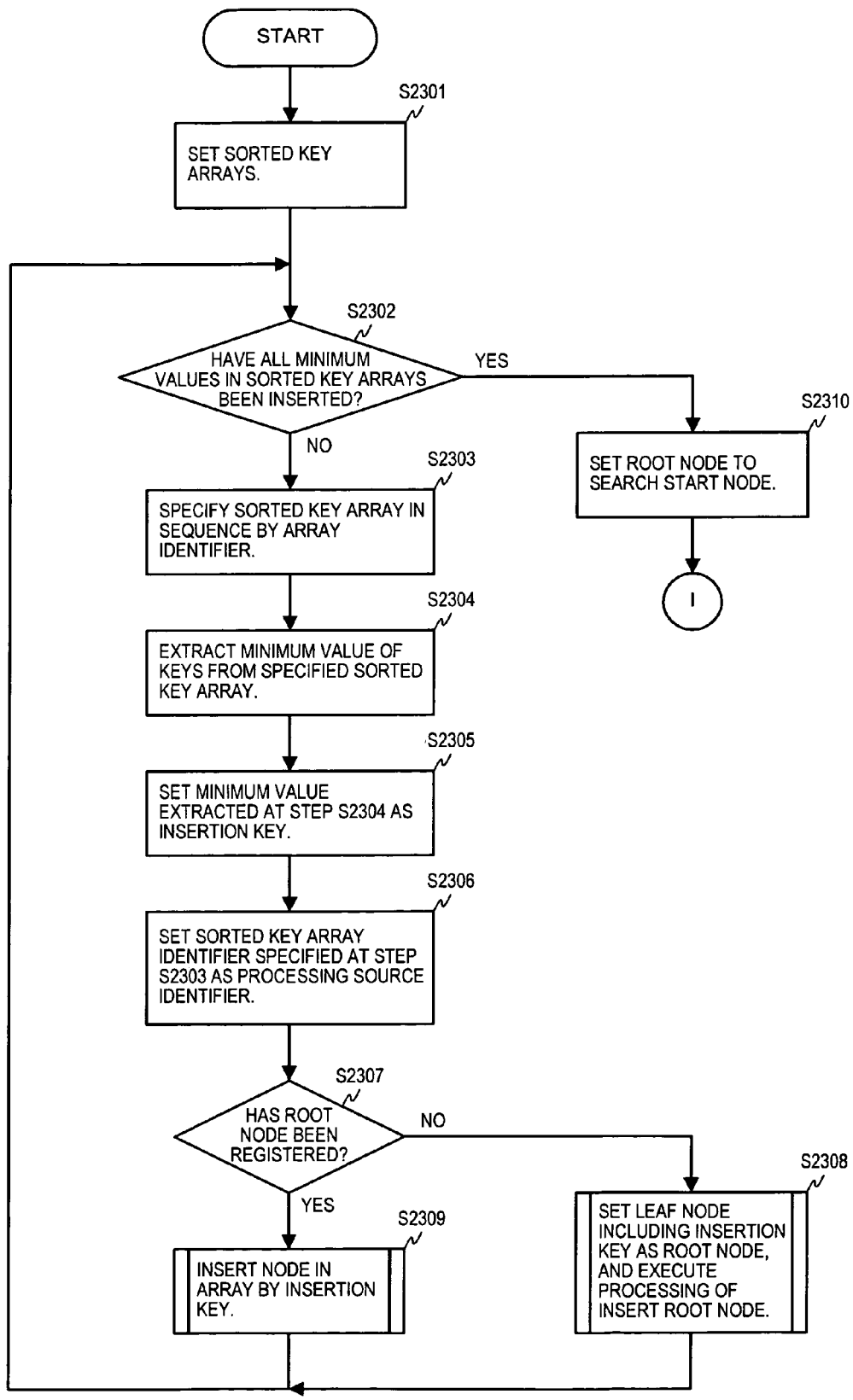
FIG. 23A is a drawing describing the initial processing of a merge sort using a coupled node tree in implementation example 4.
Figure 23B:
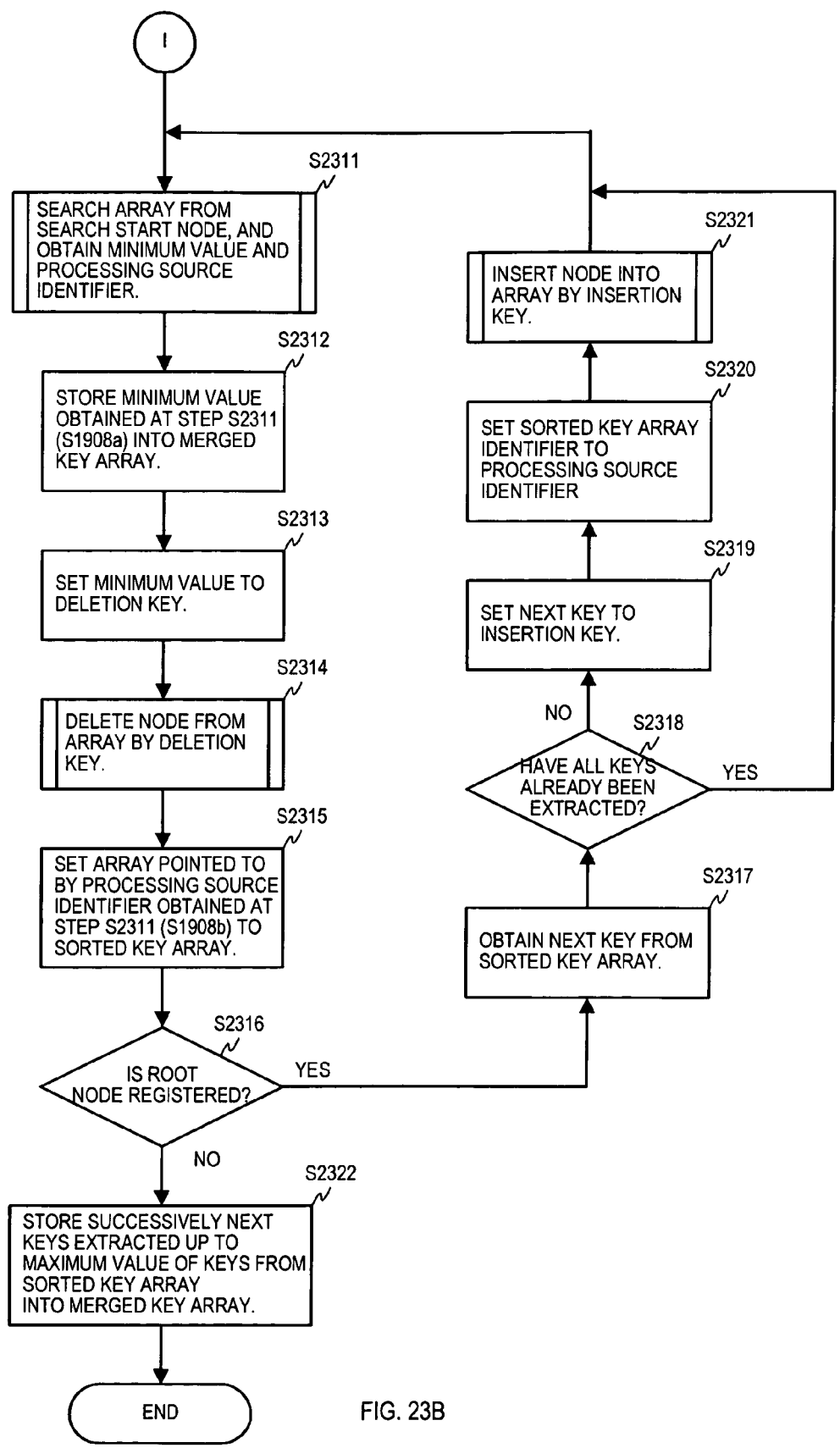
FIG. 23B is a drawing describing the processing to search for a minimum value in a coupled node tree and to execute a merge, in implementation example 4.

Next, referencing FIG. 23A and FIG. 23B, the implementation example 4 of this invention using a coupled node tree related to the second preferred embodiment of this invention is described.

This implementation example applies the coupled node tree related to the second preferred embodiment of this invention to implementation example 1, which uses a coupled node tree related to the first preferred embodiment of this invention.

FIG. 23A and FIG. 23B are figures describing the merge sort processing using a coupled node tree in accordance with this implementation example.

FIG. 23A is a drawing describing the initial processing from generating something that has a structure of a coupled node tree, for example the merge array 309a shown in FIG. 9, up to setting the array element number of the root node of the generated coupled node tree in the area for setting the array element number of the search start node, and FIG. 23B is a drawing describing the later processing of searching for a minimum value and executing a merge.

Since, when the processing of step S2301 to step S2310 in FIG. 23A is compared to the processing of implementation example 1 shown in FIG. 10A, except for the fact that the insertion processing in step 2309 is the processing shown in FIG. 20A to FIG. 20C related to the second preferred embodiment of this invention and that the root node insertion processing in step S2308 is the processing shown in FIG. 21 related to the second preferred embodiment of this invention, the processing is the same as steps S1001 to S1010 shown in FIG. 10A, so that description is omitted.

Furthermore, since the processing of steps S2311 to S2322 shown in FIG. 23B, when compared with the processing of implementation example 1 shown in FIG. 10B, is also the same as the processing of steps S1011 to S1022 shown in FIG. 10B except for the fact that the search processing in step S2311 is that shown in FIG. 19 related to the second preferred embodiment of this invention, and that the deletion processing in step S2314 is that shown in FIG. 22A and FIG. 22B related to the second preferred embodiment of this invention, and that the insertion processing in step 2321 is that shown in FIG. 20A to FIG. 20C related to the second preferred embodiment of this invention, so that description is omitted.

Figure 24A:
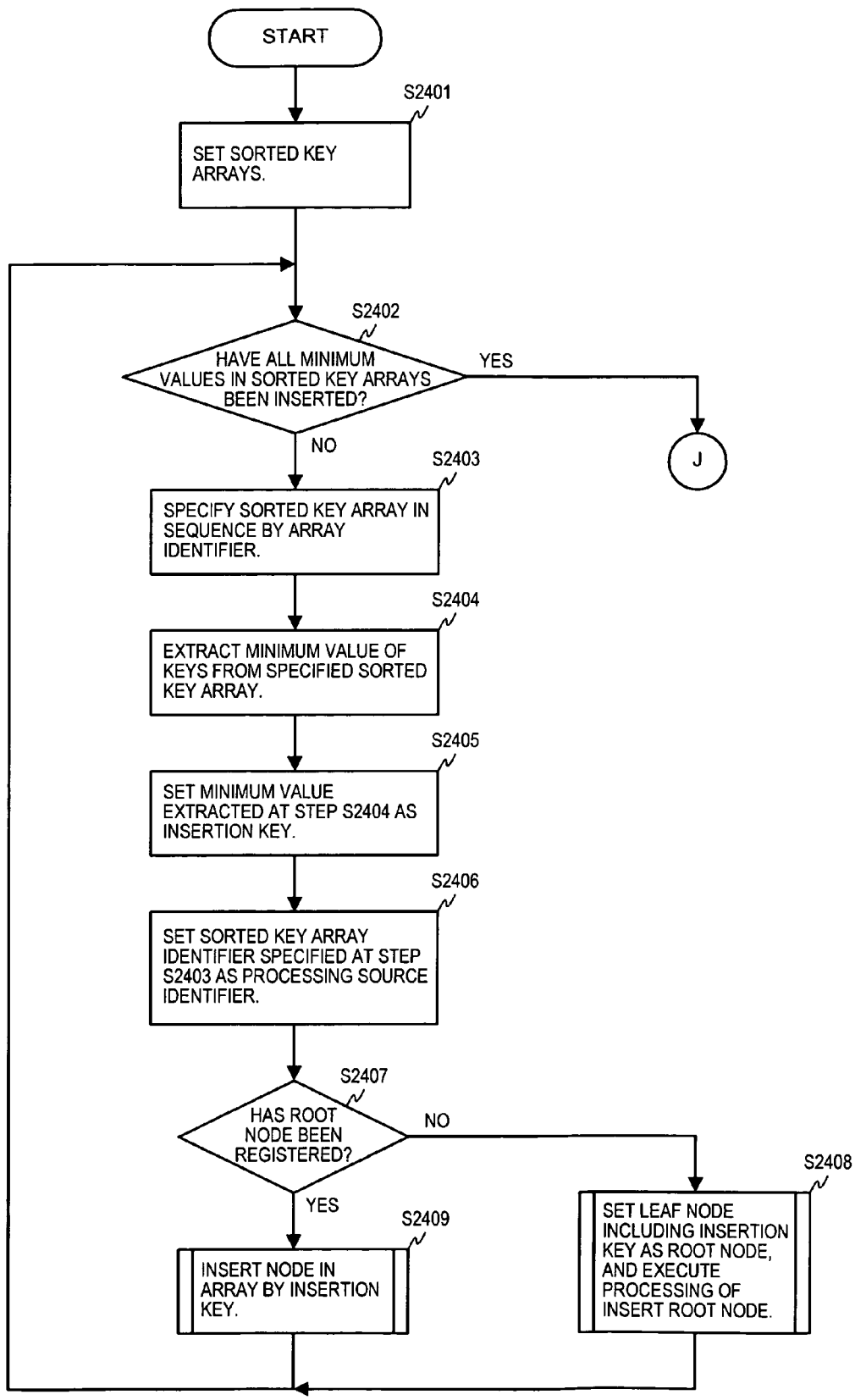
FIG. 24A is a drawing describing the initial processing of a merge sort using a coupled node tree in implementation example 5.

Next, referencing FIG. 24A and FIG. 24B, implementation example 5 of this invention using a coupled node tree related to the second preferred embodiment of this invention is described.

This implementation example applies the coupled node tree related to the second preferred embodiment of this invention to implementation example 2, which uses a coupled node tree related to the first preferred embodiment of this invention.

FIG. 24A and FIG. 24B are drawings describing the merge sort processing flow using a coupled node tree in accordance with this implementation example.

FIG. 24A is a drawing describing the initial processing from generating something that has a structure of a coupled node tree, for example the merge array 309a shown in FIG. 12B, up to setting the array element number of the root node of the generated coupled node tree in the area for setting the array element number of the search start node, and FIG. 24B is a drawing describing the later processing of searching for a minimum value and executing a merge.

As can be understood from the previous description referencing FIG. 12B, since the processing flow of FIG. 24A is exactly the same as the processing flow in FIG. 23A related to implementation example 4, that description is omitted.

Furthermore, pointing out the fact that the processing of steps S2410 to S2423 shown in FIG. 24B, when compared with the processing of implementation example 2 shown in FIG. 13B, is also the same as the processing of steps S1310 to S1323 shown in FIG. 13B except for the fact that the search processing in step S2411 is that shown in FIG. 19 related to the second preferred embodiment of this invention, and that the insertion processing in step 2418 is that shown in FIG. 20A to FIG. 20C related to the second preferred embodiment of this invention, and that step S2420a is inserted after step S2420 in the deletion processing and the storage area pointed to by the reference pointer obtained at step S2410 is released, so a repetition of that description is omitted.

Next, implementation example 6 of this invention using a coupled node tree related to the second preferred embodiment of this invention is described. This implementation example applies the coupled node tree related to the second preferred embodiment of this invention to an implementation example which uses a coupled node tree related to the first preferred embodiment of this invention.

Figure 24C:
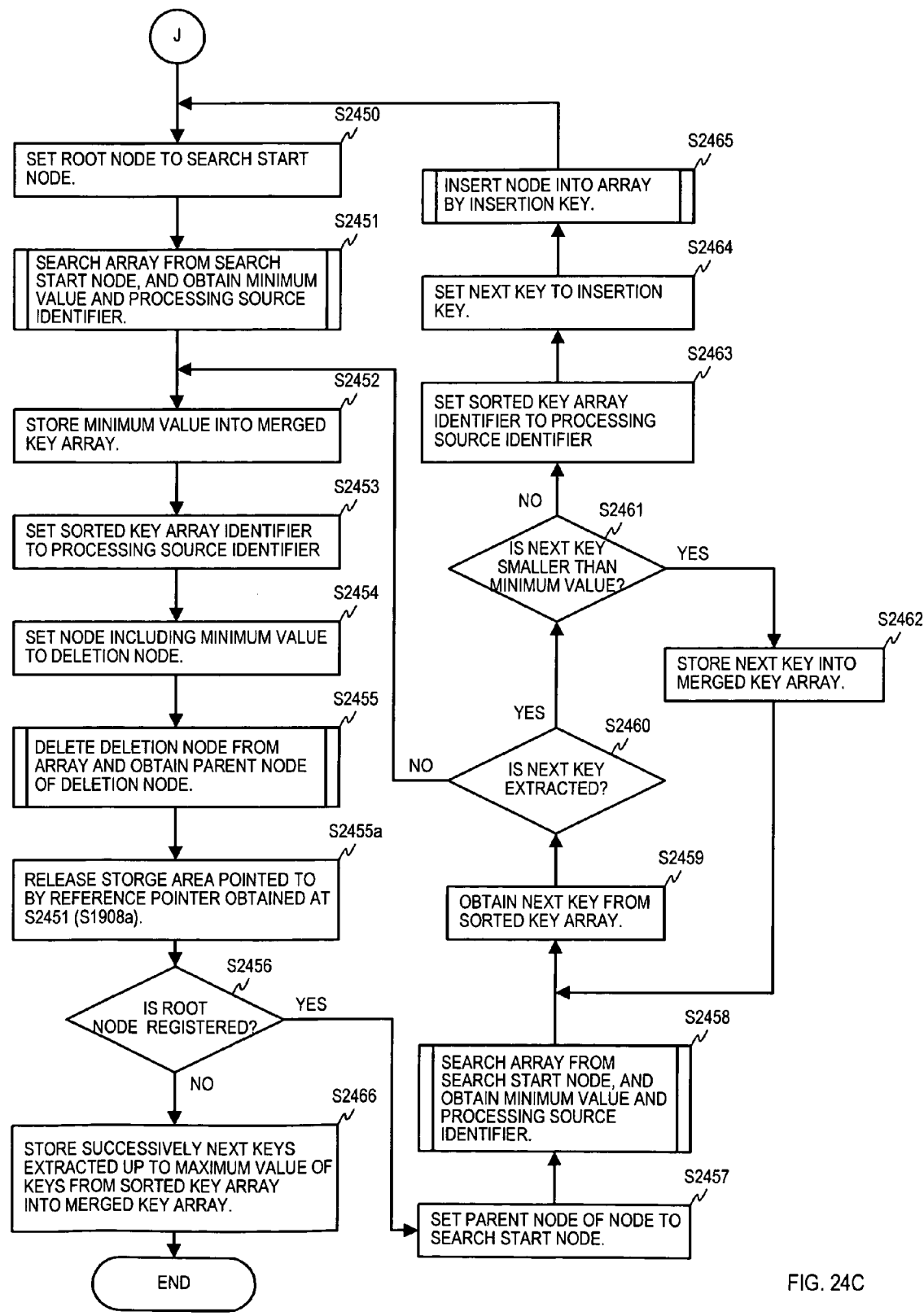
FIG. 24C is a drawing describing the processing to search for a minimum value in a coupled node tree and to execute a merge, in implementation example 6.

FIG. 24A and FIG. 24C are drawings describing the merge sort processing flow using a coupled node tree in this implementation example. The initial processing of the merge sort processing is exactly the same as that in implementation example 5 and the processing shown in FIG. 24A is in common.

FIG. 24C, which describes the processing after the initial processing, of searching for a minimum value and executing a merge, is also analogous to that in FIG. 13C describing the processing after the initial processing, of searching for a minimum value and executing a merge in implementation example 3.

Pointing out the fact that the processing of steps S2450 to S2466 shown in FIG. 24C when compared with the processing of implementation example 3 shown in FIG. 13C, is also the same as the processing of steps S1350 to S1366 shown in FIG. 13C except for the fact that the search processing in step S2451 and step S2458 is that shown in FIG. 19 related to the second preferred embodiment of this invention, and that the insertion processing in step 2418 is that shown in FIG. 20A to FIG. 20C related to the second preferred embodiment of this invention, and that step S2455a is inserted after step S2455 in the deletion processing and the storage area pointed to by the reference pointer obtained at step S2410 is released, so a repetition of that description is omitted.

Although details of the preferred embodiments to implement this invention were described hereinabove using a merge sort in ascending order, it is clear that, by modifying the merge sort in ascending order, a sort merge in descending order could also be implemented. Also it will be clear to a person skilled in the art that the embodiments of the present invention are not limited to the above description; and a variety of modifications thereof are possible. It is also clear that the bit string merge sort apparatus of this invention can be constructed on a computer using a program that executes the bit string merge sort method of this invention on a computer.

Therefore, the above-noted programs, and a computer-readable storage medium into which the programs are stored are encompassed by the embodiments of the present invention. Additionally, the data structure of the coupled node tree according to the present invention is encompassed by the embodiments of the present invention.

What is claimed is:

1. A bit string merge sort method that sorts into ascending order or descending order all the keys consisting of bit strings stored in a plurality of sorted key storage areas, wherein in each sorted key storage area all the keys are sorted in ascending order or descending order, comprising:

a merge tree generating step that generates a coupled node tree that holds a key in the plurality of sorted key storage areas as an index key by extracting the key that is a minimum value or maximum value from each of the plurality of sorted key storage areas and inserting the key into the coupled node tree which is used in a bit string search and comprises a root node and a node pair, the node pair being a branch node and a leaf node, or a pair of branch nodes, or a pair of leaf nodes located in adjacent storage areas, wherein the root node is a node that expresses a starting point of the tree and, which is a leaf node when there is one node in the tree and a branch node when there are two or more nodes in the tree, the branch node includes a discrimination bit position of a search key with which a bit string search is performed and position information indicating a position of a primary node, which is one node of a node pair of a link target, and the leaf node includes an index key that is a bit string that is the target of a search, and wherein the leaf node includes a processing source identifier that identifies the sorted key storage area wherefrom the key has been extracted;

a merge step that performs a minimum or maximum value search on the coupled node tree and obtains either a smallest key that is the minimum value or a largest key that is the maximum value as a search result along with its processing source identifier and stores the smallest key or the largest key in a merged key storage area;

a key deleting step that deletes the smallest key or largest key from the coupled node tree;

a next key extracting step that extracts a next key, which is a next minimum value for the smallest key or a next maximum value for the largest key, from the sorted key storage area pointed to by the processing source identifier that has been obtained in the merge step;

a next key inserting step that inserts the extracted next key into the coupled node tree; and wherein the merge step, the deleting step, the next key extracting step, and the next key inserting step are repeated until all the keys are extracted from the plurality of sorted key storage areas and are stored in the merged key storage area.

2. A bit string merge sort method according to claim 1, wherein the next key extracting step includes a next key extraction determination step that determines whether a next key has been extracted from the sorted key storage area pointed to by the obtained processing source identifier, and, if the determination in the next key extraction determination step is that a next key has not been extracted, the next key insertion step is skipped.

3. A bit string merge sort method according to claim 2, wherein the key deletion step includes a root node registration determination step that determines whether the root node of the coupled node tree is registered after a smallest key or largest key has been deleted from the coupled node tree, and the method further comprises a final merge step that, if the determination in the root node registration determination step is that the root node is not registered, extracts keys successively from sorted key storage areas with unextracted keys, up to the largest or smallest key, and stores the keys in the merged key storage area.

4. A bit string merge sort method according to claim 1, wherein the execution order of the key deletion step, the next key extraction step, and the next key insertion step is made into the execution order of the next key extraction step, the next key insertion step, and the key deletion step.

5. A bit string merge sort method according to claim 4, wherein the node immediately above the node including the deleted minimum value or maximum value is made the search start node of the minimum value or maximum value search in the merge step.

6. A bit string merge sort method according to 5, further comprises an insertion node search step that determines whether, in a minimum value search or maximum value search from the root node to the leaf node holding the minimum value or maximum value, the insertion node that is the node immediately above the node that includes the inserted next key as its index key exists in the search path and a search again step that, when a determination is made that the insertion node exists in the search path in the insertion node search step, performs the minimum value search or maximum value search once again with the root node as the search start node.

7. A bit string merge sort method according to claim 1, further comprises, following the key deleting step, an intermediate search step that performs a minimum value or maximum value search with the node that is immediately above the node that has been deleted in the key deleting step and that includes the minimum value or maximum value as the search start node and also further comprises, following the next key extracting step, a next key magnitude determination step that determines whether the next key extracted in the next key extracting step is smaller or larger, respectively, than the minimum value or maximum value obtained in the intermediate search step, and wherein if the next key is smaller or larger than the minimum value or maximum value respectively, the next key is stored in the merged key storage area and the next key extracting step is executed once more, and if the next key is larger or smaller than the minimum value or maximum value respectively, the next key inserting step is executed.

8. A bit string merge sort method according to claim 7, wherein the next key extracting step includes a next key extraction determination step that determines whether a next key has been extracted from the sorted key storage area pointed to by the obtained processing source identifier and, if the determination in the next key extraction determination step is that no next key has been extracted, the next key insertion step and the performing of the minimum value search or maximum value search with the root node as the search start node in the merging step are skipped.

9. A bit string merge sort method according to claim 1, wherein, instead of a leaf node of the coupled node tree holding a processing source identifier and an index key, the leaf node holds a pointer to an area wherein the processing source identifier and the index key are arranged, and obtaining of the processing source identifier and the index key is done via the pointer.

10. A computer program product comprising a tangible non-transitory computer-readable storage medium having program instructions stored thereon, the program instructions being for execution by a computer of the bit string merge sort method according to claim 1.

11. A computer program product comprising a tangible non-transitory computer-readable storage medium having program instructions stored thereon, the program instructions being for execution by a computer of the bit string merge sort method according to claim 9.

12. A tangible non-transitory computer-readable storage medium storing a data structure for a tree that holds a key of a plurality of sorted key storage areas, being used in a bit string merge sort method that sorts into ascending order or descending order all the keys consisting of bit strings stored in the plurality of sorted key storage areas, wherein in each sorted key storage area all the keys are sorted in ascending order or descending order, comprising:

a coupled node tree that has a root node and a node pair, the node pair being a branch node and a leaf node, or a pair of branch nodes, or a pair of leaf nodes located in adjacent storage areas, wherein the root node is a node that expresses a starting point of the tree and, which is a leaf node when there is one node in the tree and a branch node when there are two or more nodes, the branch node includes a discrimination bit position of a search key with which a bit string search is performed and position information indicating a position of a primary node, which is one node of a node pair of a link target, and the leaf node includes an index key that is a key extracted from a sorted key storage area and is a bit string that is the target of a search, and a process source identifier that identifies the sorted key storage area that had held that key; and the structure enables the execution of a bit string merge sort method including steps of a merge tree generating step that generates the coupled node tree by extracting the key that is a minimum value or maximum value from each of the plurality of sorted key storage areas and inserting the key into the coupled node tree, a merge step that performs a minimum or maximum value search on the coupled node tree and obtains either a smallest key that is the minimum value or a largest key that is the maximum value as a search result along with its processing source identifier and stores the smallest key or the largest key in the merged key storage area, a key deleting step that deletes the smallest key or largest key from the coupled node tree, a next key extracting step that extracts a next key, which is a next minimum value for the smallest key or a next maximum value for the largest key, from the sorted key storage area pointed to by the processing source identifier that has been obtained in the merge step, a next key inserting step that inserts the extracted next key into the coupled node tree, and wherein the merge step, the deleting step, the next key extracting step, and the next key inserting step are repeated until all the keys are extracted from the plurality of sorted key storage areas and are stored in the merged key storage area.

13. A bit string merge sort apparatus that sorts into ascending order or descending order all the keys consisting of bit strings stored in a plurality of sorted key storage areas, wherein in each sorted key storage area all the keys are sorted in ascending order or descending order, comprising:

a tangible non-transitory computer readable storage apparatus having a merge tree storage means and a coupled node tree stored therein, the merge tree storage means holding a key in the plurality of sorted key storage areas as an index key on the coupled node tree, the coupled node tree being used in a bit string search and having a root node and a node pair, the node pair being a branch node and a leaf node, or a pair of branch nodes, or a pair of leaf nodes located in adjacent storage areas, wherein the root node is a node that expresses a starting point of the tree and, which is a leaf node when there is one node in the tree and a branch node when there are two or more nodes in the tree, the branch node includes a discrimination bit position of a search key with which a bit string search is performed and position information indicating a position of a primary node, which is one node of a node pair of a link target, and the leaf node includes a key comprised of bit string that is extracted from one of a plurality of the sorted key storage areas as an index key that is the target of a search and a processing source identifier that identifies the sorted key storage area that held that key, and wherein by repeating linkage, at the branch node, to a primary node or a node at a position in a memory area adjacent thereto of a node pair of the link target from an arbitrary node of the tree as a search start node in accordance with a bit value of a search key at a discrimination bit position included in the branch node, until the leaf node is reached, an index key included in the leaf node is made a search result key, which is the search result using the search key of an arbitrary subtree having the search start node as its root node;

a merge tree generating means that extracts the smallest or largest key from the plurality of sorted key storage areas that hold the sorted keys and generates the coupled node tree and stores the coupled node tree in the merge tree storing means;

a merge means that performs a minimum or maximum value search on the coupled node tree, obtains either a smallest key that is the minimum value or the largest key that is the maximum value as a search result along with a processing source identifier, and stores the smallest key or largest key in the merged key storage area while deleting the smallest key or largest key from the coupled node tree;

a next key inserting means that extracts the next key, which is the smallest key that is the minimum value or the largest key that is the maximum value, from the sorted key storage area that is pointed to by the processing source identifier obtained by the merge means and inserts the extracted next key in the coupled node tree; and wherein by extracting all the keys from the plurality of sorted key storage areas and storing all the keys in the merged key storage area by the merge means and the next key insertion means, the keys stored in the plurality of sorted key storage areas are stored in the merged key storage area in ascending order or descending order.

14. A bit string merge sort apparatus according to claim 13, wherein the merge means includes an intermediate search part that performs a minimum value or maximum value search with the node immediately above the node that has been deleted, which included the minimum value or maximum value, as the search start node, and the next key insertion means includes a next key magnitude determination part that determines whether the extracted next key is smaller or larger, respectively, than the minimum value or maximum value obtained in the intermediate search part, and when the next key magnitude determination part determines that the next key is smaller or larger than the minimum value or maximum value respectively the merge means stores the next key in the merged key storage area, and the next key inserting means once again extracts a next key, and when the next key magnitude determination part determines that the next key is smaller or larger than the minimum value or maximum value, respectively, the next key insertion means inserts the next key in the coupled node tree.

* * * * *